PARTY LINE IDENTIFICATION IN AUTOMATIC TELEPHONY

Original Filed Sept. 18, 1941 28 Sheets-Sheet 1

INVENTOR.
JOHN E. OSTLINE
BY Davis, Lindsey, Smith & Shonts
ATTORNEYS

July 15, 1952 J. E. OSTLINE 2,603,713

PARTY LINE IDENTIFICATION IN AUTOMATIC TELEPHONY

Original Filed Sept. 18, 1941 28 Sheets-Sheet 2

INVENTOR.
JOHN E. OSTLINE
BY Davis, Lindsey, Smith & Shonts
ATTORNEYS

July 15, 1952 J. E. OSTLINE 2,603,713

PARTY LINE IDENTIFICATION IN AUTOMATIC TELEPHONY

Original Filed Sept. 18, 1941 28 Sheets-Sheet 3

INVENTOR.
JOHN E. OSTLINE
BY Davis, Lindsey, Smith & Shonts
ATTORNEYS

PARTY LINE IDENTIFICATION IN AUTOMATIC TELEPHONY

Original Filed Sept. 18, 1941 28 Sheets-Sheet 4

INVENTOR.
JOHN E. OSTLINE
BY Davis, Lindsey, Smith & Shonts
ATTORNEYS

INVENTOR.
JOHN E. OSTLINE
BY Davis, Lindsey, Smith & Shonts
ATTORNEYS

PARTY LINE IDENTIFICATION IN AUTOMATIC TELEPHONY

Original Filed Sept. 18, 1941 28 Sheets-Sheet 6

INVENTOR.
JOHN E. OSTLINE

BY Davis, Lindsey, Smith & Shonts
ATTORNEYS

PARTY LINE IDENTIFICATION IN AUTOMATIC TELEPHONY

Original Filed Sept. 18, 1941

28 Sheets-Sheet 7

INVENTOR.
JOHN E. OSTLINE

BY *Davis, Lindsey, Smith & Shonts*

ATTORNEYS

July 15, 1952 J. E. OSTLINE 2,603,713

PARTY LINE IDENTIFICATION IN AUTOMATIC TELEPHONY

Original Filed Sept. 18, 1941 28 Sheets-Sheet 8

INVENTOR.
JOHN E. OSTLINE

BY Davis, Lindsey, Smith & Shonts

ATTORNEYS

July 15, 1952 J. E. OSTLINE 2,603,713

PARTY LINE IDENTIFICATION IN AUTOMATIC TELEPHONY

Original Filed Sept. 18, 1941 28 Sheets-Sheet 9

INVENTOR.
JOHN E. OSTLINE

BY Davis, Lindsey, Smith & Shonts

ATTORNEYS

July 15, 1952 J. E. OSTLINE 2,603,713

PARTY LINE IDENTIFICATION IN AUTOMATIC TELEPHONY

Original Filed Sept. 18, 1941 28 Sheets-Sheet 10

INVENTOR.
JOHN E. OSTLINE

BY Davis, Lindsey, Smith & Shonts

ATTORNEYS

INVENTOR.
JOHN E. OSTLINE
BY Davis, Lindsey, Smith & Shonts
ATTORNEYS

PARTY LINE IDENTIFICATION IN AUTOMATIC TELEPHONY

Original Filed Sept. 18, 1941 28 Sheets-Sheet 12

INVENTOR.
JOHN E. OSTLINE

BY Davis, Lindsey, Smith & Shonts

ATTORNEYS

July 15, 1952 J. E. OSTLINE 2,603,713

PARTY LINE IDENTIFICATION IN AUTOMATIC TELEPHONY

Original Filed Sept. 18, 1941 28 Sheets-Sheet 13

INVENTOR.
JOHN E. OSTLINE
BY Davis, Lindsay, Smith & Shonts
ATTORNEYS

PARTY LINE IDENTIFICATION IN AUTOMATIC TELEPHONY

Original Filed Sept. 18, 1941

INVENTOR.
JOHN E. OSTLINE
BY Davis, Lindsey, Smith & Shonts
ATTORNEYS

INVENTOR.
JOHN E. OSTLINE
BY Davis, Lindsey, Smith & Shonts
ATTORNEYS

INVENTOR.
JOHN E. OSTLINE
BY Davis, Lindsey, Smith & Shonts
ATTORNEYS

July 15, 1952 J. E. OSTLINE 2,603,713

PARTY LINE IDENTIFICATION IN AUTOMATIC TELEPHONY

Original Filed Sept. 18, 1941 28 Sheets-Sheet 17

INVENTOR.
JOHN E. OSTLINE
BY Davis, Lindsey, Smith & Shonts
ATTORNEYS

INVENTOR.
JOHN E. OSTLINE
BY Davis, Lindsey, Smith & Shonts
ATTORNEYS

INVENTOR.
JOHN E. OSTLINE

BY Davis, Lindsey, Smith & Shonts
ATTORNEYS

July 15, 1952 J. E. OSTLINE 2,603,713

PARTY LINE IDENTIFICATION IN AUTOMATIC TELEPHONY

Original Filed Sept. 18, 1941 28 Sheets-Sheet 20

INVENTOR.
JOHN E. OSTLINE
BY Davis, Lindsey, Smith & Shonts
ATTORNEYS

July 15, 1952 J. E. OSTLINE 2,603,713

PARTY LINE IDENTIFICATION IN AUTOMATIC TELEPHONY

Original Filed Sept. 18, 1941 28 Sheets-Sheet 21

INVENTOR.
JOHN E. OSTLINE

BY Davis, Lindsey, Smith & Shonts

ATTORNEYS

PARTY LINE IDENTIFICATION IN AUTOMATIC TELEPHONY

Original Filed Sept. 18, 1941 28 Sheets-Sheet 22

INVENTOR.
JOHN E. OSTLINE
BY Davis, Lindsey, Smith & Shonts
ATTORNEYS

July 15, 1952 J. E. OSTLINE 2,603,713

PARTY LINE IDENTIFICATION IN AUTOMATIC TELEPHONY

Original Filed Sept. 18, 1941 28 Sheets-Sheet 23

INVENTOR.
JOHN E. OSTLINE
BY Davis, Lindsey, Smith & Shonts
ATTORNEYS

INVENTOR.
JOHN E. OSTLINE
BY Davis, Lindsey, Smith & Shonts
ATTORNEYS

DETECTOR 80

INVENTOR.
JOHN E. OSTLINE
BY Davis, Lindsey, Smith & Shonts
ATTORNEYS

DETECTOR 80

INVENTOR.
JOHN E. OSTLINE
BY Davis, Lindsey, Smith & Shonts
ATTORNEYS

DETECTOR 80

INVENTOR.
JOHN E. OSTLINE
BY Davis, Lindsey, Smith & Shonts
ATTORNEYS

July 15, 1952 J. E. OSTLINE 2,603,713

PARTY LINE IDENTIFICATION IN AUTOMATIC TELEPHONY

Original Filed Sept. 18, 1941 28 Sheets-Sheet 28

INVENTOR.
JOHN E. OSTLINE
BY Davis, Lindsey, Smith & Shonts
ATTORNEYS

Patented July 15, 1952 2,603,713

UNITED STATES PATENT OFFICE 2,603,713

PARTY LINE IDENTIFICATION IN AUTOMATIC TELEPHONY

John E. Ostline, Chicago, Ill., assignor to Automatic Electric Laboratories, Inc., a corporation of Delaware Original application September 18, 1941, Serial No. 411,350. Divided and this application September 11, 1942, Serial No. 457,925

21 Claims. (Cl. 179—8.5)

Figure 1:
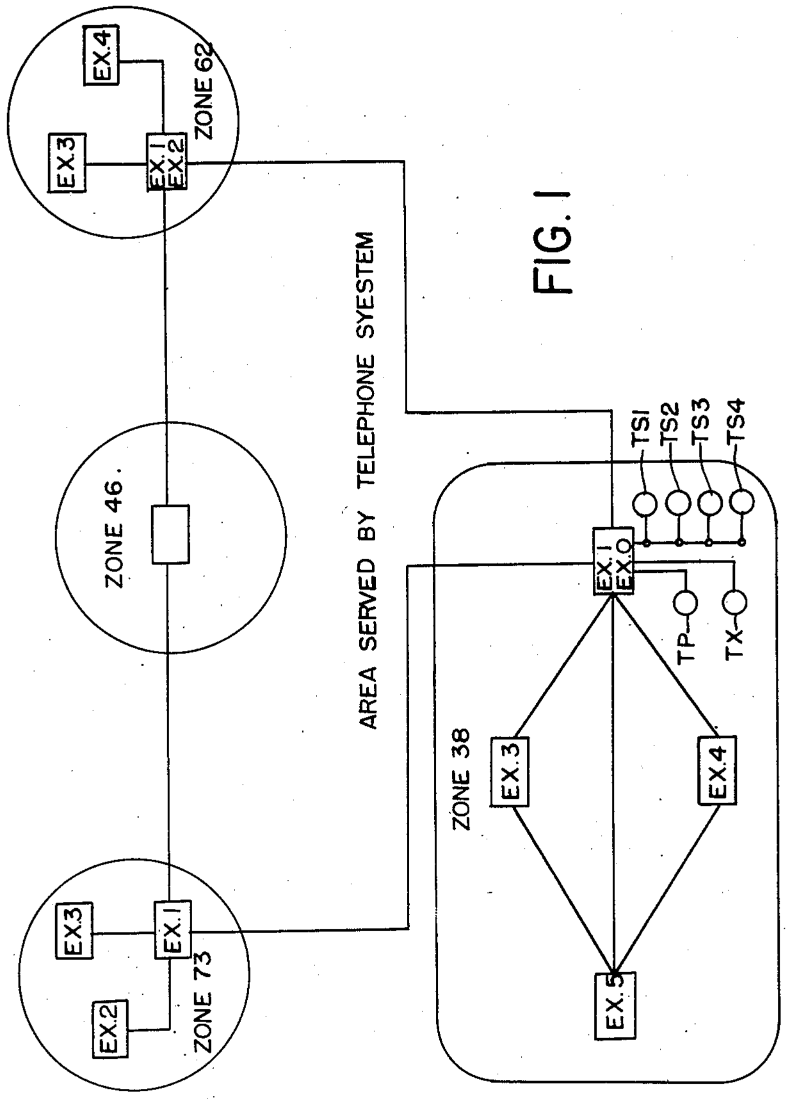

The present invention relates to automatic telephone systems and more particularly to automatic recording apparatus operative to record given particulars of certain calls in the systems. More specifically, the present invention relates to improvements in telephone systems of the character disclosed in the copending application of John E. Ostline, Serial No. 354,301, filed August 26, 1940, now Patent No. 2,385,228, granted September 18, 1945. This application is a division of the copending application of John E. Ostline, Serial No. 411,350, filed September 18, 1941, now Patent No. 2,409,063, granted October 8, 1946.

In a telephone system serving a large metropolitan area and the adjacent suburban areas, it is usually desirable to divide the system into a plurality of zones and to handle calls between the exchanges in different zones and between certain of the exchanges in the same zone as toll calls, for which special charges are made, depending upon the distances between the zones or the distances between the exchanges in the same zone and the time duration of the call. In accordance with conventional practice, the connections for a call of this type are set up with the aid of an operator, which operator records upon a toll ticket certain particulars concerning the call, including the codes of the calling and called zones, the codes of the calling and called exchanges, the directory numbers of the calling and called lines, the rate applicable to the call, the time duration of the call, and possibly the total charge for or cost of the call.

While a telephone system of the type described is entirely satisfactory in operation, it requires the services of a large number of operators and necessitates some delay in extending a call of the type mentioned while the information concerning the calling and called subscriber substations is being transferred from the calling subscriber to the operator.

Accordingly, it is an object of the present invention to provide in an automatic telephone system of the type noted, improved recording apparatus which is operative automatically to record, without the aid of an operator, given particulars of certain calls in the system for which special charges are made.

Another object of the invention is to provide in an automatic telephone system of the type noted, improved register mechanism for controlling the operation of the switching apparatus to set up the various connections and for collecting the various items of information pertaining to the connections to be recorded.

Another object of the invention is to provide in an automatic telephone system including party lines, an improved arrangement for identifying the calling stations on the calling party lines, which is selectively governed by the calling devices at the various calling stations on the calling party lines.

A further object of the invention is to provide in an automatic telephone system including party lines which are arranged on a terminal per station basis, an improved detector which is operated incident to the extension of a connection from a given station on a given party line to detect the terminal of the given party line individually corresponding to the given station, thereby to identify the given party line as the calling line and the given station as the calling station thereon.

Further features of the invention pertain to the particular arrangement of the circuit elements of the system, whereby the above-outlined and additional operating features are attained.

Figure 2:
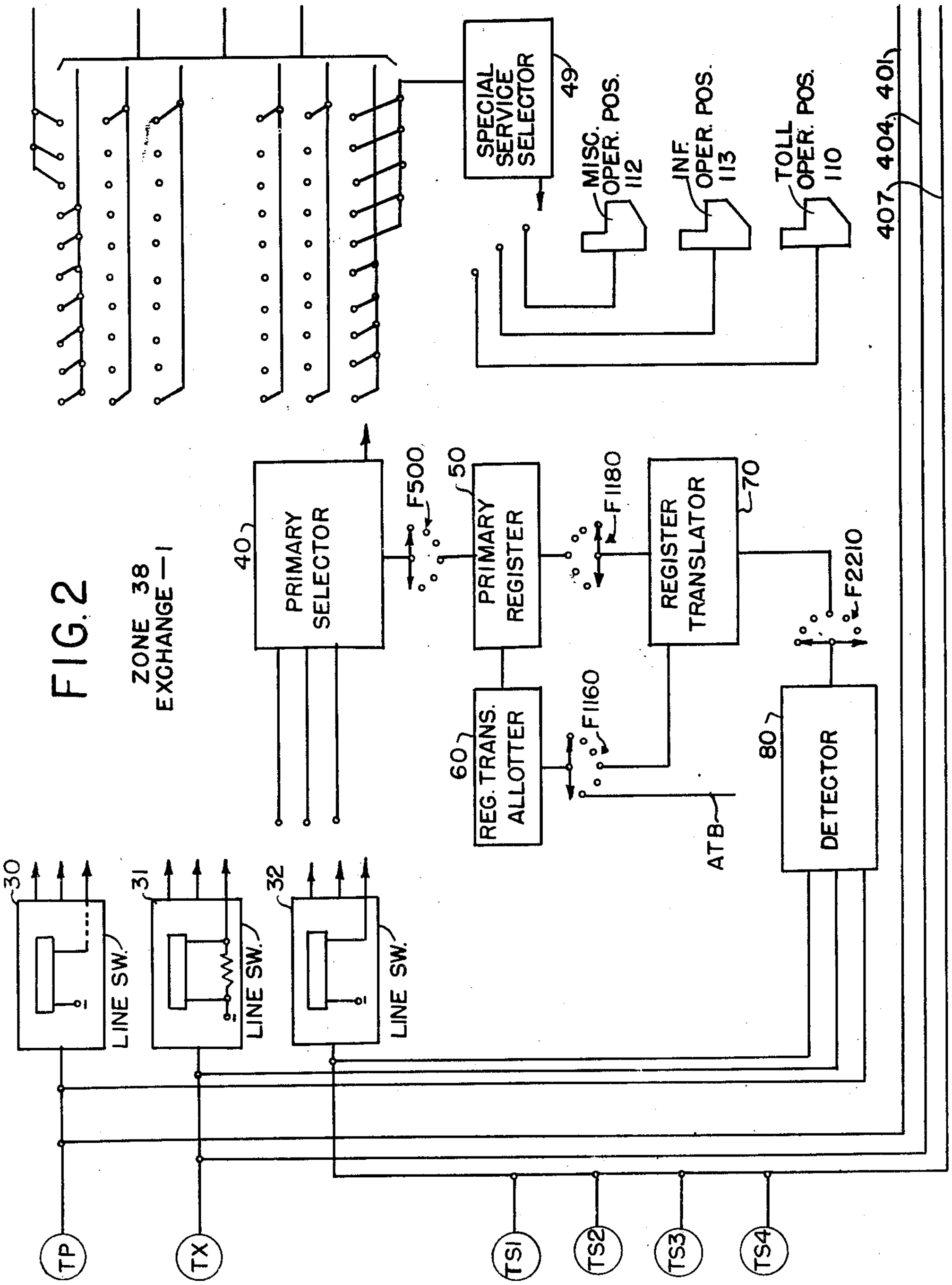
Figure 3:
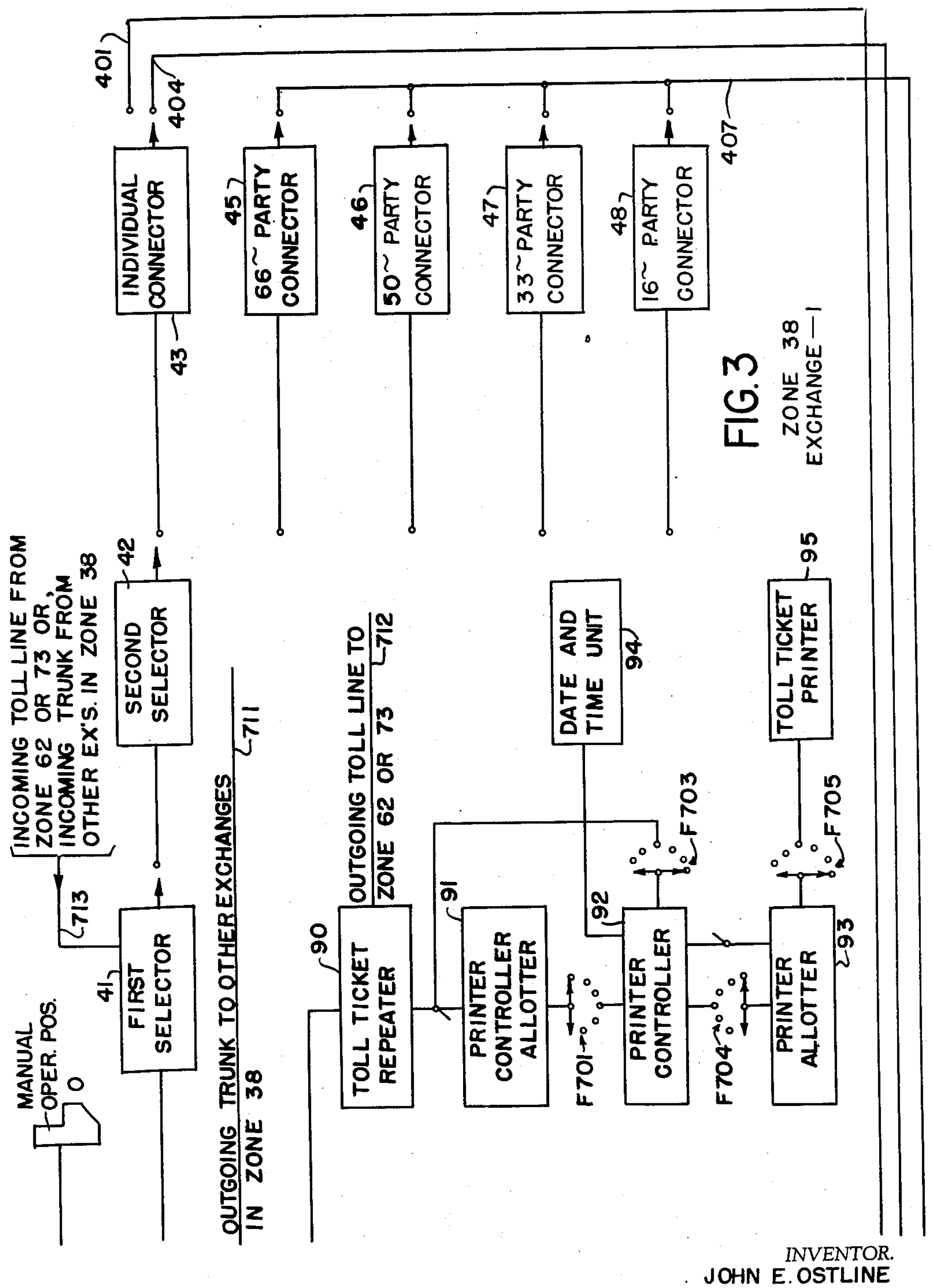
Figures 28, 29:
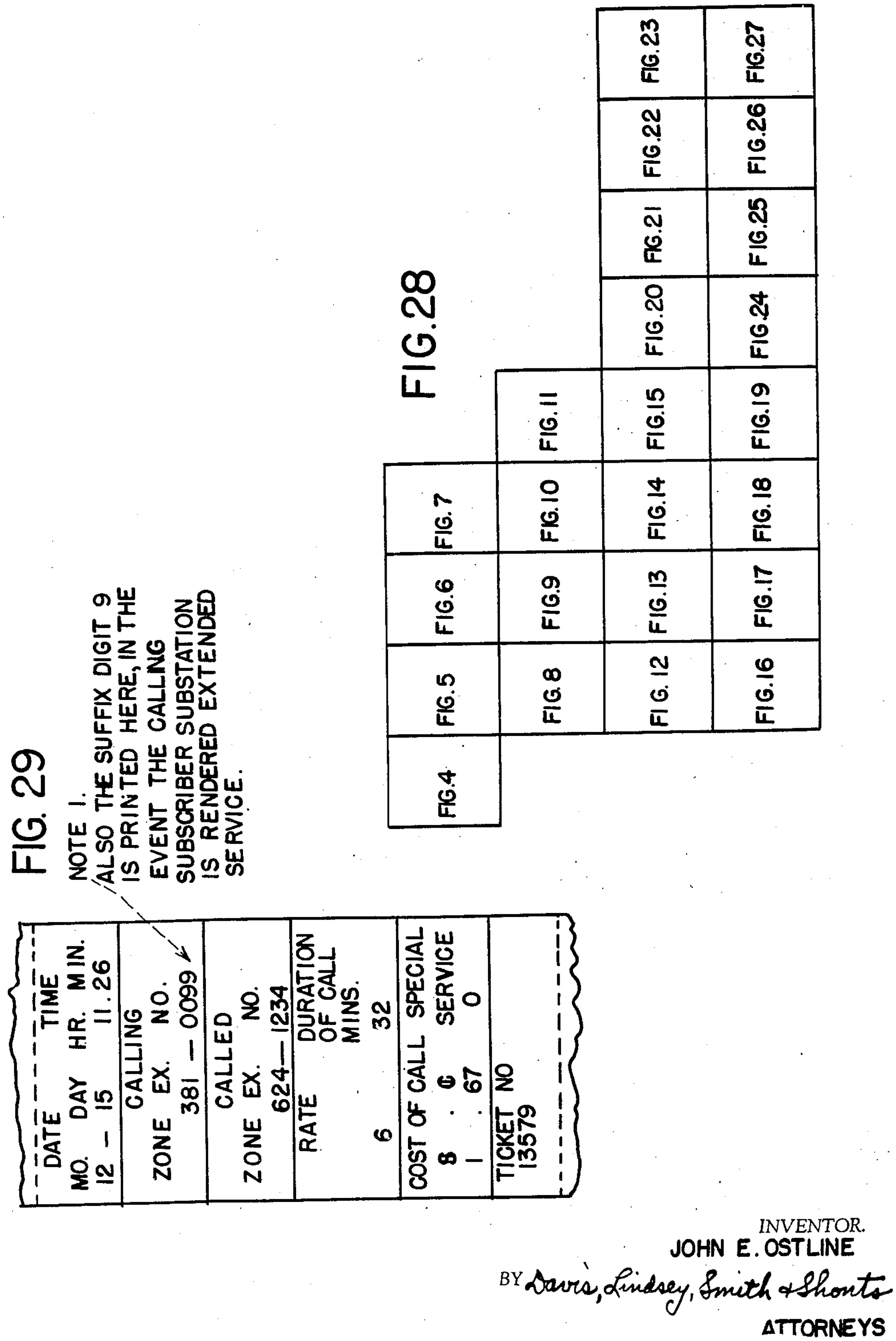

The invention, both as to its organization and method of operation, together with further objects and advantages thereof, will best be understood by reference to the following specification taken in connection with the accompanying drawings, in which Figure 1 is a schematic diagram of the area served by a telephone system embodying the present invention; Figs. 2 and 3, taken together, illustrate the general arrangement of the apparatus incorporated in exchange 1 zone 38 of the telephone system; Figs. 4 to 27, inclusive, taken together, illustrate the details of the apparatus incorporated in exchange 1 zone 38 of the telephone system, which apparatus has incorporated therein the features of the invention as briefly outlined above; Fig. 28 illustrates the mode of combining Figs. 4 to 27, inclusive, to form a unified system; and Fig. 29 illustrates a toll ticket printed by a toll ticket printer provided in exchange 1 zone 38 of the telephone system.

More particularly, Figs. 4 to 7, inclusive, illustrate the details of the switching apparatus and trunking network incorporated in exchange 1 zone 38 of the telephone system; Figs. 8 to 11, inclusive, illustrate the details of one of the primary registers provided in exchange 1 zone 38 of the telephone system; Figs. 12 to 19, inclusive, illustrate the details of one of the register translators provided in exchange 1 zone 38 of the telephone system; and Figs. 20 to 27, inclusive, illustrate the details of the detector provided in exchange 1 zone 38 of the telephone system.

*The general arrangement of the telephone system*

Referring now more particularly to Fig. 1 of the drawings, it will be observed that the automatic telephone system serves a large metropolitan area comprising a number of subareas or zones, each of which includes one or more exchanges. More specifically, the area served by the telephone system comprises the zones 73, 46, 62 and 38; the zone 73 includes the exchanges 1, 2 and 3 illustrated; the zone 46 includes the single exchange illustrated; the zone 62 includes the exchanges 1, 2, 3 and 4 illustrated; and the zone 38 includes the exchanges 1, 0, 3, 4 and 5 illustrated. Further, it is noted that in some of the zones two exchanges are housed together. For example, in zone 38, exchanges 1 and 0 are housed together; while in zone 62, exchanges 1 and 2 are housed together. Each exchange in each zone comprises a 10,000 terminal unit; although it may not be initially installed to serve its ultimate terminal capacity. The lines terminating at each exchange in each zone comprise both private subscriber lines and party subscriber lines; the private subscriber lines including both ordinary private subscriber lines and extended service private subscriber lines; and the party subscriber lines being of the four-substation type. The party subscriber lines are arranged on a terminal per substation basis, thereby reducing the actual number of lines terminating at each exchange.

The various exchanges in each zone are interconnected by suitable groups of trunk lines; while at least one exchange in each zone is interconnected with at least certain of the exchanges in other zones by suitable groups of toll lines, as clearly indicated.

In the automatic telephone system the various local, trunk and toll calls are set up by automatic switching apparatus under the control of the subscriber substation equipment, including the usual calling device or dial. In order to facilitate the setting up of various connections, a mixed numbering scheme is utilized in the automatic telephone system, whereby all called subscriber substations in the various exchanges in the various zones of the system are dialed as listed in the directory. Accordingly, the directory number of each subscriber substation in the telephone system comprises a code portion, including either two or three digits, and a numerical portion, including four digits. More particularly, the directory number of each subscriber substation in zone 46 comprises a code portion including only the digits 4 and 6, in view of the fact that there is only one exchange in this zone; whereas, the directory number of each subscriber substation in zones 73, 62 and 38 comprises a code portion including three digits, in view of the fact there are a plurality of exchanges in each of these zones. Thus, it will be understood that the directory number of each subscriber substation in zone 38, for example, will comprise a code portion including the digits 3 and 8 and an additional digit identifying the particular exchange in zone 38, including the subscriber substation. Accordingly, the directory number of each subscriber substation in exchange 5 zone 38, for example, will comprise a code portion including the digits 3, 8 and 5. Further, it is pointed out that, in view of the fact that the party subscriber lines are arranged on a terminal per station basis, the directory number of each subscriber substation in each exchange in each zone comprises, in addition to the code portion, a numerical portion including only four digits; no suffix digits being necessary. In view of the above, it will be understood that the directory numbers of the various subscriber substations in the telephone system comprise different numbers of digits, the number of digits varying between 6 and 7, depending upon the particular zone of the exchange, including the subscriber substation.

*The apparatus incorporated in exchange 1 zone 38 of the telephone system*

Preferably, each exchange in the telephone system comprises apparatus substantially identical to that provided in exchange 1 zone 38, which apparatus, as best shown in Figs. 2 and 3, includes automatic switching equipment serving a maximum of 10,000 terminals; two of the terminals respectively terminating the private subscriber lines 401 and 404 and four of the terminals commonly terminating the party subscriber line 407. The switching equipment comprises a number of line switches individually associated with the subscriber lines terminating at exchange 1 zone 38, the line switches 30, 31 and 32 being respectively associated with the private subscriber lines 401 and 404 and the party subscriber line 407. At this point it is noted that the private subscriber line 401 has a private subscriber substation TP connected thereto which is rendered ordinary private subscriber substation service; the private subscriber line 404 has a private subscriber substation TX connected thereto which is rendered extended private subscriber substation service; while the party subscriber line 407 has four party subscriber substations TS1, TS2, TS3 and TS4 connected thereto which are rendered party subscriber substation service. Also, the switching equipment comprises a number of groups of primary selectors which are accessible to the various line switches. For example, the switching equipment comprises a group of primary selectors, including the primary selector 40, which is accessible to a number of line switches, including the line switches 30, 31 and 32. Each primary selector is provided with an individually associated finder switch having access to a group of primary registers, the finder switch F550 being individually associated with the primary selector 40.

Further, exchange 1 zone 38 is provided with a group of primary registers or register senders, including the primary register 50, which is accessible to the various finder switches individually associated with the primary selectors. Further, exchange 1 zone 38 is provided with a group of register translators or secondary registers, including the register translator 70, and a register translator allotter 60. The register translator allotter 60 comprises a finder switch F1160 having access to the group of register translators; and each register translator comprises a finder switch having access to the group of primary registers, the register translator 70 comprising the finder switch F1180 having access to the group of primary registers. At this point it is noted that the group of primary registers is larger than the group of register translators in order to effect a saving in equipment in view of the fact that the connection and arrangement of a primary register is much more simplified than the relatively complex connection and arrangement of a register translator. Also, exchange 1 zone 38 is provided with a local switch train comprising a number of first selectors, including the first selector 41, a number of groups of second selectors, one of the groups including the second selector 42, a number of groups of individual connectors, one of the groups including the individual connector 43, a number of special service selectors, including the special service selector 49, and a number of groups of party connectors, four of the groups respectively including the party connectors 45, 46, 47 and 48. A switchboard is also provided in exchange 1 zone 38 which includes a manual operator position 0, a toll operator position 110, an information operator position 113 and a miscellaneous operator position 112.

In addition to the apparatus described above, exchange 1 zone 38 is provided with toll ticketing apparatus comprising, in addition to the number of register translators including the register translator 70, a number of groups of toll ticket repeaters, one of the groups including the toll ticket repeater 90, a number of printer controllers, including the printer controller 92, a printer controller allotter 91, a number of toll ticket printers, including the toll ticket printer 95, and a printer allotter 93. Each printer controller comprises a finder switch having access to the toll ticket repeaters, the printing controller 92 comprising a finder switch F703 having access to the toll ticket repeaters; the printer controller allotter 91 comprises a finder switch F701 having access to the printer controllers; and the printer allotter 93 comprises a finder switch F704 having access to the printer controllers and a finder switch F705 having access to the toll ticket printers. Further, the toll ticketing apparatus comprises a date and time unit 94 and a detector 80, the detector 80 comprising a finder switch F2210 having access to the register translators. Also, extending from exchange 1 zone 38 are a number of groups of outgoing trunks to the other exchanges in zone 38, one of the groups including the trunk 711, a number of groups of outgoing toll lines to zones 62 and 73, one of the groups including the toll line 712, and a number of groups of incoming toll lines from zones 62 and 73, and trunks from the other exchanges in zone 38, one of the groups including the toll line or trunk 713.

In exchange 1 zone 38 the various primary selectors have access to the first selectors in the local switch train, to the special service selectors, to the outgoing trunks extending to the other exchanges in zone 38, to the manual operator position 0 and to the toll ticket repeaters; while the various special service selectors have access to the toll operator position 110, to the information operator position 113 and to the miscellaneous operator position 112. Also, the various first selectors in the local switch train have access to the different groups of second selectors; while the various groups of second selectors have access to a corresponding number of the groups of individual connectors and to a corresponding number of the groups of party connectors. For example, the group of second selectors, including the second selector 42, has access to the group of individual connectors, including the individual connector 43, and to the four groups of party connectors, respectively including the party connectors 45, 46, 47 and 48. Finally, each individual connector has access to an associated group of the private subscriber lines; and each party connector in each related group of four has access to an associated group of the party subscriber lines. For example, the individual connector 43 has access to a group of 100 private subscriber lines, including the private subscriber lines 401 and 404; while the four party connectors 45, 46, 47 and 48 each have access to 100 party subscriber lines, including the party subscriber line 407. At this point it is noted that each of the party connectors 45, 46, 47 and 48 is adapted to seize the party subscriber line 407 and respectively to project ringing current thereover having the respective frequencies in cycles per second of 66, 50, 33 and 16. Also, incoming selectors are provided, similar to the various first selectors 41 in the local switch train, each of which is individual to the toll lines in the groups of incoming toll lines from zones 62 and 73 and the trunks in the groups of incoming trunks from the other exchanges in zone 38.

Further it is noted that each toll ticket repeater in exchange 1 zone 38 is individually associated with one of the outgoing toll lines to zone 62 or 73, the toll ticket repeater 90 being individually associated with the outgoing toll line 712. Also, the detector 80 has access to each subscriber line terminating at exchange 1 zone 38; and the associated finder switch F2210 has access to each register translator in exchange 1 zone 38. Further, each printer controller in exchange 1 zone 38 is accessible to the printer controller allotter 91 therein and has access to each toll ticket repeater therein; similarly, each toll ticket printer in exchange 1 zone 38 is accessible to the printer allotter 93 therein; while the printer allotter 93 has access to each printer controller therein. Finally, the date and time unit 94 in exchange 1 zone 38 is accessible to each printer controller therein.

Each subscriber substation in exchange 1 zone 38 is provided with substation apparatus including a telephone instrument, a ringer and a calling device or dial. The calling device disposed at each private subscriber substation and at each first party subscriber substation is of conventional construction; while the calling device disposed at each second, third and fourth party subscriber substation is of special construction. More particularly, the calling device disposed at each second, third and fourth party subscriber substation is of the construction and arrangement of that disclosed in the copending application of John E. Ostline, Serial No. 404,103, filed July 26, 1941, now Patent No. 2,410,520, granted November 5, 1946.

Figure 4:
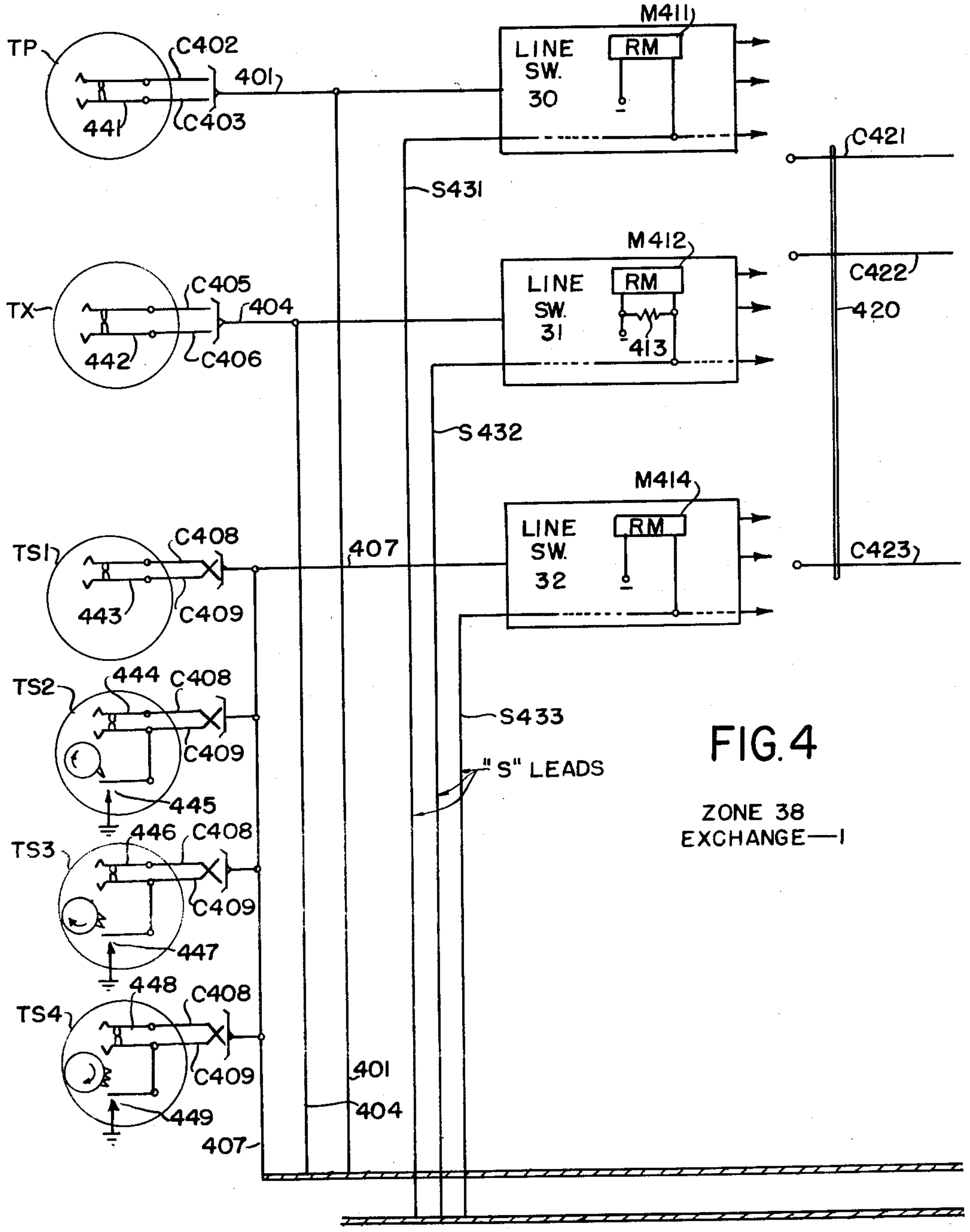

For example, the calling devices respectively disposed at the second party subscriber substation TS2, at the third party subscriber substation TS3 and at the fourth party subscriber substation TS4, connected to the party subscriber line 407, are of the special construction mentioned; each comprising, as best shown in Fig. 4, in addition to a set of impulse springs, a set of cam springs. In these calling devices the set of impulse springs is operated in accordance with the pull of the associated finger wheel in order to transmit a corresponding variable series of switch control impulses; while the set of cam springs is operated by an associated cam governed by the associated finger wheel in order to transmit a fixed number of substation identifying ground impulses. More specifically, when the finger wheel of the calling device at the second party subscriber substation TS2 is pulled in accordance with a digit of two or more the associated cam operates the set of cam springs to transmit one substation identifying ground impulse over the associated party subscriber line 407. Similarly, when the finger wheel of the calling device at the third party subscriber substation TS3 is pulled in accordance with a digit of two or more the associated cam operates the set of cam springs to transmit two substation identifying ground impulses over the associated party subscriber line 407. Finally, when the finger wheel of the calling device at the fourth party subscriber substation TS4 is pulled in accordance with a digit of two or more the associated cam operates the set of cam springs to transmit three substation identifying ground impulses over the associated party subscriber line 407.

Preferably, the line switches included in exchange 1 zone 38 are substantially identical; the line switches 30, 31 and 32 each comprising, as best shown in Fig. 4, rotary switching mechanism including a wiper set and a rotary magnet, and suitable control relays, not shown, connected and arranged in a conventional manner. At this point it is noted that in each line switch the rotary magnet has a predetermined resistance; and that in each line switch associated with a private subscriber line, which is rendered extended service, a resistance shunt is provided across the rotary magnet. For example, in the line switch 31 individually associated with the private subscriber line 404, which is rendered extended service, the resistance shunt 413 is bridged across the rotary magnet M412 as illustrated, for a purpose more fully explained hereinafter.

Figure 5:
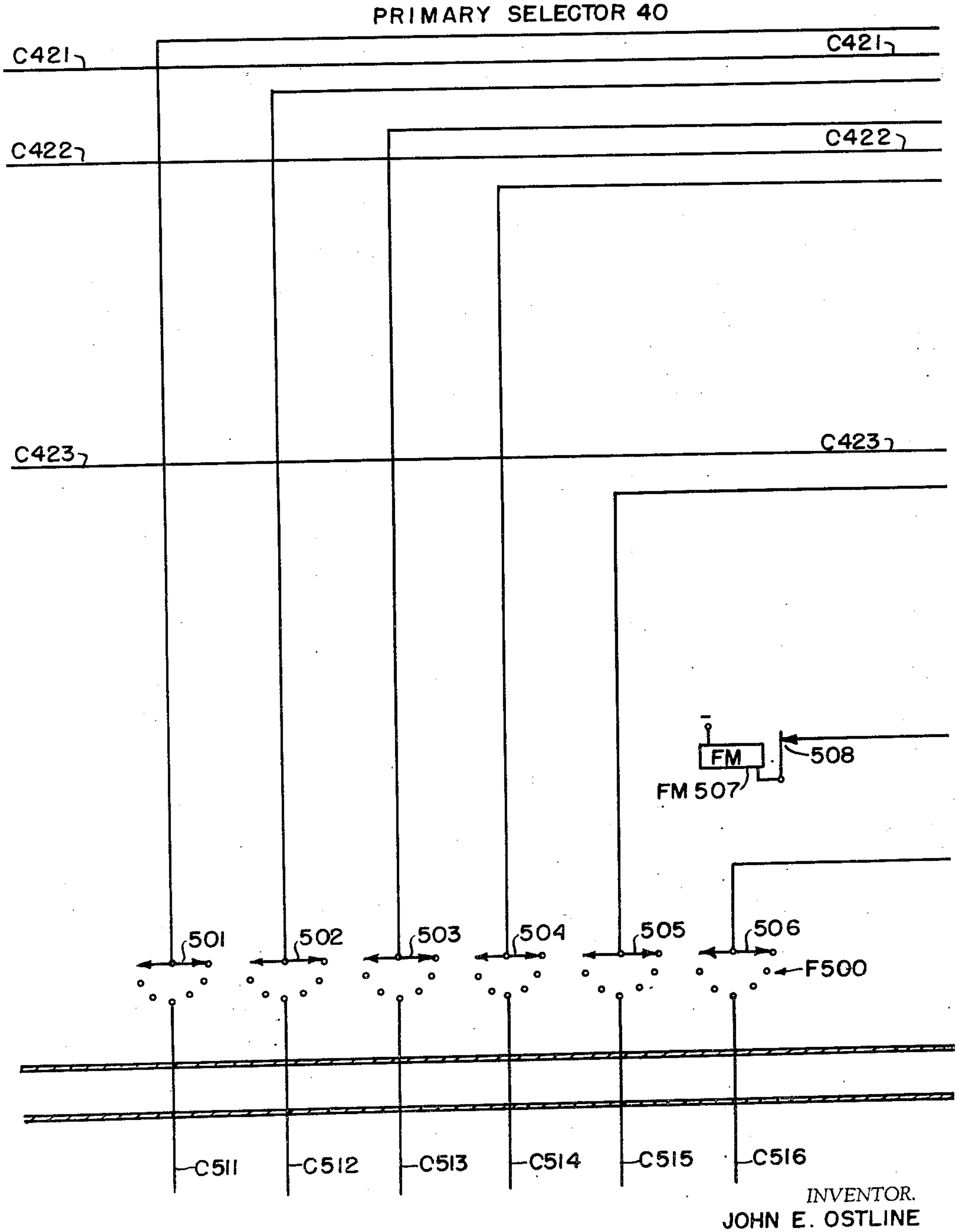
Figure 6:
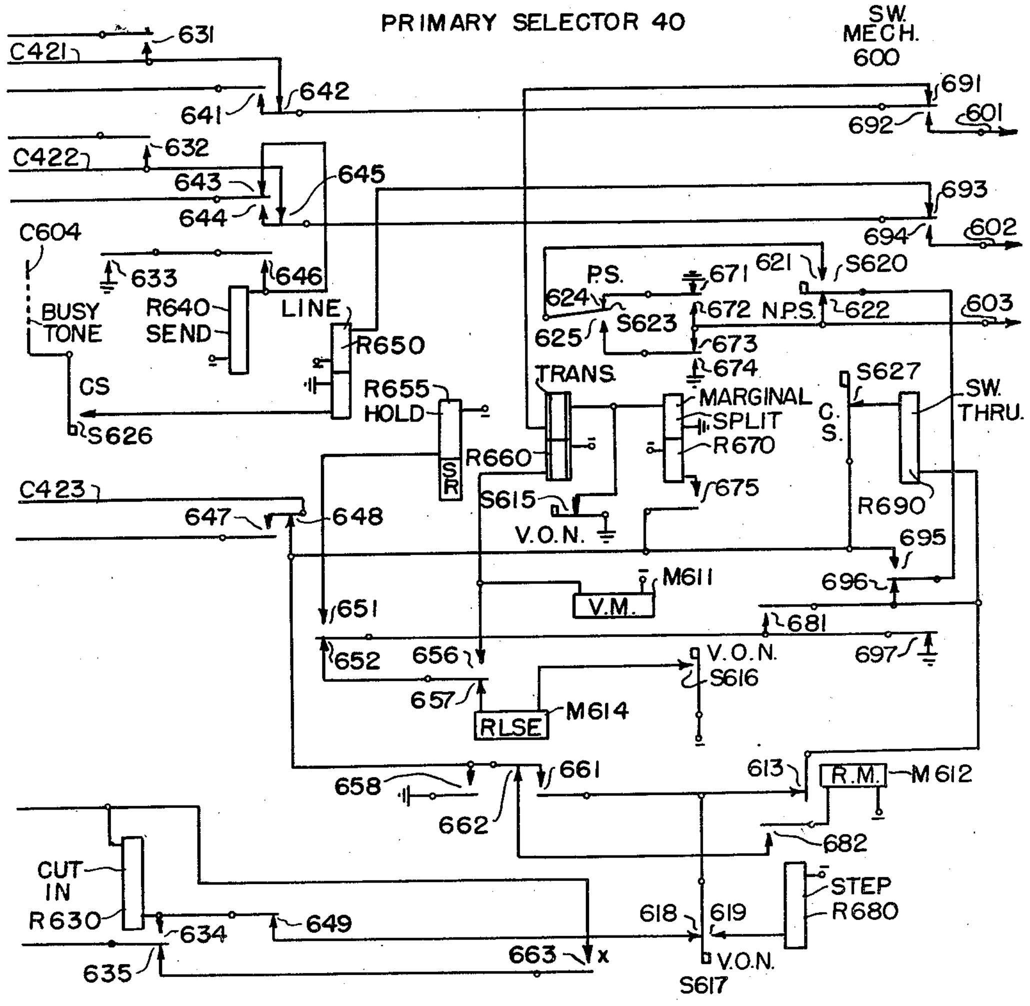
Figure 7:
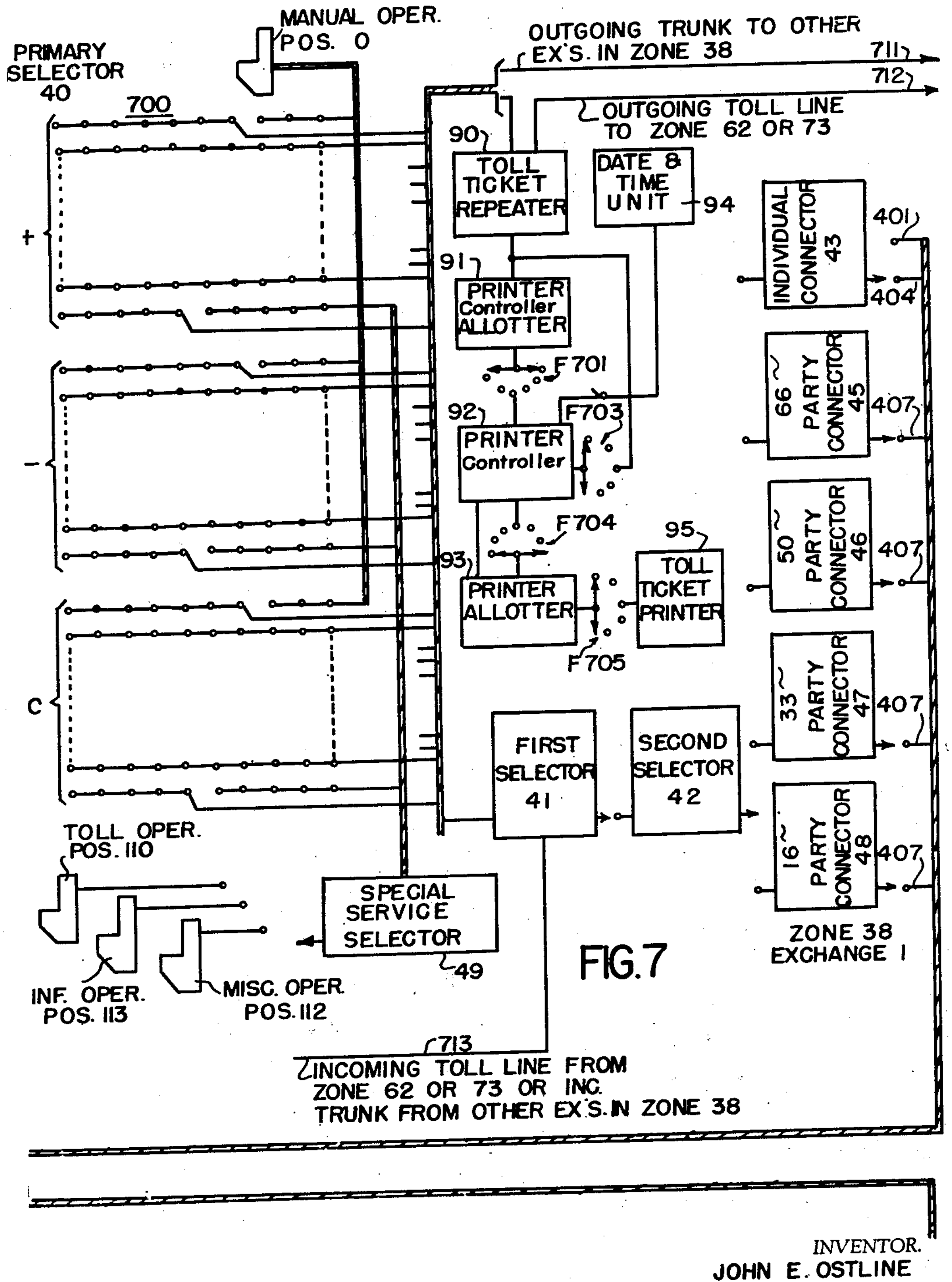
Figure 8:
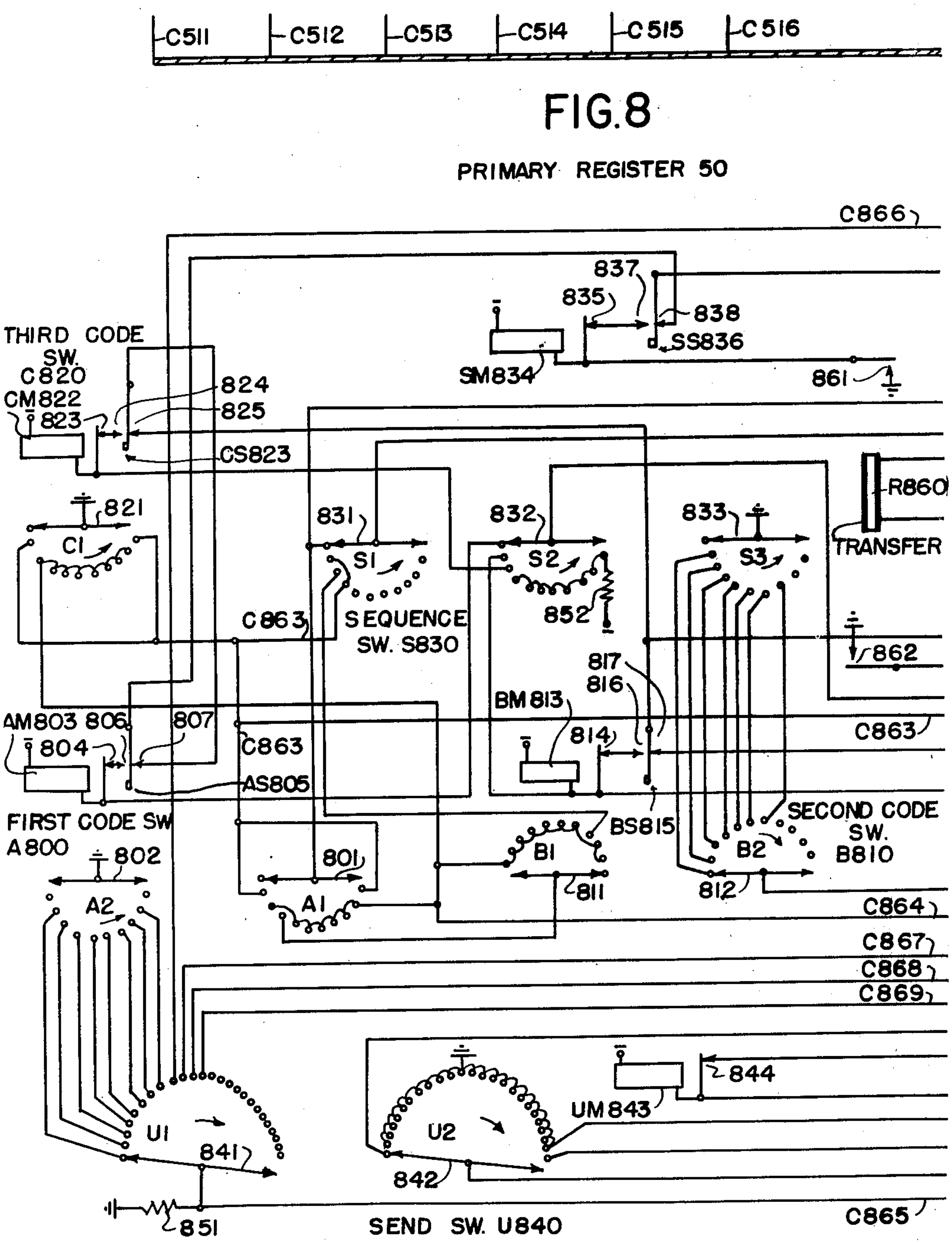
Figure 9:
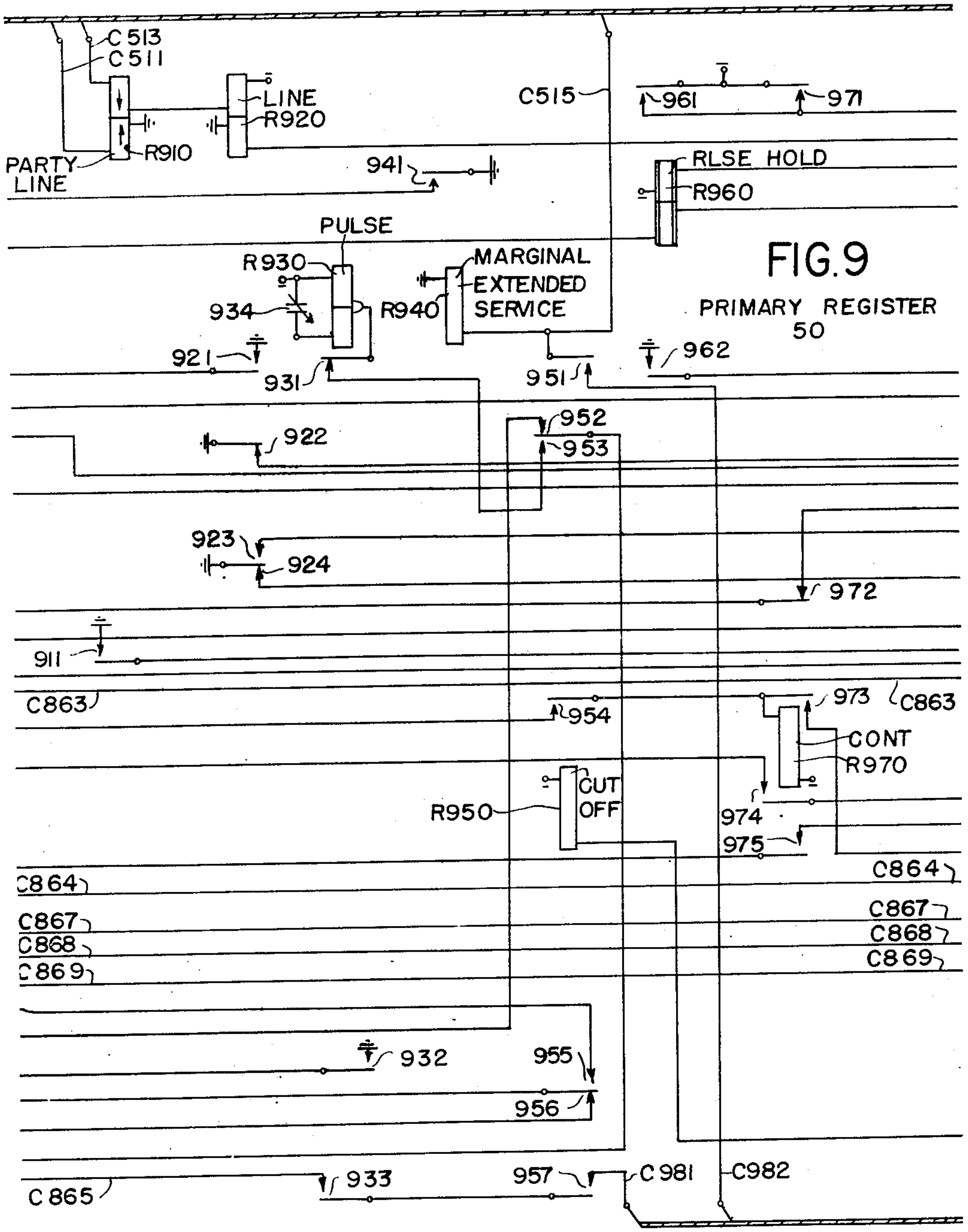
Figure 10:
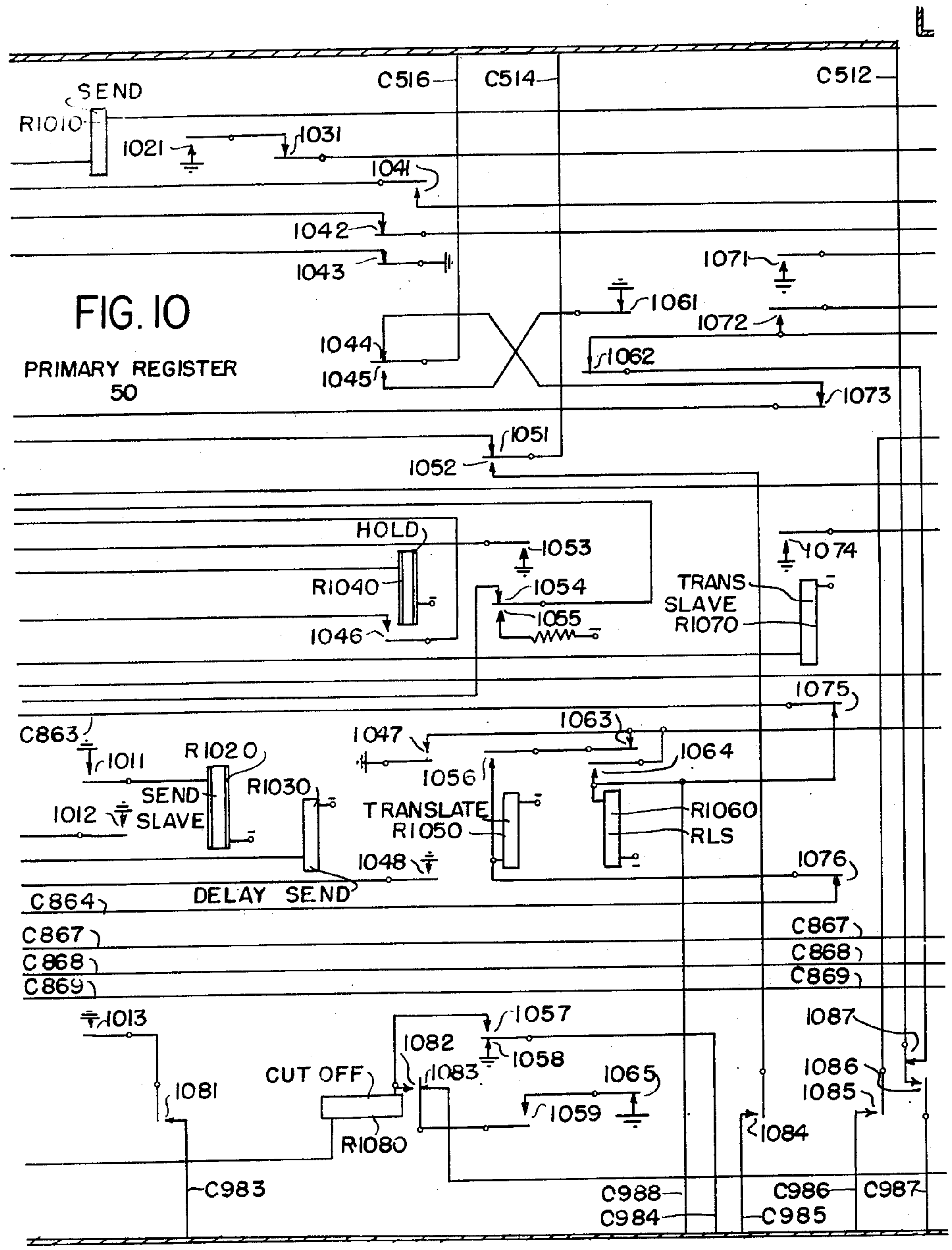

Preferably, each of the primary selectors included in exchange 1 zone 38 is identical to the primary selector 40 which comprises, as best shown in Figs. 5 to 7, inclusive, a switch mechanism 600, a relay group including a cut-in relay R630, a send relay R640, a line relay R650, a hold relay R655, a transfer relay R660, a split relay R670, a step relay R680 and a switch-through relay R690, and a circuit network connected and arranged in a manner more fully described hereinafter.

The switch mechanism 600 is of the Strowger split level type and of the construction and arrangement of that disclosed in the copending application of John E. Ostline, Serial No. 405,155, filed August 2, 1941, now Patent No. 2,315,010, granted March 30, 1943. More specifically, the switch mechanism 600 comprises a wiper set including the wipers 601, 602 and 603 and an associated contact bank 700; the contact bank 700 including ten vertically spaced-apart rows or levels of contact sets arranged in circumferentially spaced-apart relation. Also, the switch mechanism 600 comprises a vertical magnet M611 for driving the wiper set step by step in the vertical direction, a rotary magnet M612 for driving the wiper set step by step in the rotary direction, and a release magnet M614 for releasing the wiper set and for causing it to be returned to its normal vertical and rotary positions. Further there are associated with the switching mechanism 600 three sets of switch springs S615, S616 and S617 which are actuated when the wiper set is moved in the vertical direction away from its normal position, two sets of switch springs S626 and S627 which are actuated when the wiper set is moved in the rotary direction eleven steps away from its normal rotary position, a set of switch springs S620 which is actuated when the wiper set is moved in the vertical direction either one or ten steps away from its normal vertical position, and a set of switch springs S623 which is actuated when the wiper set is moved in the rotary direction a predetermined number of steps away from its normal rotary position after it has been previously moved in the vertical direction a predetermined number of steps away from its normal vertical position. More particularly, the set of switch springs S623 is actuated when the wiper set is moved six steps in the rotary direction away from its normal rotary position after it has been previously moved one step in the vertical direction away from its normal vertical position, or when the wiper set is moved eight steps in the rotary direction away from its normal rotary position after it has been previously moved ten steps in the vertical direction away from its normal vertical position.

The set of switch springs S623 is actuated, in the manner explained above, in view of the splitting of the first and tenth levels in the associated contact bank 700, the first level of the contact bank being split at the sixth contact set and the tenth level in the associated contact bank 700 being split at the eighth contact set. More particularly, in the contact bank 700 of the switching mechanism 600 the first five trunks in the first level extend to five first selectors included in the first group; the second five trunks in the first level extend to five special service selectors included in the group mentioned; the first seven trunks in the tenth level extend to seven first selectors included in the tenth group; the last three trunks in the tenth level extend to the manual operator position 0; while the ten trunks in each of the levels from 2 to 9 respectively extend to ten first selectors respectively included in the groups from 2 to 9.

Preferably, the finder switches in exchange 1 zone 38 and individually associated with the primary selectors are identical. For example, the finder switch F500 individually associated with the primary selector 40 comprises, as best shown in Fig. 5, a rotary switch including six wipers 501 to 506, inclusive, provided with individually associated contact banks, and a magnet FM507 for driving the wipers noted.

Preferably, each of the primary registers in exchange 1 zone 38 is identical to the primary register 50 which comprises, as best shown in Figs. 8 to 11, inclusive, a first code switch A800 of the rotary type, including two wipers 801 and 802 provided with individually associated contact banks, a magnet AM803 for driving the wipers noted, and a set of switch springs AS805 which is actuated when the wipers noted are moved away from their home positions; a second code switch B810 of the rotary type, including two wipers 811 and 812 provided with individually associated contact banks, a magnet BM813 for driving the wipers noted, and a set of switch springs BS815 which is actuated when the wipers noted are moved away from their home positions; and a third code switch C820 of the rotary type, including a single wiper 821 provided with an associated contact bank, a magnet CM822 for driving the wiper noted, and a set of switch springs CS823 which is actuated when the wiper noted is moved away from its home position. Also, the primary register 50 comprises a sequence switch S830 of the rotary type, including three wipers 831 to 833, inclusive, provided with individually associated contact banks, a magnet SM834 for driving the wipers noted, and a set of switch springs SS836 which is actuated when the wipers noted are moved away from their home positions; and a send switch U840 of the rotary type, including two wipers 841 and 842, provided with individually associated contact banks, and a magnet UM843 for driving the wipers noted.

Further the primary register 50 comprises a relay group, including a transfer relay R860, a party line relay R910, a line relay R920, a pulse relay R930, an extended service relay R940, two cutoff relays R950 and R1080, a hold relay R960, a control relay R970, a send relay R1010, a send slave relay R1020, a delay send relay R1030, a hold relay R1040, a translate relay R1050, a release relay R1060, a transfer slave relay R1070, a digit cutoff relay R1110, three party relays R1120, R1130 and R1140, and a control network connected and arranged in a manner more fully described hereinafter.

Finally, the primary register 50 comprises a mechanical impulse repeater 1170 of the general construction and arrangement of that disclosed in U. S. Patent No. 2,188,461, McClew and Woodland, granted January 30, 1940. More particularly, the mechanical impulse repeater 1170 comprises, as best shown in Fig. 11, a receive magnet RM1171, a mark magnet MM1172, a send magnet SM1173, a mechanism, not shown, operated by the magnets mentioned, a set of impulse springs S1178 and a set of switch springs S1177.

In the primary register 50 the code switches A800, B810 and C820 are adapted respectively to register the first, second and third code digits of a called directory number; while the sequence switch S830 is arranged to select the code switches A800, B810 and C820 in sequence, for purpose of registration. Each of the code switches A800, B810 and C820 is arranged to determine, as far as possible, in accordance with the code digit registered therein whether the call may be completed under the direct control of the calling device at the calling subscriber substation or must be translated by a register translator. Finally, by the time the third code digit is registered in the third code switch C820 the code switches mentioned have determined whether the call may be completed under the direct control of the calling device at the calling subscriber substation or must be translated by a register translator. In the event the call may be completed under the direct control of the calling device at the calling subscriber substation, the code switches mentioned effect the release of the primary register 50; on the other hand, in the event the call must be translated by a register translator, the code switches mentioned effect the association of an idle register translator with the primary register 50.

The sender switch U840 is arranged to send to the associated register translator the first code digit registered in the first code switch A800, the extended service marking as determined by the operated position of the extended service relay R940, and the party subscriber substation marking as determined by the operated positions of the three party relays R1120, R1130 and R1140. Finally, the mechanical impulse repeater 1170 is arranged to register, to store and to transmit to the associated register translator the second and third code digits and the four numerical digits transmitted to the primary register 50.

Figure 11:
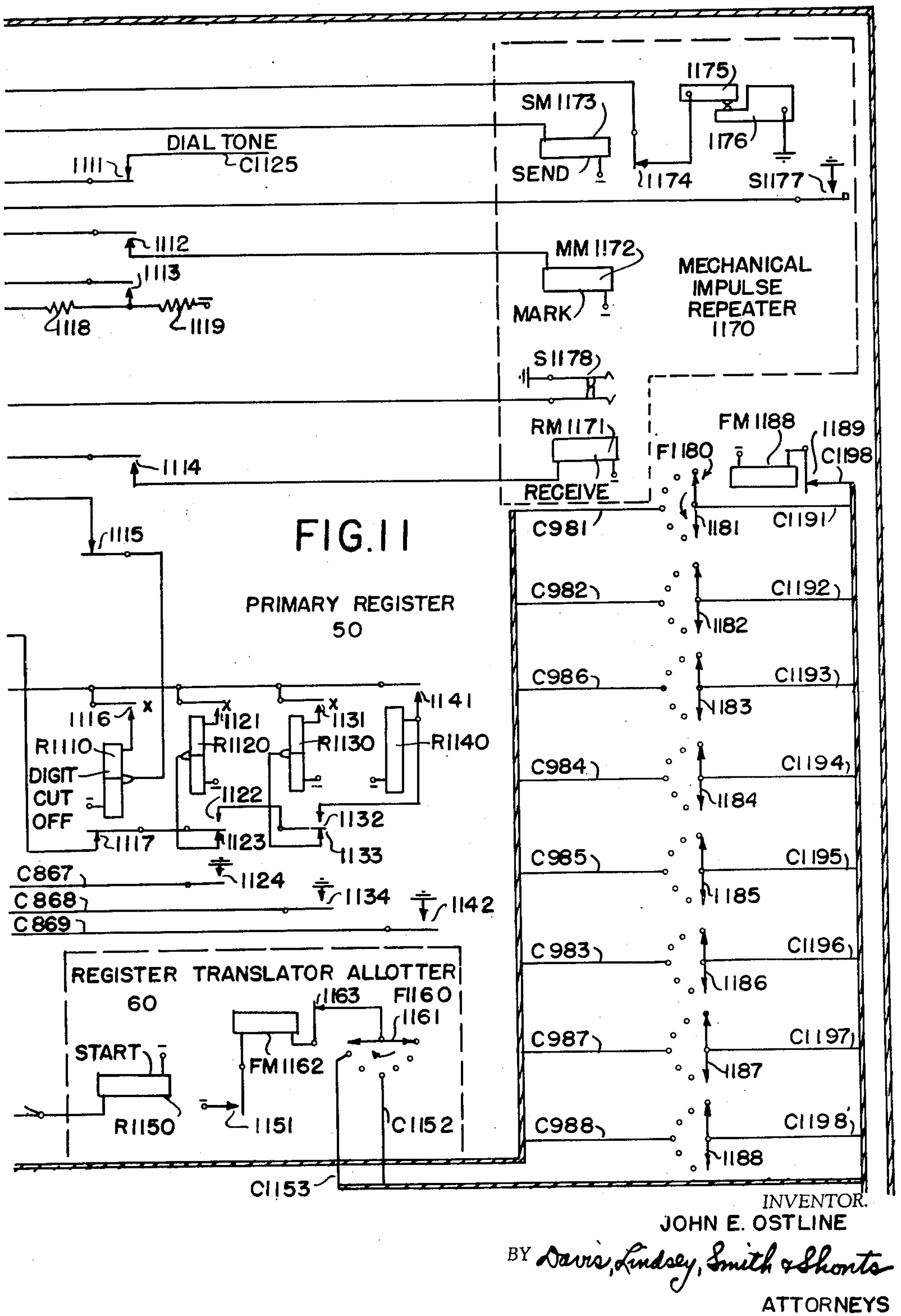
Figure 12:
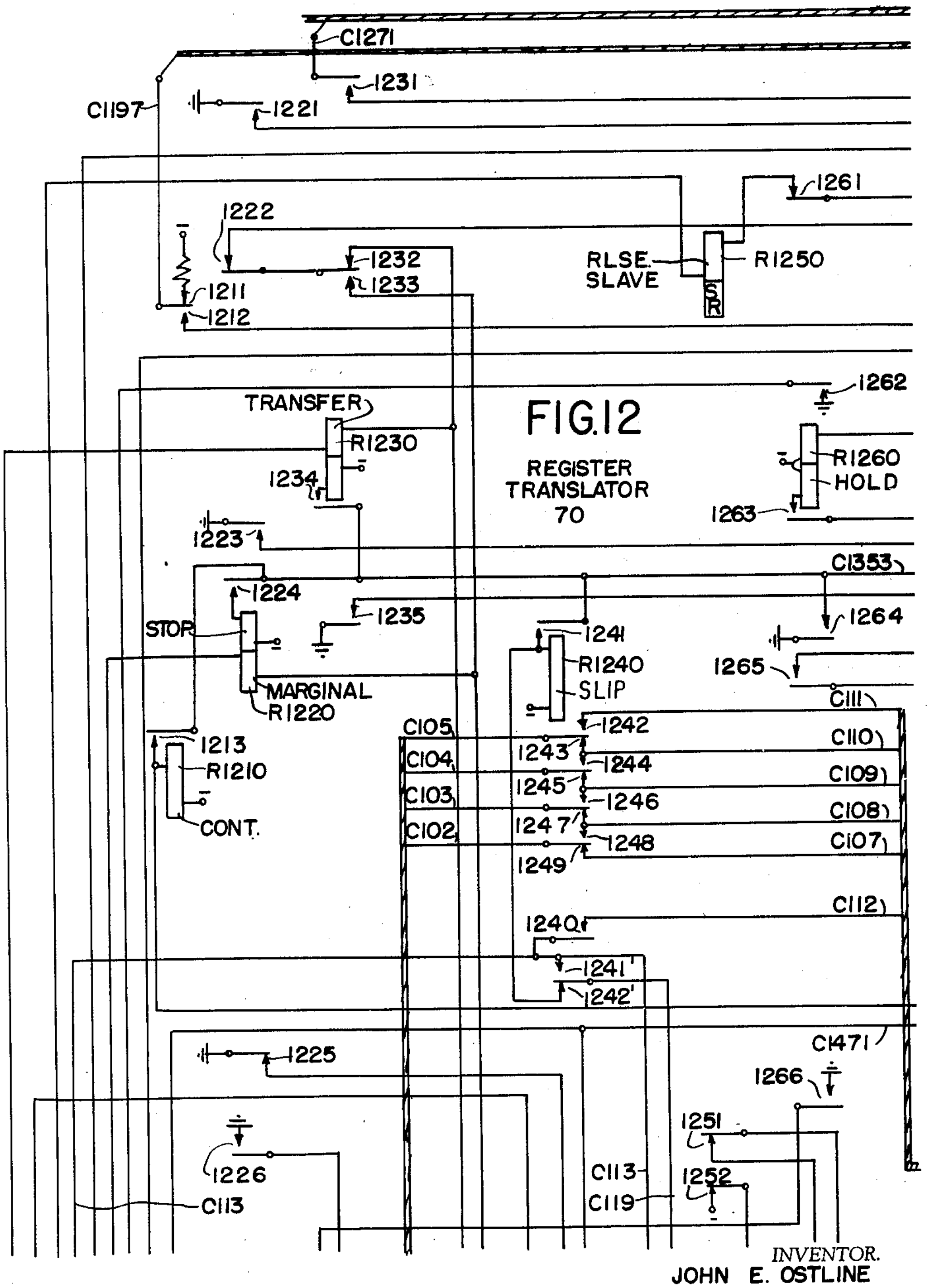
Figure 13:
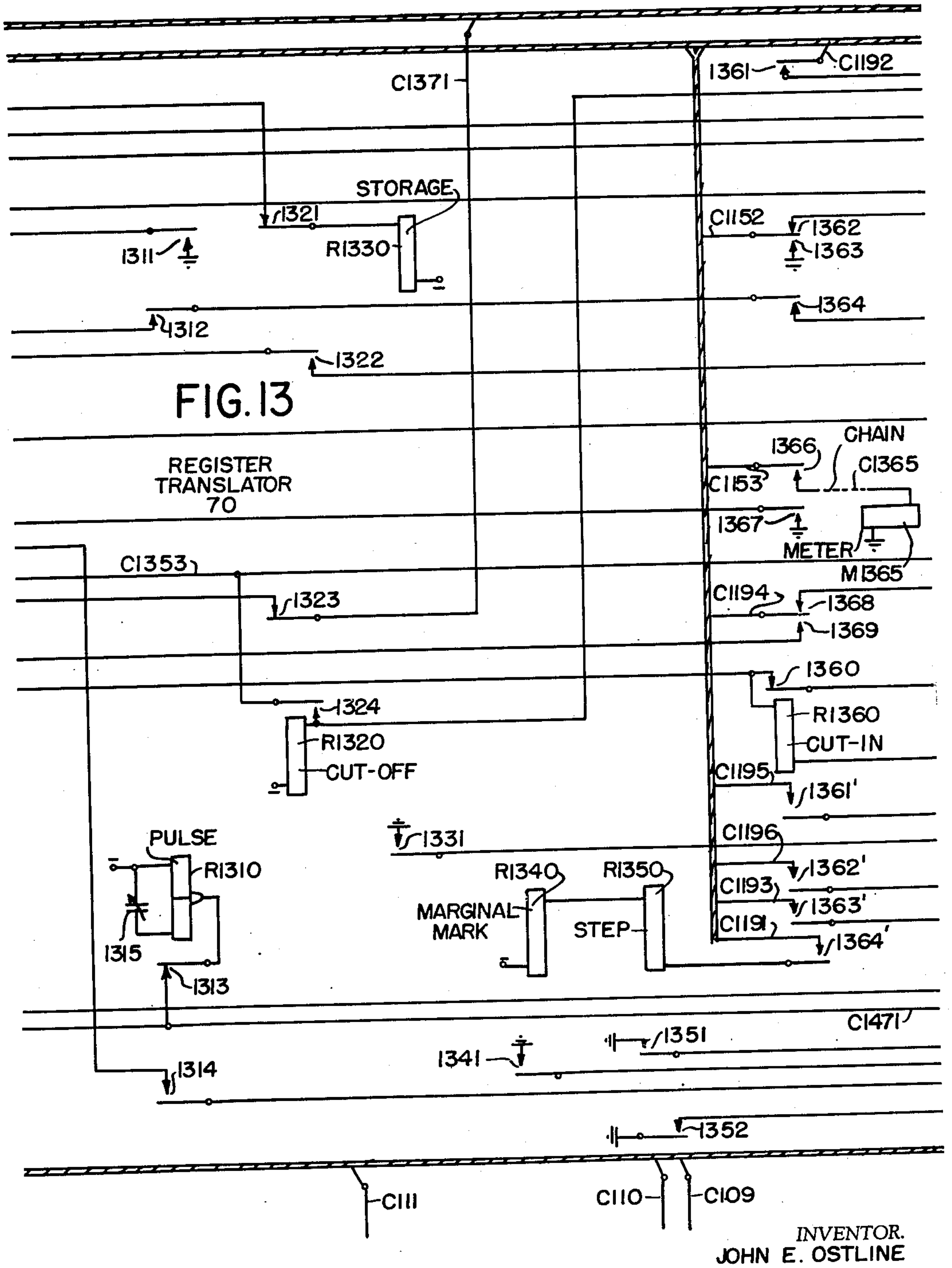
Figure 14:
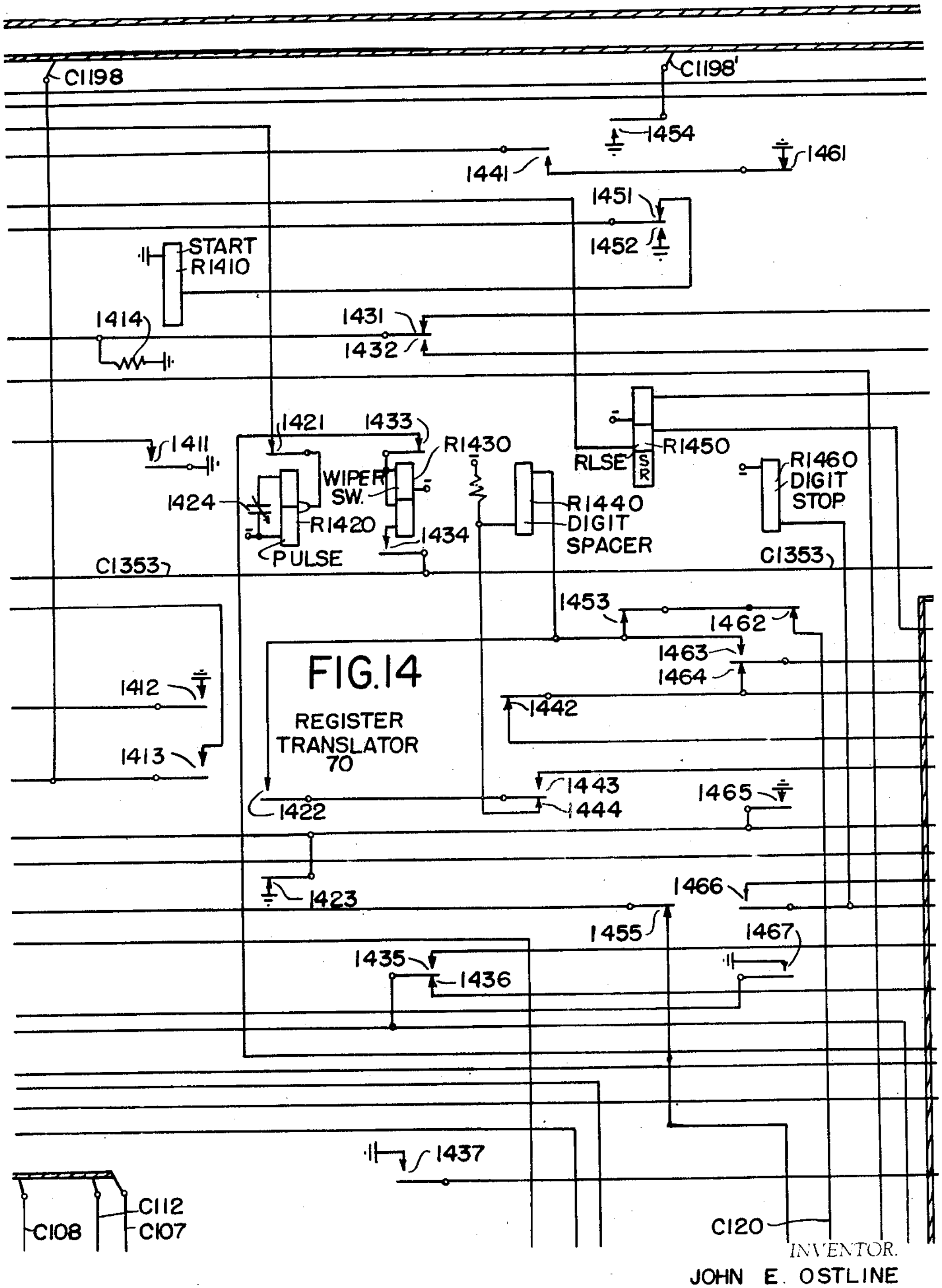

The register translator allotter 60 provided in exchange 1 zone 38 comprises, as best shown in Fig. 11, a finder switch F1160 of the rotary type, including a single wiper 1161 provided with an associated contact bank, and a magnet FM1162 for driving the wiper noted. Also, the register translator allotter 60 comprises a start relay R1150 and a control network connected and arranged in a manner more fully explained hereinafter.

Preferably, the finder switches in exchange 1 zone 38 and individually associated with the register translator are identical. For example, the finder switch F1180 individually associated with the register translator 70 is of the rotary type and includes, as best shown in Fig. 11, eight wipers 1181 to 1188, inclusive, provided with individually associated contact banks, and a magnet FM1188 for driving the wipers noted.

Preferably, each of the register translators included in exchange 1 zone 38 is identical to the register translator 70 which comprises, as best shown in Figs. 12 to 19, inclusive, a first code switch A1710 of the rotary type, including three wipers 1711 to 1713, inclusive, provided with individually associated contact banks, a magnet AM1714 for driving the wipers noted, and a set of switch springs AS1716 which is actuated when the wipers noted are moved away from their home positions; a second code switch B1720 of the rotary type, including two wipers 1721 and 1722 provided with individually associated contact banks, a magnet BM1723 for driving the wipers noted, and a set of switch springs BS1726 which is actuated when the wipers noted are moved away from their home positions; and a third code switch C1730 of the rotary type, including three wipers 1731 to 1733, inclusive, provided with individually associated contact banks, a magnet CM1734 for driving the wipers noted, and a set of switch springs CS1737 which is actuated when the wipers noted are moved away from their home positions. Also, the register translator 70 comprises a first numerical switch D1740 of the rotary type, including three wipers 1741 to 1743, inclusive, provided with individually associated contact banks, a magnet DM1745 for driving the wipers noted, and a set of switch springs DS1747 which is actuated when the wipers noted are moved away from their home positions; a second numerical switch E1750 of the rotary type, including three wipers 1751 to 1753, inclusive, provided with individually associated contact banks, a magnet EM1754 for driving the wipers noted, and a set of switch springs ES1756 which is actuated when the wipers noted are moved away from their home positions; a third numerical switch F1810 of the rotary type, including three wipers 1811 to 1813, inclusive, provided with individually associated contact banks, a magnet FM1814 for driving the wipers noted, and a set of switch springs FS1816 which is actuated when the wipers noted are moved away from their home positions; and a fourth numerical switch G1820 of the rotary type, including three wipers 1821 to 1823, inclusive, provided with individually associated contact banks, a magnet GM1824 for driving the wipers noted, and a set of switch springs GS1825 which is actuated when the wipers noted are moved away from their home positions.

Further, the register translator 70 comprises a register sequence switch S1840 of the rotary type, including two wipers 1841 and 1842, provided with individually associated contact banks, a magnet SM1843 for driving the wipers noted, and a set of switch springs SS1845 which is actuated when the wipers noted are moved away from their home positions; a station switch UB1830 of the rotary type, including a single wiper 1831 provided with an associated contact bank, a magnet UBM1832 for driving the wipers noted, and a set of switch springs UBS1834 which is actuated when the wiper noted is moved away from its home position; a storage transfer switch U1910 of the rotary type, including four wipers 1911 to 1914, inclusive, provided with individually associated contact banks, a magnet UM1915 for driving the wipers noted, and a set of switch springs US1917 which is actuated when the wipers noted are moved away from their home positions; a sender switch K1920 of the rotary type, including three wipers 1921 to 1923, inclusive, provided with individually associated contact banks, a magnet KM1924 for driving the wipers noted, and a set of switch springs KS1926 which is actuated when the wipers noted are moved away from their home positions; and a digit sequence switch N1610 of the rotary type, including three wipers 1611 to 1613, inclusive, provided with individually associated contact banks, a magnet NM1614 for driving the wipers noted, and a set of switch springs NS1616 which is actuated when the wipers noted are moved away from their home positions.

Also, the register translator 70 comprises a composite code switch P1640 of the Strowger type, provided with a wiper set including eight wipers 1641 to 1648, inclusive, and an associated contact bank; the associated contact bank comprising ten vertically spaced-apart rows or levels of contact sets, each level of contact sets including ten circumferentially spaced-apart individual contact sets. Also, the Strowger mechanism comprises a vertical magnet PM1650 for driving the wiper set step by step in the vertical direction and a rotary magnet PM1651 for driving the wiper set step by step in the rotary direction. Further, there is associated with the Strowger mechanism a set of switch springs PS1652 which is actuated when the wiper set is moved in the vertical direction away from its normal vertical position.

Further, the register translator 70 comprises a rate and route switch R1620 of the Strowger type, including a wiper set provided with eight wipers 1621 to 1628, inclusive, and an associated contact bank; the associated contact bank comprising ten vertically spaced-apart rows or levels of contact sets, each level of contact sets including ten circumferentially spaced-apart individual contact sets. Also, the Strowger mechanism comprises a vertical test wiper 1629 which is moved only in the vertical direction by the wiper set and an associated vertical test contact bank. Further, the Strowger mechanism comprises a vertical magnet RM1630 for driving the wiper set step by step in the vertical direction and a rotary magnet RM1631 for driving the wiper set step by step in the rotary direction. Further, there is associated with the Strowger mechanism a set of switch springs RS1632 which is actuated when the wiper set is moved in the vertical direction away from its normal vertical position. Also, it is noted that a jumper field is arranged between the contact banks of the composite code switch P1640 and the rate and route switch R1620, for a purpose more fully explained hereinafter.

Figure 19:
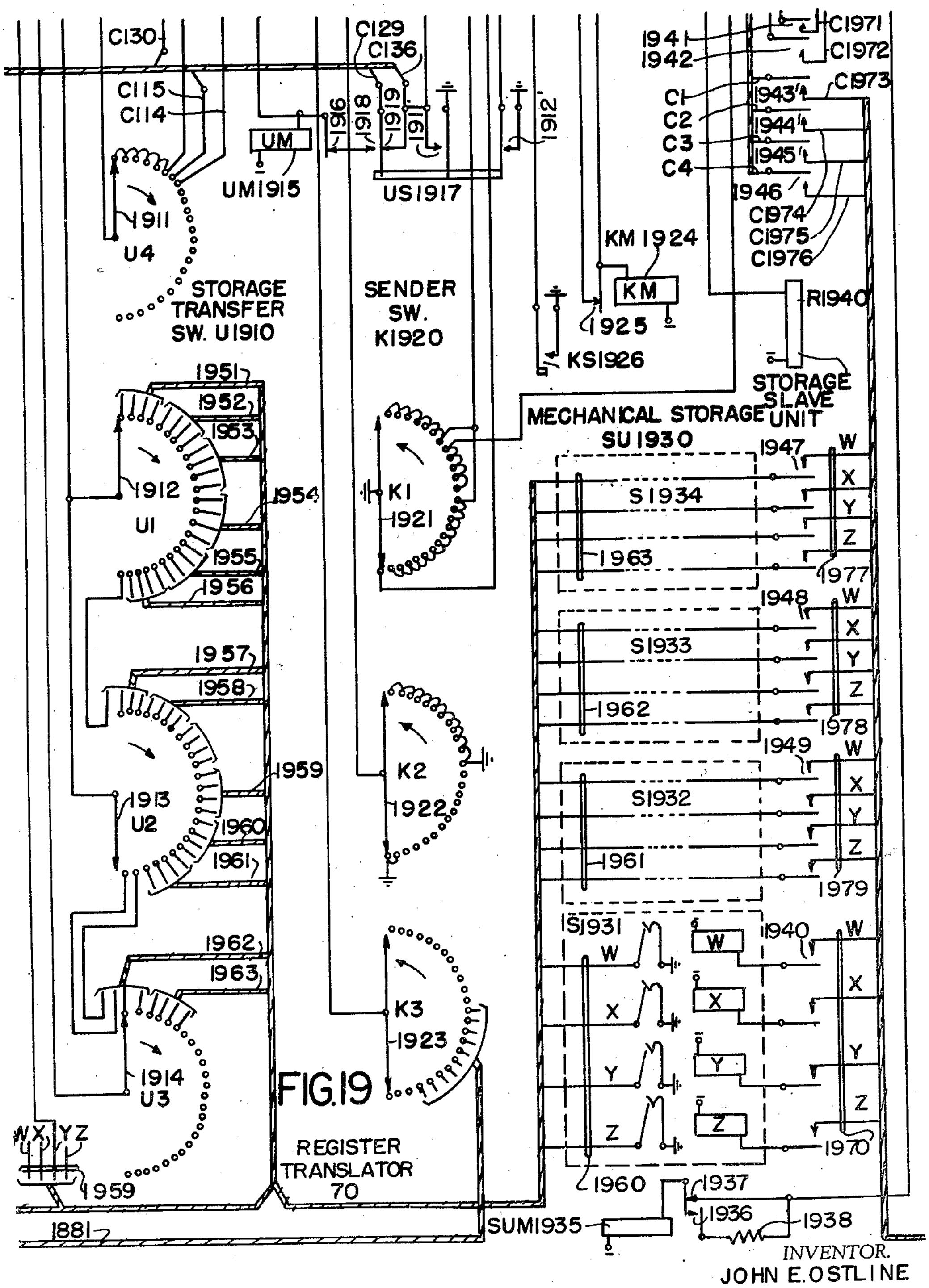
Figure 20:
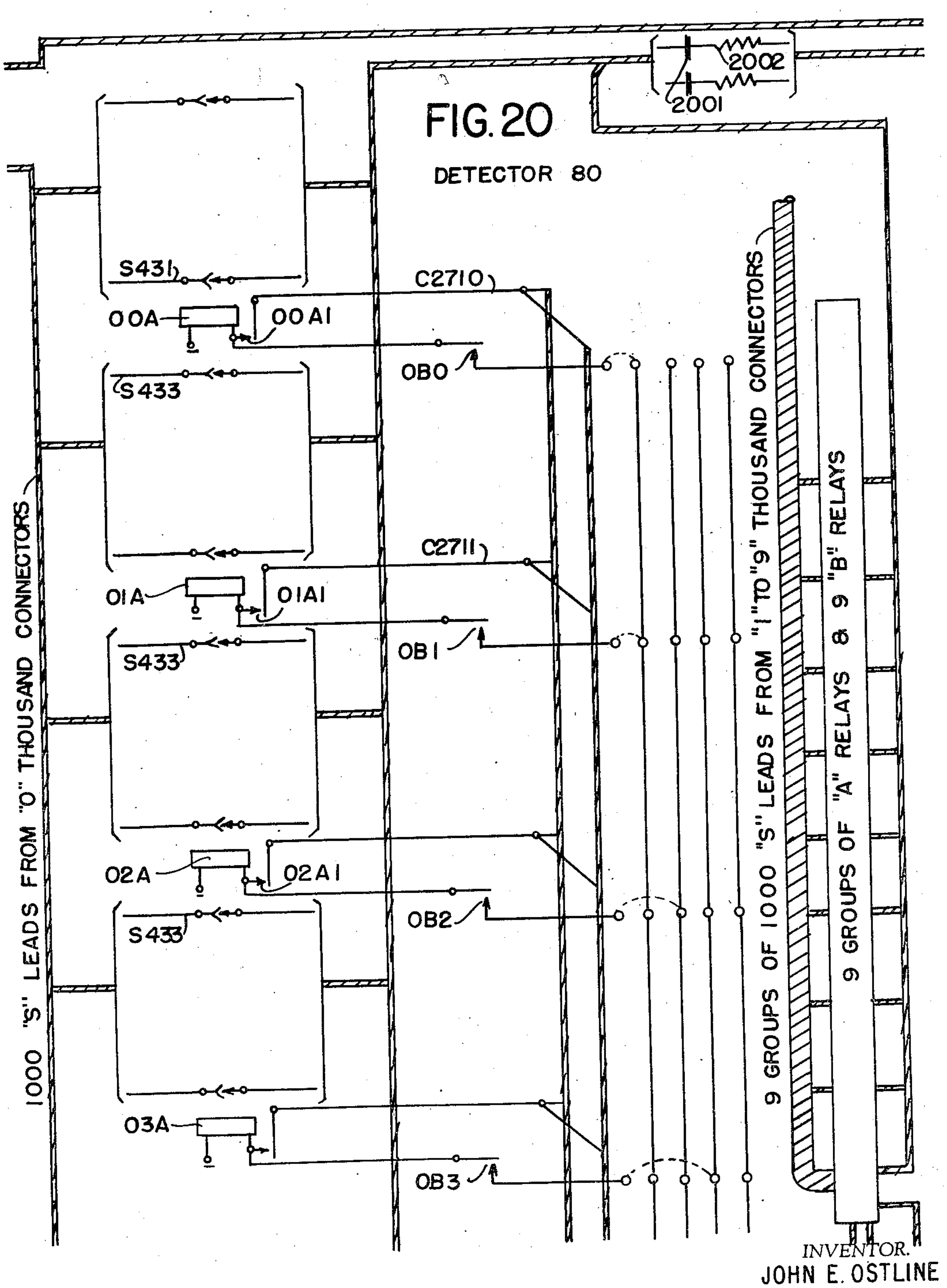
Figure 21:
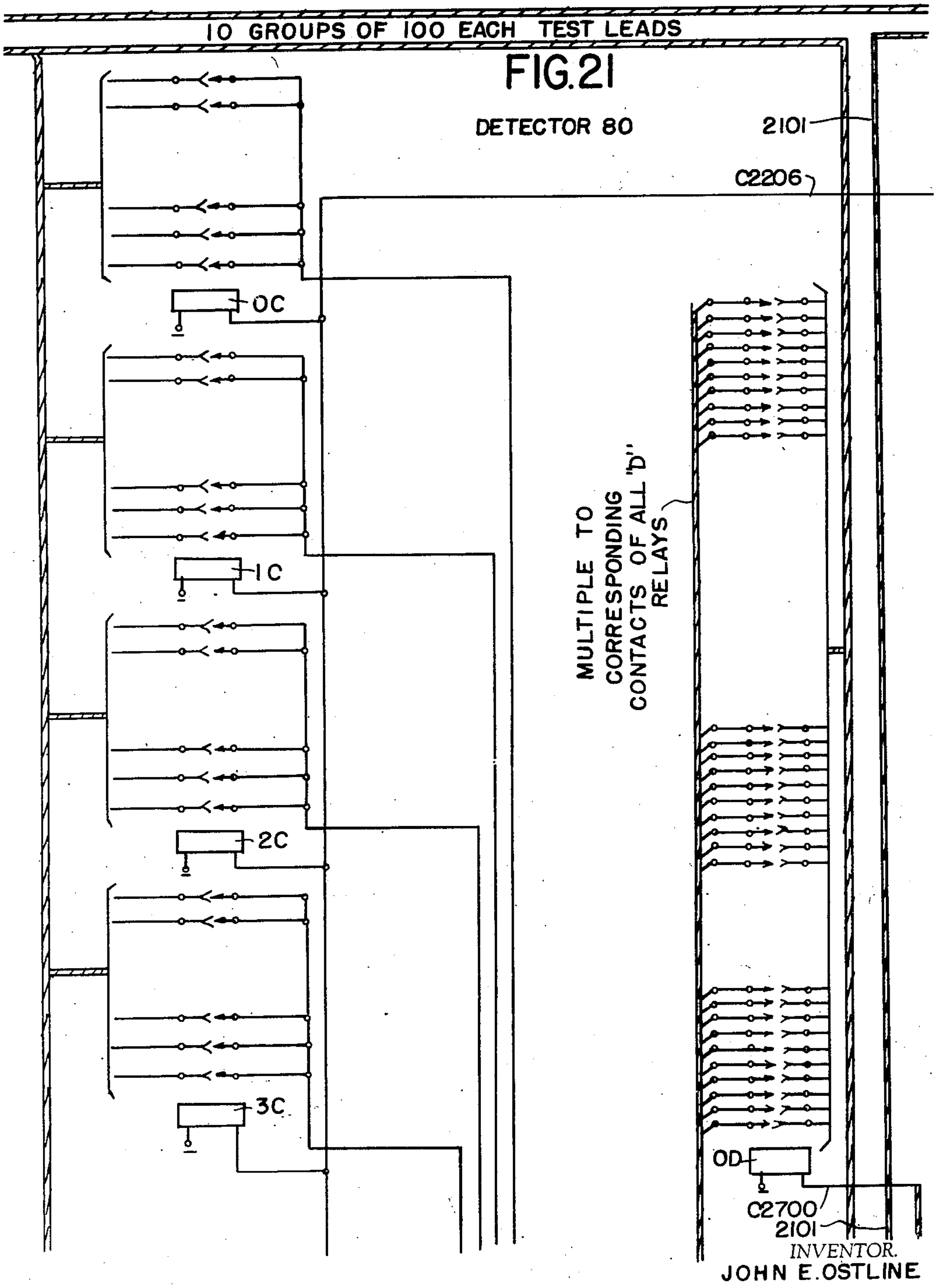
Figure 22:
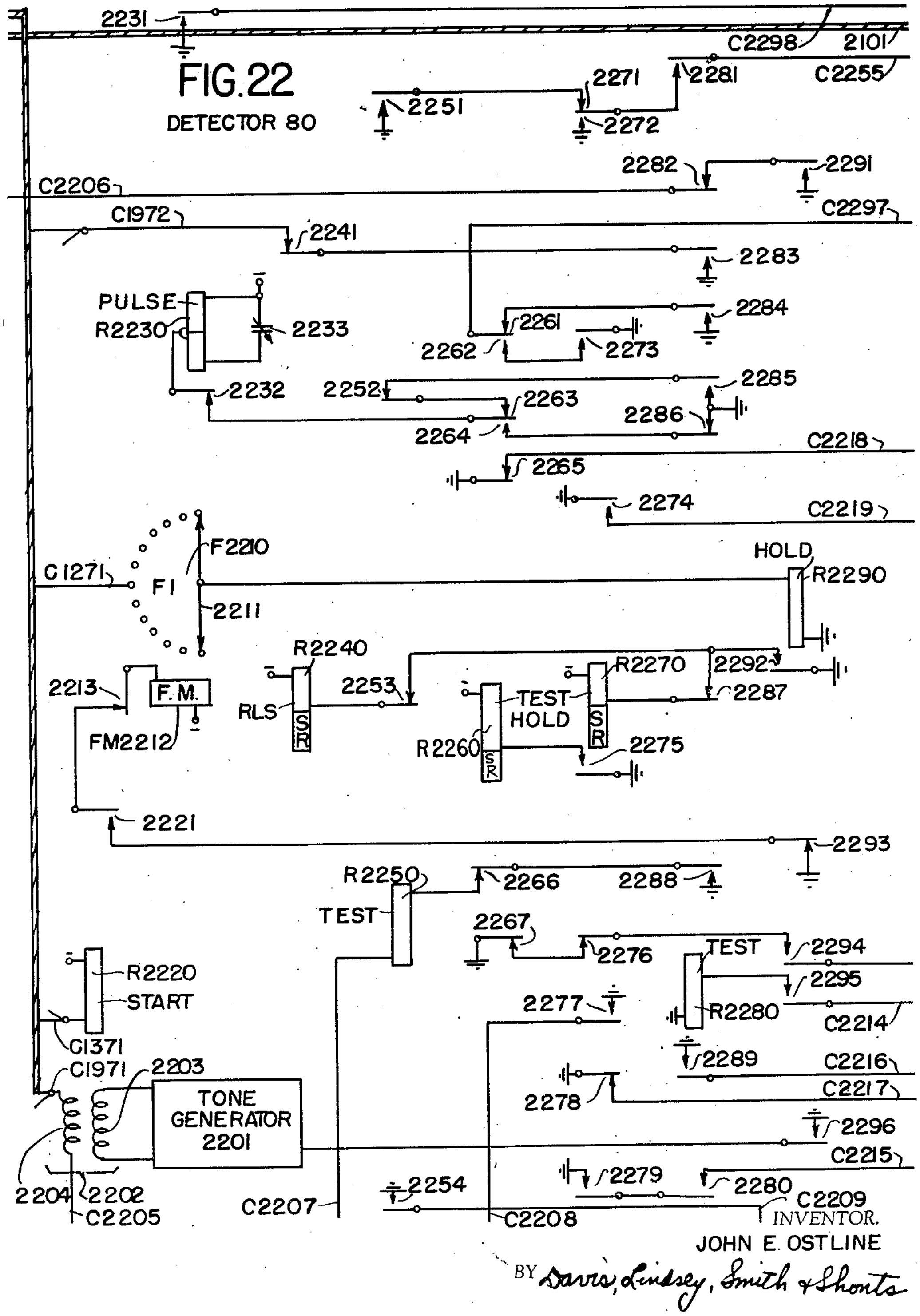
Figure 23:
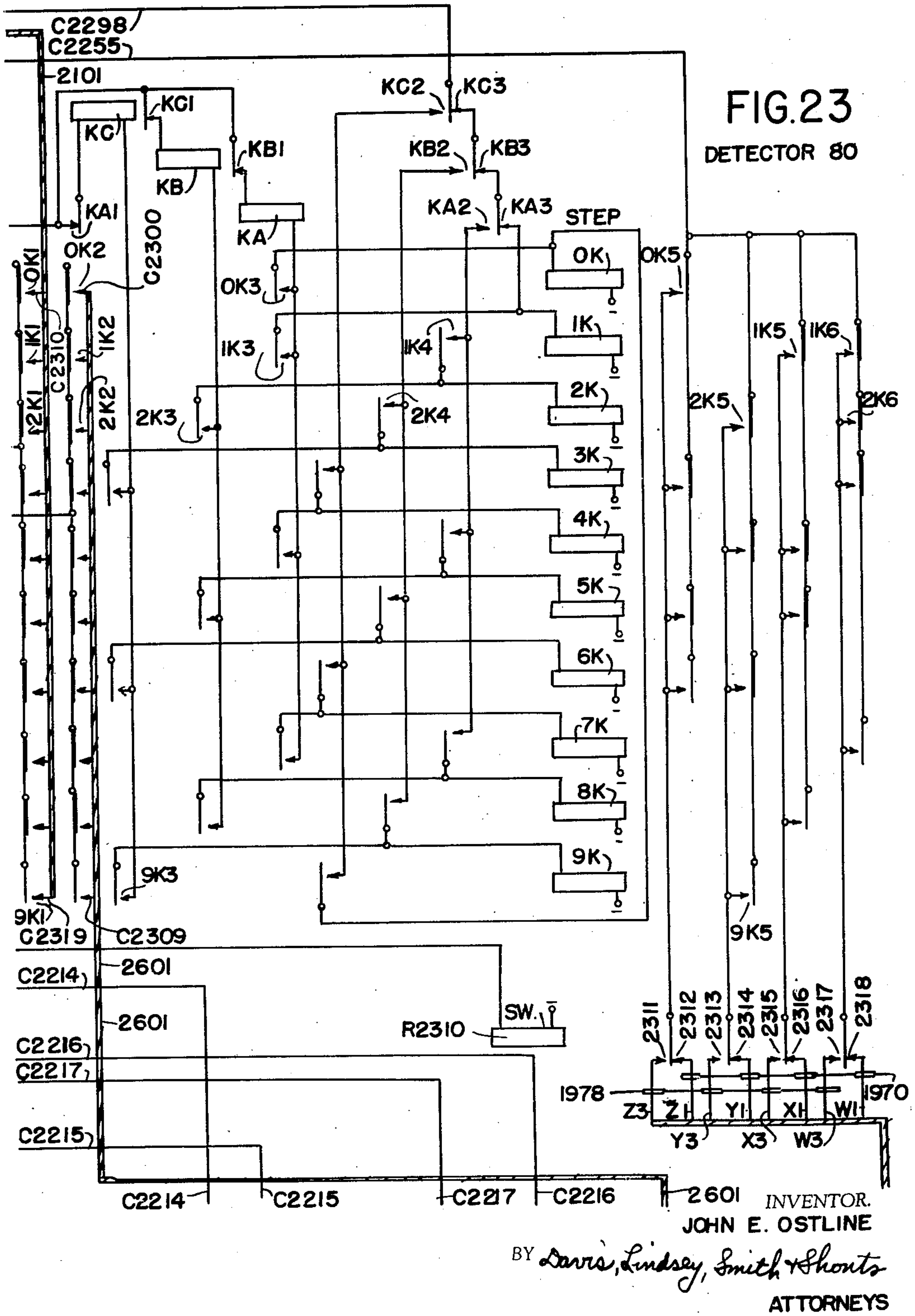
Figure 24:
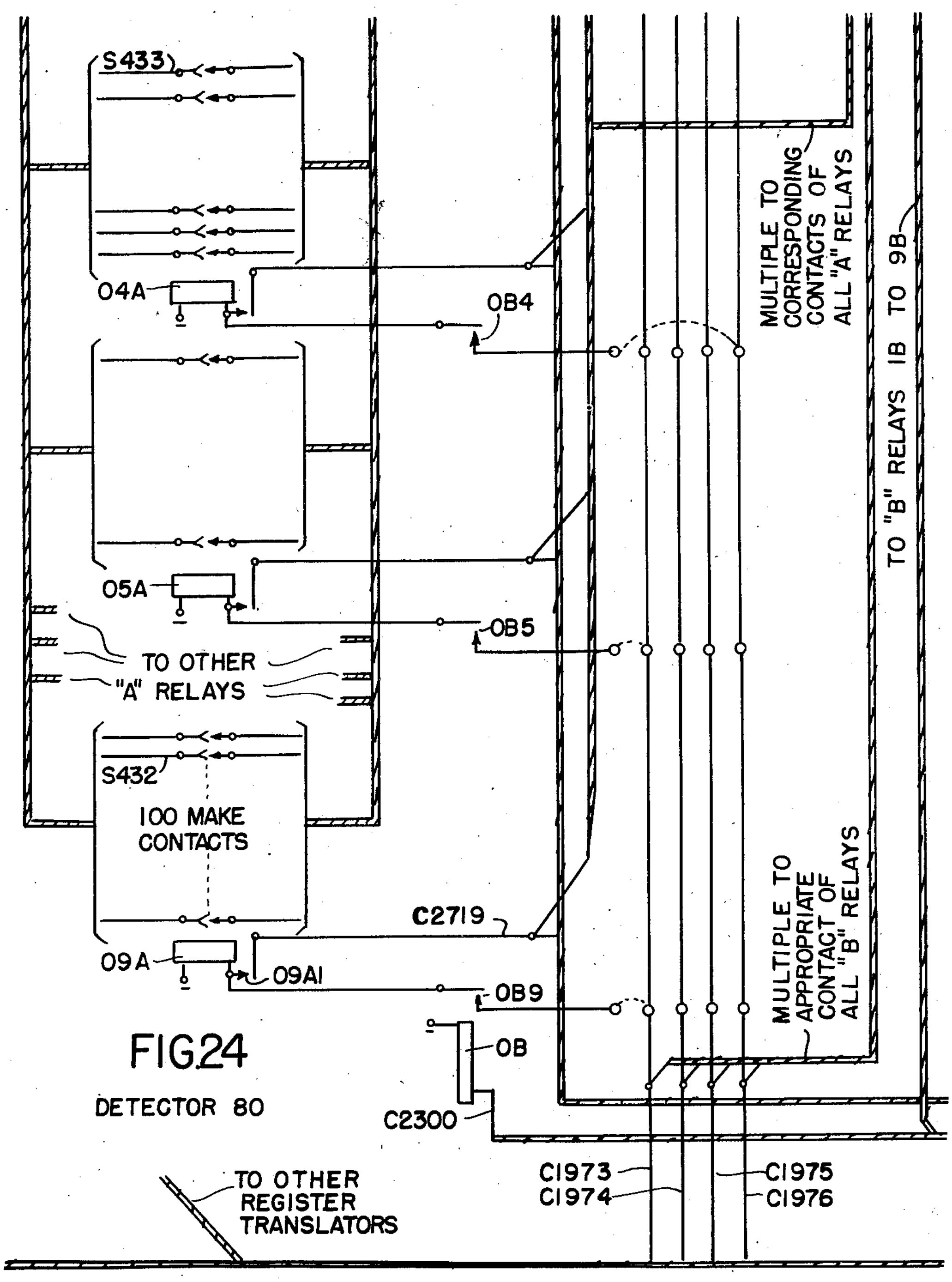
Figure 25:
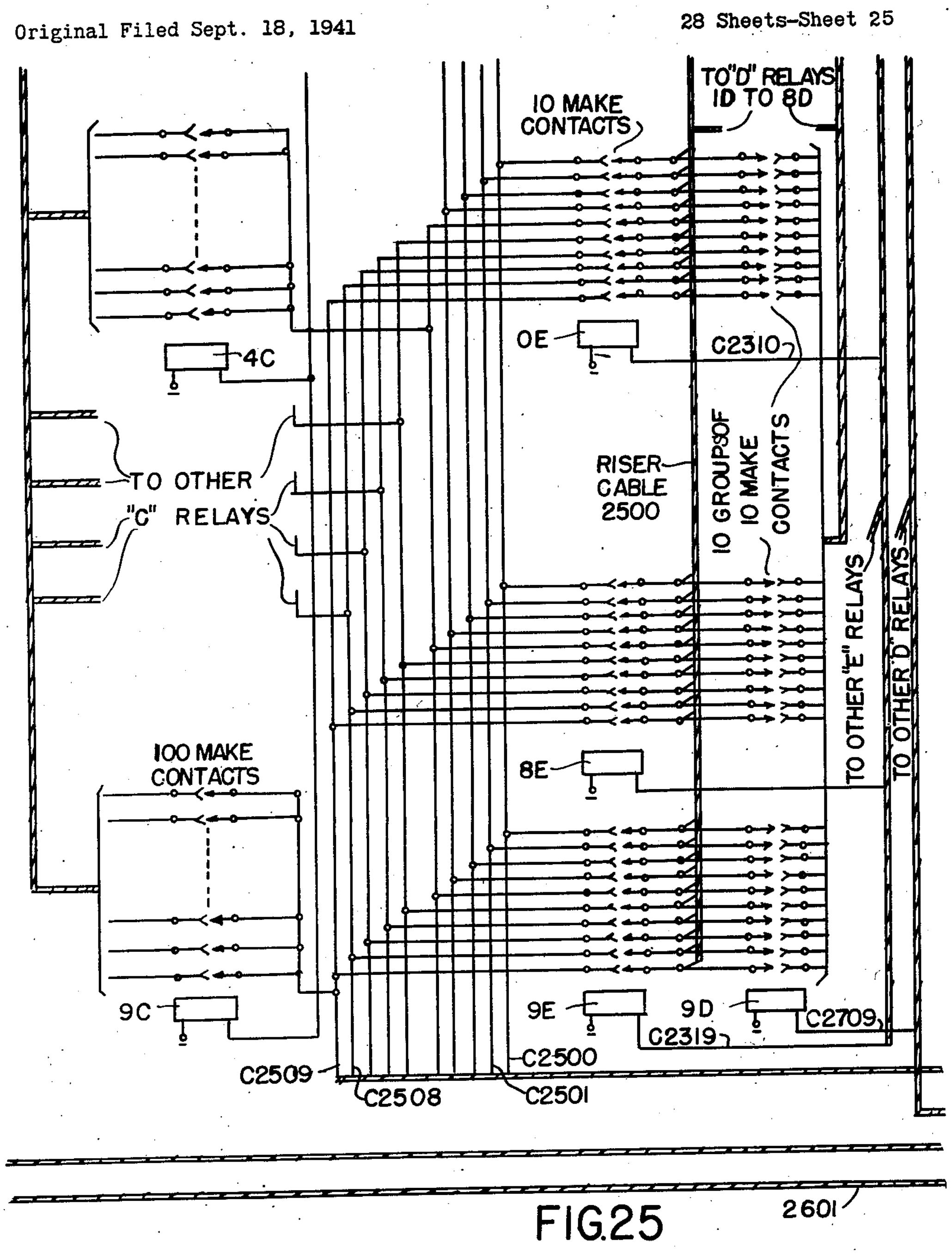

Further, the register translator 70 comprises a mechanical storage unit SU1930 which includes, as best shown in Fig. 19, four code storage devices S1931 to S1934, inclusive, and a master magnet SUM1935. Each of the code storage devices includes four unit or WXYZ magnets. The mechanical storage unit SU1930 is of the construction and arrangement of that disclosed in the copending application of John E. Ostline, Serial No. 334,886, filed May 13, 1940, now Patent No. 2,292,471, granted August 11, 1942.

Finally, the register translator 70 comprises a relay group including a control relay R1210, a stop relay R1220, a transfer relay R1230, a slip relay R1240, a release slave relay R1250, a hold relay R1260, two pulse relays R1310 and R1420, a cutoff relay R1320, a storage relay R1330, a mark relay R1340, a step relay R1350, a cut-in relay R1360, a start relay R1410, a wiper switching relay R1430, a digit spacer relay R1440, a release relay R1450, a digit stop relay R1460, a first digit relay R1510, an extended service relay R1520, three party relays R1530, R1540 and R1550, and a storage slave relay R1940, and a control network connected and arranged in a manner more fully described hereinafter.

In the register translator 70 the code switches A1710, B1720 and C1730 are adapted respectively to register the first, second and third code digits of a called directory number; and the first, second, third and fourth numerical switches D1740, E1750, F1810 and G1820 are adapted respectively to register the first, second, third and fourth numerical digits of a called directory number. Thus, the code switches A1710, B1720 and C1730 taken together comprise a first code register adapted to register a code comprising N digits, wherein $N=3$; while the numerical switches D1740, E1750, F1810 and G1820 taken together comprise a second register adapted to register a number comprising M digits, wherein $M=4$.

The station switch UB1830 is arranged to control the registration in the first code switch A1710 to govern the extended service relay R1520 and the three party relays R1530, R1540 and R1550; the register sequence switch S1840 is arranged to select the code switches B1720 and C1730 and the numerical switches D1740, E1750, F1810 and G1820 in sequence, for purposes of registration; while the digit sequence switch N1610 is arranged to control the sequence of transmitting the digits from the register translator 70, some of these digits being registered in the rate and route switch R1620 and other of these digits being registered in the numerical switches D1740, E1750, F1810 and G1820. The impulse sender switch K1920 is arranged to control the actual number of impulses transmitted in each numerical digit transmitted from the register translator 70; while the storage transfer switch U1910 is arranged to transmit code digits from the register translator 70, these code digits being registered in the rate and route switch R1620, the code switches A1710, B1720 and C1730, the numerical switches D1740, E1750, F1810 and G1820, the extended service relay R1520 and the mechanical storage unit SU1930. Finally, the composite code switch P1640 is controlled in accordance with the digits stored in the code switches A1710, B1720 and C1730 and governs the operation of the rate and route switch R1620.

The detector 80 included in exchange 1 zone 38 has access to 10,000 terminals and comprises, as best shown in Figs. 20 to 27, inclusive, ten groups of A relays, each group of A relays including ten individual A relays. The tenth group of A relays mentioned is illustrated and comprises the individual A relays 00A to 09A, inclusive, and is associated with the 1000 S leads from the 0 thousand connectors. Each A relay comprises 100 make contacts, whereby a given A relay in the tenth group is operated to connect the corresponding 100 S leads in the 0 thousand group to the detector 80 for test purposes.

At this point it is noted that the S lead S431 extends to the line switch 30 individually associated with the private subscriber line 401 and is accessible to the 00A relay included in the tenth group of A relays; whereby the directory number of the private subscriber line 401 includes the digits 00 and the directory number of the private subscriber substation TP connected to the private subscriber line 401 may be 0099. Similarly, the S lead S432 extends to the line switch 31 individually associated with the private subscriber line 404 and is accessible to the 09A relay included in the tenth group of A relays; whereby the directory number of the private subscriber line 404 includes the digits 09 and the directory number of the private subscriber substation TX connected to the private subscriber line 404 may be 0901. Finally, the S lead S433 extends to the line switch 32 individually associated with the party subscriber line 407 and is accessible to the 01A, 02A, 03A and 04A relays included in the tenth group of A relays; whereby the directory number of the party subscriber line 407 includes the digits 01, 02, 03 or 04 and the directory numbers of the party subscriber substations TS1, TS2, TS3 and TS4 connected to the party subscriber line 407 may be, respectively, 0100, 0200, 0300 and 0400.

Also, the detector 80 comprises 1,000 test leads arranged in ten groups of 100 each, each A relay in each group of 10 being operative to connect the associated group of 100 S leads to the associated group of 100 test leads.

Further, the detector 80 comprises ten B relays 0B to 9B, inclusive, individually associated with the corresponding groups of A relays, the tenth B relay 0B being individually associated with the tenth group of A relays 00A to 09A, inclusive. Further, the detector 80 comprises four hold conductors C1973, C1974, C1975 and C1976 which are suitably multipled to make contacts provided on the various B relays. More particularly, the first hold conductor C1973 is multipled via contacts of appropriate ones of the B relays to the windings of the various ones of the A relays in each group corresponding to the private subscriber substations and to the first party subscriber substations; while the second, third and fourth hold conductors C1974, C1975 and C1976, respectively, are multipled via contacts of appropriate ones of the B relays to the windings of the various ones of the A relays in each group respectively corresponding to the second, third and fourth party subscriber substations. For example, the first hold conductor C1973 is multipled via the contacts 0B0, 0B5 and 0B9 to the windings of the A relays 00A, 05A and 09A, respectively, corresponding to groups of private subscriber substations, respectively including the private subscriber substations TP, etc., and TX, and via the contacts 0B1 to the winding of the A relay 01A, corresponding to a group of first party subscriber substations, including the first party subscriber substation TS1; similarly, the second, third and fourth hold conductors C1974, C1975 and C1976, respectively, are multipled via the contacts 0B2, 0B3 and 0B4 to the windings of the A relays 02A, 03A and 04A, respectively, corresponding to groups of second, third and fourth party subscriber substations, respectively including the party subscriber substations TS2, TS3 and TS4.

Further, the detector 80 comprises ten C relays 0C to 9C, inclusive, respectively corresponding to the ten groups of 100 test leads, and ten test conductors C2500 to C2509, inclusive. Each C relay is operative to connect the corresponding group of 100 test leads to the corresponding one of the test conductors. For example, the ninth C relay 9C is operative to connect the ninth group of 100 test leads to the ninth test conductor C2509. Also, the detector 80 comprises ten D relays 0D to 9D, inclusive, respectively corresponding to the ten groups of 100 test leads, and ten E relays 0E to 9E, inclusive. Each D relay is operative to connect the corresponding group of 100 test leads to 100 riser conductors included in an associated riser cable 2500; while each E relay is operative to connect a corresponding group of ten riser conductors in the riser cable 2500 to the ten corresponding test conductors C2500 to C2509, inclusive. For example, when the ninth D relay 9D and the ninth E relay 9E are operated the ninth group of 100 test leads are connected to the corresponding 100 riser conductors in the riser cable 2500 and the ninth group of ten riser conductors in the riser cable 2500 are respectively connected to the ten test conductors C2500 to C2509, inclusive.

Further, the detector 80 comprises ten amplifiers 0AMP to 9AMP, respectively connected to the ten test conductors C2500 to C2509, inclusive, and ten test stop relays 0R to 9R, inclusive, respectively associated with the ten amplifiers 0AMP to 9AMP, inclusive. Also, the detector 80 comprises ten test mark relays 0T to 9T, inclusive, ten test lock relays 0S to 9S, inclusive, ten step relays 0K to 9K, inclusive, and three cycle relays KC, KB and KA. Further, the detector 80 comprises a finder switch F2210 of the rotary type, including a single wiper 2211 and an associated contact bank, and a magnet FM2212 for driving the wiper noted. Also, the detector 80 comprises a tone generator 2201, a relay group including a start relay R2220, a pulse relay R2230, a release relay R2240, two test relays R2250 and R2280, two test hold relays R2260 and R2270, a hold relay R2290 and a switch relay R2310, and a control network connected and arranged in a manner more fully described hereinafter.

Finally, the detector 80 comprises four groups of marking leads 1970, 1979, 1978 and 1977 of the WXYZ type, which are respectively utilized for purposes of marking the first, second, third and fourth digits of a detected directory number. More particularly, the WXYZ conductors in the first and third groups of marking leads 1970 and 1978 are marked by the various step relays 0K to 9K, inclusive; while the WXYZ conductors in the second and fourth groups of marking leads 1979 and 1977 are respectively marked by the various test lock relays 0S to 9S, inclusive, and by the various test mark relays 0T to 9T, inclusive.

More particularly, it is pointed out that the WXYZ conductors in each of the groups of marking leads 1970 to 1977, inclusive, are marked in accordance with a code arrangement. For example, the various step relays 0K to 9K, inclusive, mark the WXYZ conductors in the first group of marking leads 1970 in accordance with the particular thousand digit of the directory number of the calling subscriber line terminating at exchange 1 zone 38 and detected by the detector 80 and in accordance with the following code:

| Particular Thousand Digit | Marked WXYZ Conductors in the First Group of Marking Leads 1970 |
|---|---|
| 1 | W-X |
| 2 | W-Y |
| 3 | W-Z |
| 4 | X-Y |
| 5 | X-Z |
| 6 | Y-Z |
| 7 | W |
| 8 | X |
| 9 | Y |
| 0 | Z |

Figure 15:
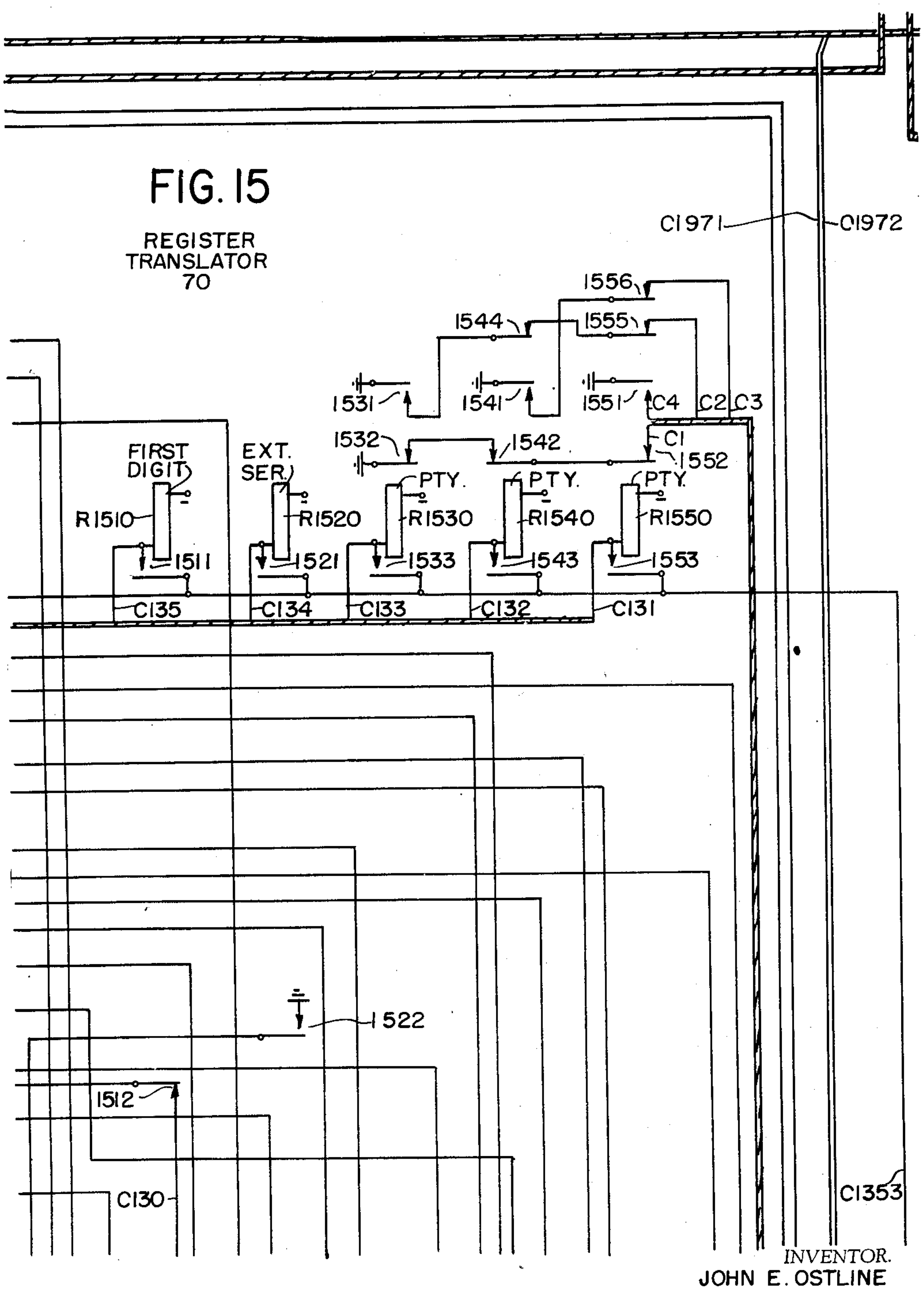
Figure 16:
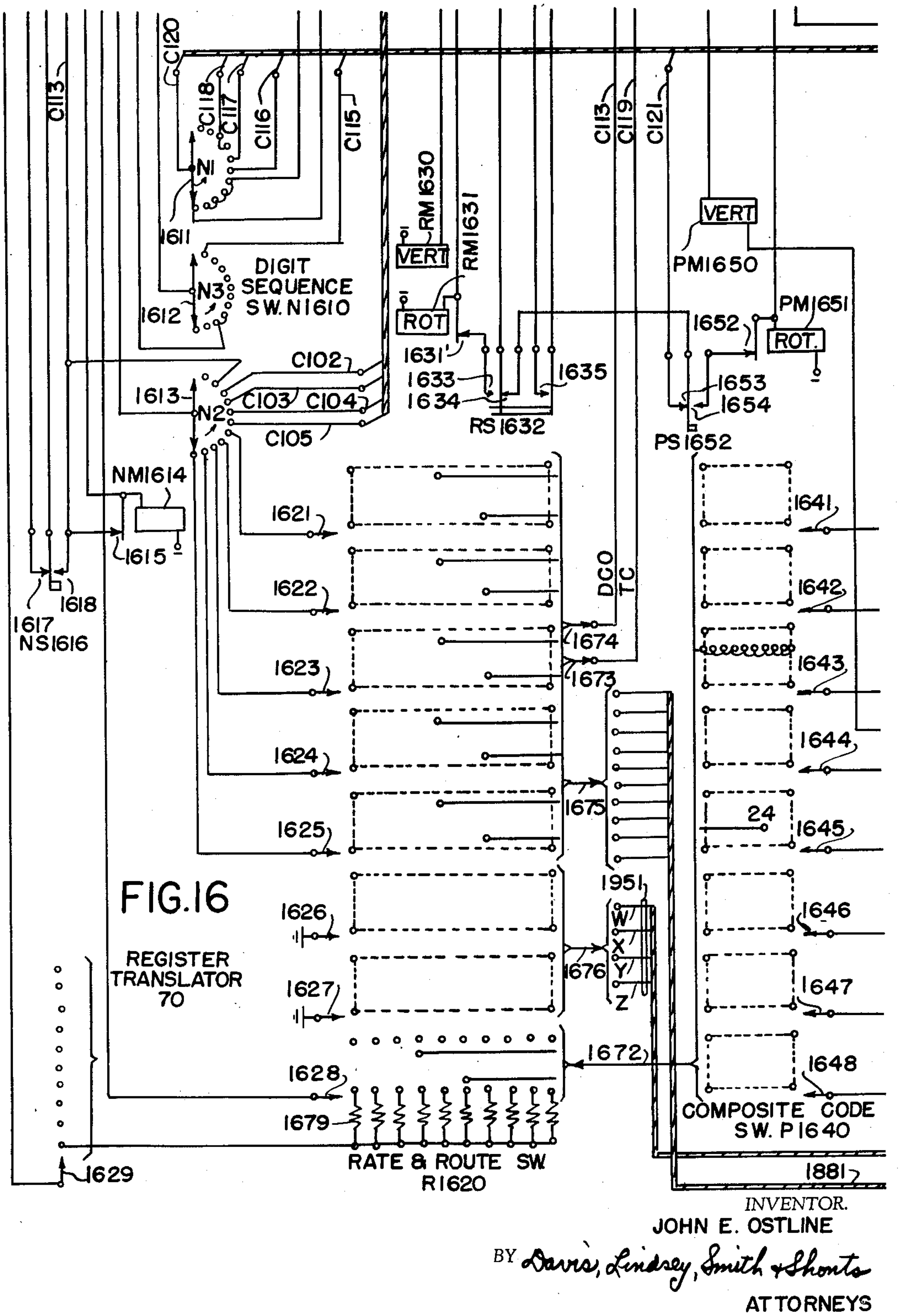
Figure 17:
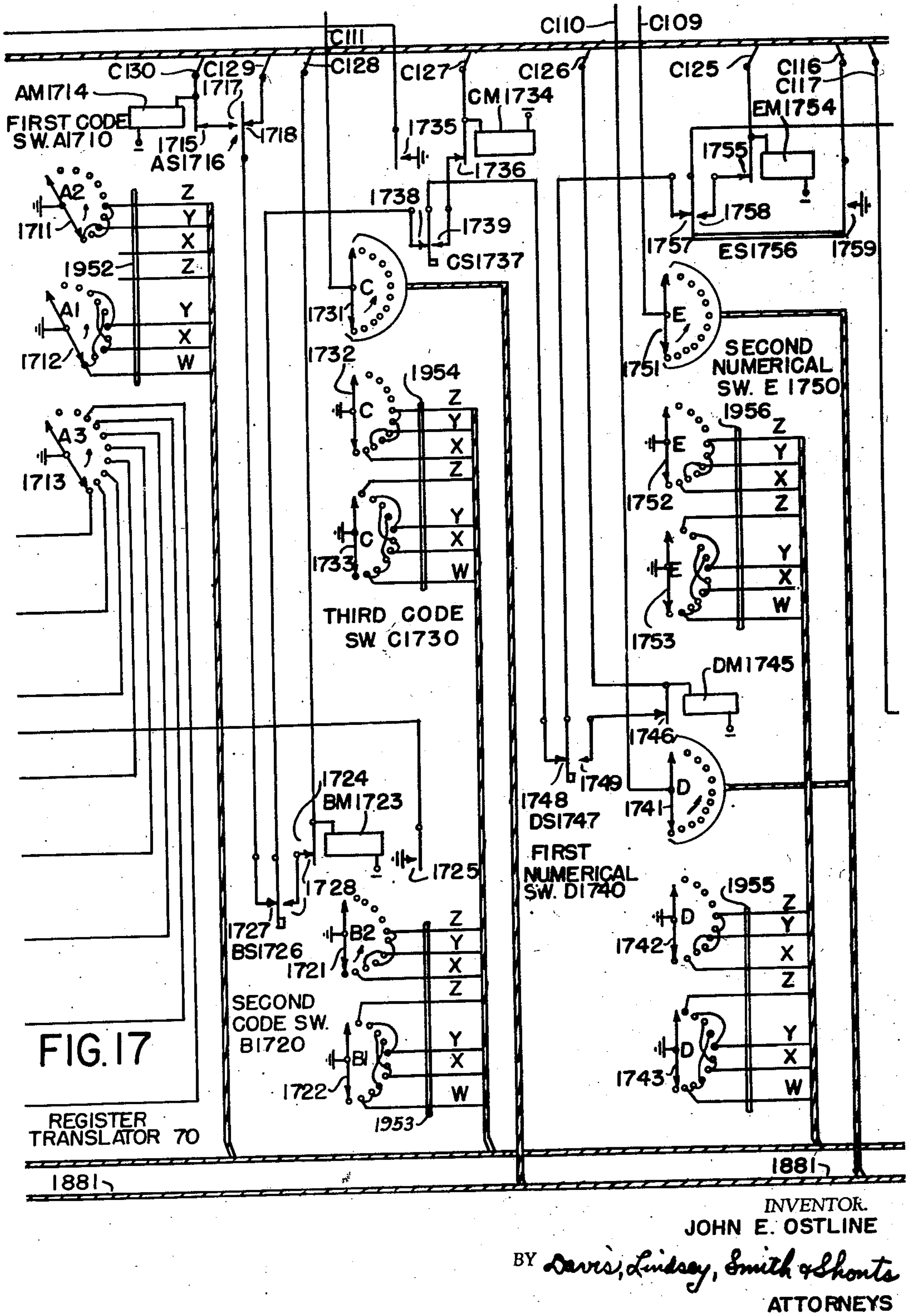
Figure 18:
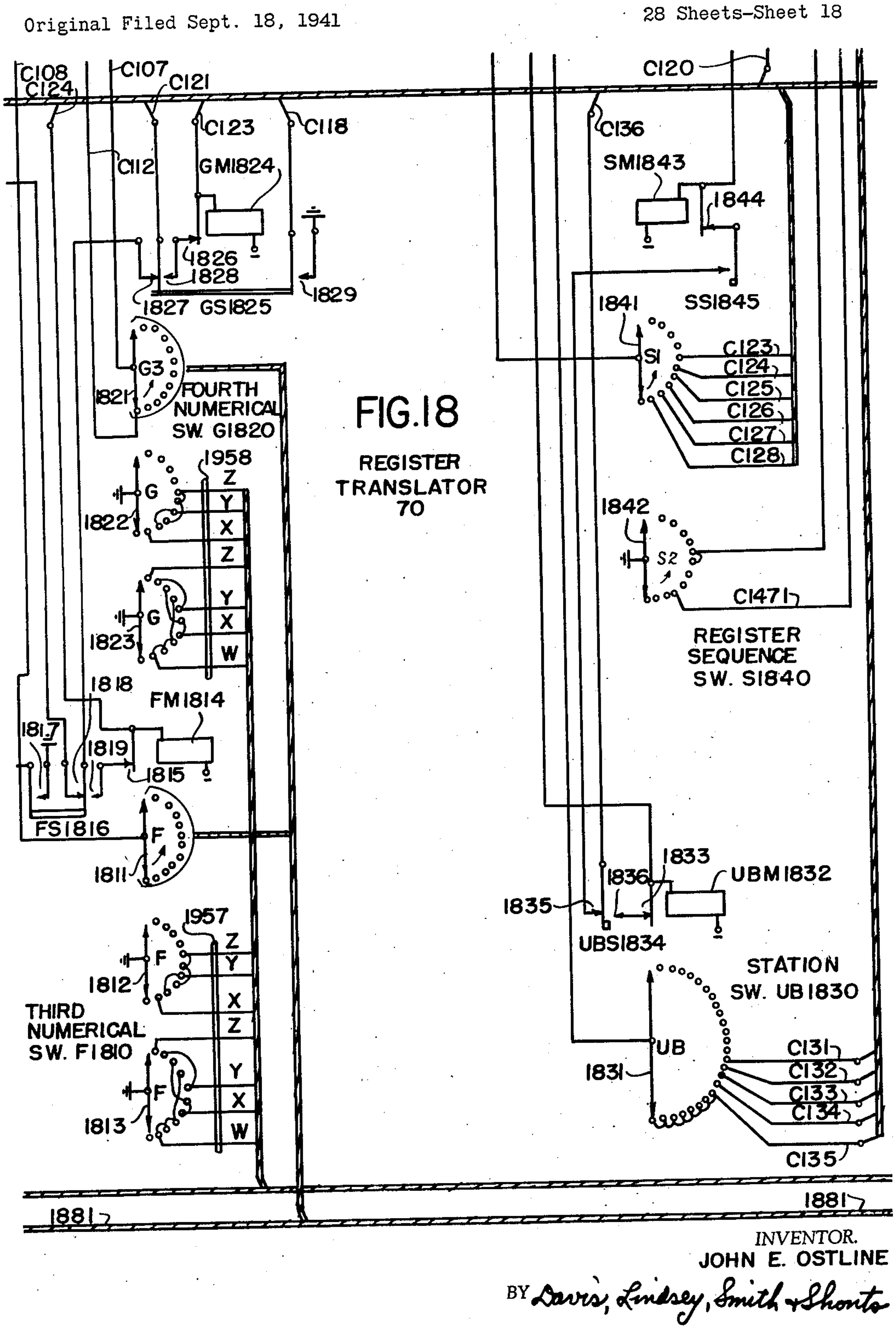

Preferably, each of the toll ticket repeaters included in exchange 1 zone 38 is identical to the toll ticket repeater 90, diagrammatically illustrated in Fig. 7, which is identical to the corresponding element disclosed in Figs. 15 to 17, inclusive, of the copending application of John E. Ostline, Serial No. 354,301, filed August 26, 1940, now Patent No. 2,385,228, granted September 18, 1945.

Preferably, each of the printer controllers included in exchange 1 zone 38 is identical to the printer controller 92, diagrammatically illustrated in Fig. 7, which is identical to the corresponding element disclosed in Figs. 6 to 9, inclusive, of the copending application of John E. Ostline, Serial No. 354,301, filed August 26, 1940, now Patent No. 2,385,228, granted September 18, 1945.

The printer controller alloter 91 included in exchange 1 zone 38, diagrammatically illustrated in Fig. 7, is identical to the corresponding element disclosed in Fig. 6 of the copending application of John E. Ostline, Serial No. 354,301, filed August 26, 1940, now Patent No. 2,385,228 granted September 18, 1945.

The date and time unit 94 included in exchange 1 zone 38, diagrammatically illustrated in Fig. 7, is identical to the corresponding element disclosed in Figs. 36 to 39, inclusive, of the copending application of John E. Ostline, Serial No. 278,728, filed June 12, 1939, now Patent No. 2,373,908, granted April 17, 1945.

Preferably, each of the toll ticket printers included in exchange 1 zone 38 is identical to the toll ticket printer 95, diagrammatically illustrated in Fig. 7, which is identical to the corresponding element disclosed in Figs. 29 and 30 of the copending application of John E. Ostline, Serial No. 278,729, filed June 12, 1939, now Patent No. 2,272,475, granted February 10, 1942.

Figure 26:
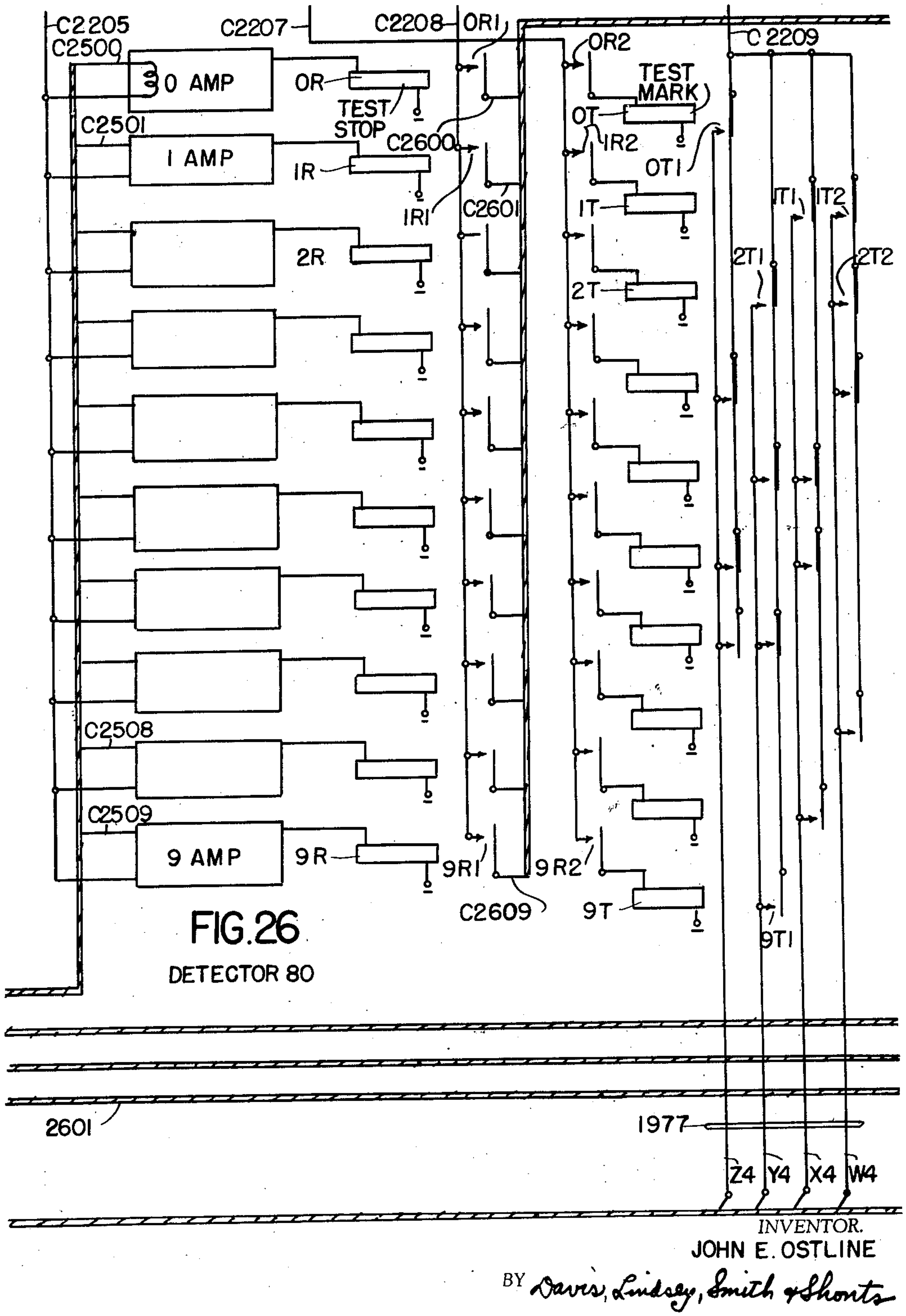
Figure 27:
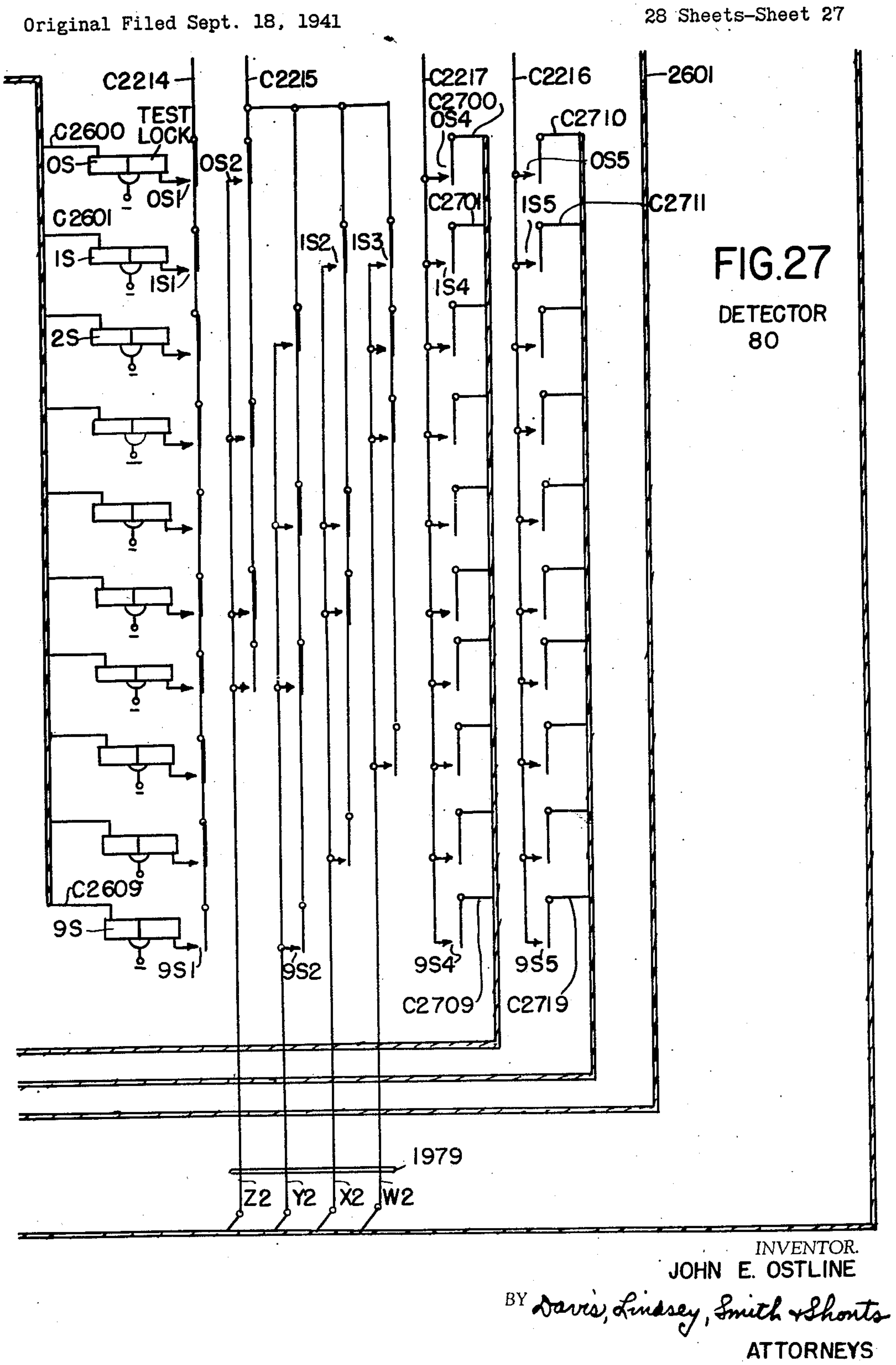

The printer alloter 93 included in exchange 1 zone 38, diagrammatically illustrated in Fig. 7, is identical to the corresponding element disclosed in Fig. 26 of the copending application of John E. Ostline, Serial No. 354,301, filed August 26, 1940, now Patent No. 2,385,228, granted September 18, 1945.

The toll ticket printer 95 in exchange 1 zone 38 is so connected and arranged that it is adapted to be controlled from any one of the printer controllers 92, etc., to print a toll ticket of the character of that shown in Fig. 29. Referring to Fig. 29, it is noted that the toll ticket printer 95 is operative to print the following information upon the toll ticket illustrated:

1. The month and the day of the termination of the call.
2. The hour and the minute of the termination of the call.
3. The zone and the exchange code of the directory number of the calling subscriber line.
4. The numerical line terminal of the directory number of the calling subscriber line.
5. The suffix digit 9 (not shown) following the last digit of the numerical line terminal of the directory number of the calling subscriber line, in the event the calling subscriber line is rendered extended service.
6. The zone and the exchange code of the directory number of the called subscriber line.
7. The numerical line terminal of the directory number of the called subscriber line.
8. The rate factor applicable to the call.
9. The duration of the call in minutes.
10. The cost of the call in appropriate monetary value (in the present example, in dollars and cents).
11. The special service digit 0, in the event this digit is dialed over the called subscriber line, indicating that the charge for the call is to be reversed and assessed against the called subscriber substation instead of the calling subscriber substation.

Preferably, in exchange 1 zone 38, each first selector, such as the first selector 41, each second selector, such as the second selector 42, each special service selector, such as the special service selector 49, each individual connector, such as the individual connector 43, and each party connector, such as the party connectors 45, 46, 47 and 48, as diagrammatically illustrated in Fig. 7, are of the well-known Strowger type. At this point, it is noted that the special service selector 49 is of the well-known back-drop Strowger type. Finally, in exchange 1 zone 38, the manual operator position 0, the toll operator position 110, the information operator position 113 and the miscellaneous operator position 112, as diagrammatically illustrated in Fig. 7, comprise conventional position apparatus for answering calls and for extending calls, when such is desirable, in a well-known manner.

A better understanding of the connection and arrangement of the apparatus incorporated in the telephone system will be facilitated from a consideration of the details of operation of the various pieces of apparatus incident to the extension of various calls from exchange 1 zone 38, as will appear hereinafter.

*The selection of an idle primary selector and an idle primary register in exchange 1 zone 38*

In exchange 1 zone 38, when a call is initiated at a subscriber substation associated with one of the subscriber lines terminating thereat, an idle primary selector is automatically associated with the calling subscriber line. For example, when a call is initiated at the private subscriber substation TP by removing the receiver of the telephone instrument thereat from its associated switchhook, a bridge path is completed thereat between the line conductors C402 and C403 of the private subscriber line 401 and operation of the individually associated line switch 30 is initiated. The line switch 30 operates to find an idle primary selector in the associated group, including the primary selector 40. More particularly, the switching mechanism of the line switch 30 is operated in order to cause the test wiper in the associated wiper set to test progressively the idle or busy condition of the various primary selectors in this group. Assuming that the primary selector 40 is the first idle primary selector in this group, the switching mechanism in the line switch 30 operates to seize the trunk 420 extending thereto, the primary selector 40 being marked as idle by the absence of ground potential upon the control conductor C423 of the trunk 420 extending thereto. Also, the line switch 30 operates to mark the private subscriber line 401 as busy to the connectors having access thereto.

When the primary selector 40 is thus seized by the line switch 30 a circuit is completed for energizing in series the upper winding of the line relay R650 and the upper winding of the transfer relay R660. This circuit extends from ground by way of the set of switch springs S615, the upper winding of R660, the contacts 691 and 642 to the line conductor C421; and from battery by way of the upper winding of R650 and the contacts 693 and 645 to the line conductor C422, the line conductors C421 and C422 of the trunk 420 being connected together by way of the line switch 30, the line conductors C402 and C403 of the private subscriber line 401, and the bridge at the calling private subscriber substation TP. When this series circuit is completed the line relay R650 and the transfer relay R660 operate. At this point it is noted that an obvious path, including the set of switch springs S615, is normally completed for short-circuiting the upper winding of the split relay R670, thereby positively to prevent the latter relay from operating at this time. Upon operating, the line relay R650 completes, at the contacts 651, an obvious circuit, including the contacts 697, for energizing the winding of the hold relay R655, thereby to cause the latter relay to operate. Upon operating, the hold relay R655 completes, at the contacts 658, an obvious path including the contacts 648 for applying ground potential to the control conductor C423 of the trunk 420, thereby to mark the trunk 420 as busy to the other line switches having access thereto and to complete an obvious holding circuit for energizing the rotary magnet M411 of the switching mechanism in the line switch 30.

Upon operating, the transfer relay R660 completes, at the contacts 663, a connection including the contacts 635 and 508 between the test wiper 506 and the magnet FM507 of the finder switch F500. At this time, the wipers 501 to 506, inclusive, of the finder switch F500 engage contacts in the respective associated contact banks terminating conductors extending to one of the primary registers, which primary register is marked either idle or busy, depending, respectively, upon the absence or presence of ground potential upon the test conductor thereof. Assuming that the primary register mentioned is busy, ground potential appears upon the test conductor thereof which is terminated by the contact engaged by the test wiper 506 of the finder switch F500, thereby to complete an obvious circuit for energizing the magnet FM507. When thus energized the magnet FM507 operates to condition the wipers noted of the finder switch F500 to be driven one step in the clockwise direction, and to interrupt, at the contacts 508, the previously traced circuit for energizing the magnet FM507. The magnet FM507 then restores, thereby to drive the wipers noted of the finder switch F500 one step in the clockwise direction, and to reprepare, at the contacts 508, a circuit substantially identical to that previously traced and including the test wiper 506 for testing the idle or busy condition of the next primary register.

Assuming that the primary register 50 is the first primary register in the associated group, the magnet FM507 is operated intermittently, thereby to drive the wipers noted of the finder switch F500 step by step in the clockwise direction until they engage the contacts in the associated contact banks terminating the conductors C511 to C516, inclusive, extending to the primary register 50; whereupon further operation of the magnet FM507 of the finder switch F500 is arrested. More particularly, when the wipers noted of the finder switch F500 engage the contacts in the associated contact banks terminating the conductors C511 to C516, inclusive, extending to the primary register 50, no ground potential appears upon the test conductor C516, whereupon the previously traced circuit for energizing the magnet FM507 of the finder switch F500 is interrupted. At this time, a series circuit is completed for energizing the winding of the cut-in relay R630 in the primary selector 40 and the magnet FM507 of the finder switch F500, this circuit extending from ground by way of the contacts 658 and 661, the contacts 618 of the set of switch springs S617, the contacts 649, the winding of R630, the contacts 508 and the magnet FM507 to battery. When this series circuit is completed the cut-in relay R630 operates; however, the magnet FM507 does not operate due to the high series resistance of the winding of the cut-in relay R630. At this point, it is noted that, as long as the test wiper 506 of the finder switch F500 engages contacts in the associated contact bank terminating test conductors having ground potential thereon, a path is completed for short-circuiting the winding of the cut-in relay R630, thereby positively to prevent operation of the latter relay until the finder switch F500 finds an idle primary register. The path mentioned for short-circuiting the winding of the cut-in relay R630 extends, when completed, from ground by way of the contacts 658 and 661, the contacts 618 of the set of switch springs 617, the contacts 649, the winding of R630, and the contacts 663 and 635 to the grounded test wiper 506 of the finder switch F500. Accordingly, at this time, the finder switch F500 has operated to seize the idle primary register 50.

Upon operating, the cut-in relay R630 completes, at the contacts 631 and 632, a series loop circuit for energizing the upper winding of the line relay R920 and the upper and lower windings of the party line relay R910 in the primary register 50. This loop circuit extends from ground by way of the lower winding of R910, C511, the wiper 501 of the finder switch F500 and the contacts 631 to the line conductor C421 of the trunk 420; and from battery by way of the upper winding of R920, the upper winding of R910, C513, the wiper 503 of the finder switch F500 and the contacts 632 to the line conductor C422 of the trunk 420, the line conductors of the trunk 420 being connected together by way of the bridge at the calling private subscriber substation TP, as previously noted. When this series circuit is completed the line relay R920 operates; however, the party line relay R910 does not operate as the latter relay is of the differential type. Upon operating, the line relay R920 completes, at the contacts 921, a circuit for energizing the winding of the send relay R640 in the primary selector 40, this circuit extending from ground by way of the contacts 921, the wiper 831 of the sequence switch S830 and the engaged home contact in the associated contact bank, the contacts 1051, C514, the wiper 504 of the finder switch F500, the contacts 643 and the winding of R640 to battery. When thus energized the send relay R640 operates.

Also, upon operating, the line relay R920 in the primary register 50 completes, at the contacts 923, an obvious circuit for energizing the winding of the hold relay R1040, thereby to cause the latter relay to operate. Upon operating, the hold relay R1040 completes, at the contacts 1041, an obvious circuit, including the contacts 1111 and the dial tone conductor C1125, for energizing the lower winding of the line relay R920, whereby dial tone voltage is induced into the upper winding of the line relay R920 in order to cause dial tone current to be returned over the previously traced loop circuit, including the finder switch F500, the primary selector 40, the trunk line 420, the line switch 30 and the private subscriber line 401 to the calling private subscriber substation TP, thereby to indicate to the subscriber thereat that he may proceed with the extension of the call by dialing the first digit of the called directory number.

Also, the hold relay R1040 completes, at the contacts 1045, an obvious path including the contacts 1061 for applying ground potential to the test conductor C516, thereby to mark the primary register 50 as busy to the other finder switches in the group, including the finder switch F500. Also, the application of ground potential to the test conductor C516 completes a holding circuit, including the test wiper 506 of the finder switch F500 and the contacts 634 and 508, for energizing in series the winding of the cut-in relay R630 and the rotary magnet FM507.

When the send relay R640 in the primary selector 40 operates it completes, at the contacts 646, an obvious holding circuit including the contacts 633 for energizing the winding thereof. Also, the send relay R640 completes, at the contacts 641, an alternative circuit for energizing the upper winding of the transfer relay R660, this circuit extending from ground by way of the set of switch springs S615, the upper winding of R660, the contacts 691 and 641, the wiper 502 of the finder switch F500, C512, the contacts 1087 and 1062 and the resistors 1118 and 1119 to battery. Also, the send relay R640 completes, at the contacts 644, an alternative circuit for energizing the upper winding of the line relay R650, this circuit extending from ground by way of the contacts 921, the wiper 831 of the sequence switch S830 and the engaged home contact in the associated contact bank, the contacts 1051, C514, the wiper 504 of the finder switch F500, the contacts 644 and 693 and the upper winding of R650 to battery. Further, the send relay R640 interrupts, at the contacts 642 and 645, the previously traced original loop circuit for energizing in series the upper winding of the transfer relay R660 and the upper winding of the line relay R650; however, the latter relays remain in their operated positions at this time due to the completed alternative circuits above traced for energizing the upper windings thereof. Further, the send relay R640 interrupts, at the contacts 643, the original operating circuit for energizing the winding thereof, and interrupts, at the contacts 648, the previously traced original path for applying ground potential to the control conductor C423 of the trunk 420. Also, the send relay R640 completes, at the contacts 647, a circuit for energizing in series the winding of the extended service relay R940 in the primary register 50 and the rotary magnet M411 of the switching mechanism in the line switch 30, this circuit extending from ground by way of the winding of R940, C515, the wiper 505 of the finder switch F500, the contacts 647, the control conductor C423 of the trunk 420, and the rotary magnet M411 to battery. When this series circuit is completed the rotary magnet M411 of the switching mechanism in the line switch 30 is retained in its operated position, thereby to retain the line switch 30 operated; however, the extended service relay R940 in the primary register 50 does not operate unless low resistance battery potential is applied in the seizing line switch to the control conductor C423 of the trunk 420. In the present example, high resistance battery potential is applied by way of the rotary magnet M411 of the switching mechanism in the line switch 30 to the control conductor C423 of the trunk 420; accordingly, the extended service relay R940 in the primary register 50 does not operate. Further it is noted that the application of ground potential by way of the winding of the extended service relay R940 and the above-traced path to the control conductor C423 of the trunk 420 retains the trunk 420 marked as busy to the other line switches 31, etc., having access thereto. Finally, the send relay R640 interrupts, at the contacts 649, the previously traced original operating circuit for energizing the winding of the cut-in relay R630.

Accordingly, at this time, the line switch 30 individually associated with the private subscriber line 401 has seized the primary selector 40; and the finder switch F500 individually associated with the primary selector 40 has seized the primary register 50; and the primary register 50 is in readiness to receive the first digit of the called directory number dialed at the calling private subscribed substation TP.

*Calls to the manual operator position 0 in exchange 1 zone 38*

Assuming that the call extending from the calling private subscriber substation TP to the primary selector 40 and the primary register 50 is to be extended to the manual operator position 0 in exchange 1 zone 38, the subscriber at the calling private subscriber substation TP proceeds to dial the directory number of the manual operator position 0. The directory number of the manual operator position 0 comprises the single digit 0.

Accordingly, the subscriber at the calling private subscriber substation TP proceeds to dial the single digit 0, thereby to cause a corresponding number of impulses to be transmitted over the private subscriber line 401, in a well-known manner. The line relay R920 in the primary register 50 follows the impulses of the digit 0 transmitted over the calling private subscriber line 401 in view of the fact that the circuit for energizing the upper winding thereof includes the previously traced loop circuit extending to the calling private subscriber substation TP; however, the party line relay R910 does not follow the impulses of the digit 0 transmitted over the loop circuit mentioned as the latter relay is of the differential type, as previously noted. Accordingly, the line relay R920 operates and restores intermittently in accordance with the digit 0. Each time the line relay R920 restores it interrupts, at the contacts 921, the previously traced circuit, including the conductor C514, for energizing the upper winding of the line relay R650, thereby to cause the latter relay to restore;

and each time the line relay R920 operates it recompletes, at the contacts 921, the previously traced circuit, including the conductor C514, for energizing the upper winding of the line relay R650, thereby to cause the latter relay to reoperate. Accordingly, the line relay R650 in the primary selector 40 follows the line relay R920 in the primary register 50. Also, each time the line relay R920 restores and then reoperates it interrupts and then recompletes, at the contacts 923, the previously mentioned circuit for energizing the winding of the hold relay R1040; however, the latter relay does not restore during impulsing as it is of the slow-to-release type. Finally, each time the line relay R920 restores and then reoperates it completes and then interrupts, at the contacts 924, a circuit for energizing in series the winding of the transfer relay R860 and the magnet AM803 of the first code switch A800. The series circuit mentioned extends, when completed, from ground by way of the contacts 924 and 1046, the winding of R860, the contacts 1054, the wiper 832 of the sequence switch S830 and the engaged home contact in the associated contact bank and the rotary magnet AM803 to battery. Each time the above-traced series circuit is completed the magnet AM803 is energized and operates in order to condition the wipers noted of the first code switch A800 to be driven one step in the counterclockwise direction; and each time this circuit is interrupted the magnet AM803 is deenergized in order to drive the wipers noted of the first code switch A800 one step in the counterclockwise direction. When the wipers noted of the first code switch A800 are driven one step in the counterclockwise direction away from their home positions the set of switch springs AS805 is actuated, thereby to prepare a release circuit traced hereinafter for energizing the magnet AM803 of the first code switch A800. Also, when the above-traced circuit is completed the transfer relay R860 operates and remains operated during impulsing, the transfer relay R860 being of the slow-to-release type.

Upon operating, the transfer relay R860 completes, at the contacts 861, an obvious circuit for energizing the magnet SM834 of the sequence switch S830, thereby to cause the magnet SM834 to operate in order to condition the wipers noted of the sequence switch S830 to be driven one step in the counterclockwise direction. Also, the transfer relay R860 completes, at the contacts 862, an obvious circuit for energizing the winding of the transfer slave relay R1070, thereby to cause the latter relay to operate. Upon operating, the transfer slave relay R1070 interrupts, at the contacts 1076, a point in a circuit traced hereinafter for energizing the winding of the translate relay R1050, and interrupts, at the contacts 1075, a point in a circuit traced hereinafter for energizing the winding of the release relay R1060, thereby positively to prevent operation of either the translate relay R1050 or the release relay R1060 during impulsing. Further, the transfer slave relay R1070 completes, at the contacts 1074, an obvious circuit, including the contacts 1115, for energizing the lower winding of the digit cutoff relay R1110, thereby to cause the latter relay to operate partially in order to complete, at the contacts 1116, a path for short-circuiting the upper winding thereof. The path mentioned extends from ground by way of the contacts 1074 and 1115, the upper winding of R1110 and the contacts 1116 and 1047 to ground. This arrangement positively prevents full operation of the digit cutoff relay R1110 during impulsing.

At the conclusion of the single digit 0, the wipers noted of the first code switch A800 engage the tenth contacts in the associated contact banks and shortly thereafter the transfer relay R860 restores, the latter relay being of the slow-to-release type, as previously noted. Upon restoring, the transfer relay R860 interrupts, at the contacts 861, the previously mentioned circuit for energizing the magnet SM834 of the sequence switch S830, thereby to cause the magnet mentioned to restore in order to drive the wipers noted of the sequence switch S830 one step in the counterclockwise direction. When the wipers noted of the sequence switch S830 are driven one step in the counterclockwise direction away from their home positions, the set of switch springs SS836 is actuated, thereby to prepare a release circuit traced hereinafter for energizing the magnet SM834 of the sequence switch S830. Also, upon restoring, the transfer relay R860 interrupts, at the contacts 862, the previously mentioned circuit for energizing the winding of the transfer slave relay R1070, thereby to cause the latter relay to restore. Upon restoring, the transfer slave relay R1070 interrupts, at the contacts 1074, the previously traced path for short-circuiting the upper winding of the digit cutoff relay R1110, whereupon an obvious circuit, including the contacts 1047 and 1016, is completed for energizing in series the upper and lower windings of the latter relay. When the upper and lower windings of the digit cutoff relay R1110 are thus energized in series this relay operates fully in order to interrupt, at the contacts 1115, a further point in the previously traced path for short-circuiting the upper winding thereof, and to interrupt, at the contacts 1111, the previously traced circuit, including the dial tone conductor C1125, for energizing the lower winding of the line relay R920. Accordingly, at this time, dial tone voltage is removed from the previously traced loop circuit extending between the calling private subscriber substation TP and the primary register 50. Further, the digit cutoff relay R1110 interrupts, at the contacts 1117, a common point in circuits traced hereinafter for energizing the lower windings of the party relays R1120 and R1130 and the winding of the party relay R1140, thereby positively to prevent operation of any of the party relays R1120, R1130, R1140 incident to the dialing of subsequent digits following the first digit, for a purpose more fully explained hereinafter. Further, the digit cutoff relay R1110 prepares, at the contacts 1112 and 1114, circuits for respectively energizing the mark magnet MM1172 and the receive magnet RM1171 in the mechanical impulse repeater 1170, for a purpose more fully explained subsequently.

Finally, upon restoring, the transfer slave relay R1070 prepares, at the contacts 1076 and 1075, respectively, the previously mentioned circuits for energizing the translate relay R1050 and the release relay R1060. In the present example, the circuit for energizing the winding of the translate relay R1050 is not completed in view of the fact that the single digit 0 registered in the first code switch A800 does not indicate that the first digit 0 received from the calling private subscriber substation TP is to be translated; while the circuit for energizing the winding of the release relay R1060 is completed in view of the fact that the single digit 0 registered in the first code switch A800 indicates that no register translator is to be utilized and that the call may be extended to its destination directly under the control of the calling device at the calling private subscriber substation TP. More particularly, the circuit for energizing the winding of the release relay R1060 extends from ground by way of the contacts 921, the wiper 801 of the first code switch A800 and the engaged tenth contact in the associated contact bank, the release conductor C863, the contacts 1075 and the winding of R1060 to battery. When thus energized the release relay R1060 operates in order to complete, at the contacts 1064, an obvious holding circuit, including the contacts 1047, for energizing the winding thereof; to interrupt, at the contacts 1061, the previously traced holding circuit for energizing the winding of the cut-in relay R630 in the primary selector 40 in series with the magnet FM507 of the finder switch F500; and to interrupt, at the contacts 1062, the previously traced circuit for energizing the upper winding of the transfer relay R660 in the primary selector 40.

Accordingly, the cut-in relay R630 in the primary selector 40 restores immediately when the release relay R1060 in the primary register 50 operates; while the transfer relay R660 in the primary selector 40 restores shortly following the operation of the release relay R1060 in the primary register 50, the transfer relay R660 being of the slow-to-release type, as previously noted.

Considering now the operation of the primary selector 40 during the dialing of the digit 0 and prior to the restoration of the cut-in relay R630 and the transfer relay R660, it is again pointed out that the line relay R920 in the primary register 50 repeats the impulses of the single digit 0 to the line relay R650 in the primary selector 40. Each time the line relay R650 restores it interrupts, at the contacts 651, the previously traced circuit for energizing the winding of the hold relay R655; and completes, at the contacts 652, an obvious circuit, including the contacts 697 and 656, for energizing in multiple the lower winding of the transfer relay R660 and the vertical magnet M611. Each time the line relay R650 operates it recompletes, at the contacts 651, the previously traced circuit for energizing the winding of the hold relay R655; and interrupts, at the contacts 652, the above-traced circuit for energizing in multiple the lower winding of the transfer relay R660 and the vertical magnet M611. Accordingly, the hold relay R655 and the transfer relay R660 remain operated during impulsing, each of these relays being of the slow-to-release type. Each time the vertical magnet M611 is energized it operates to drive the wiper set of the switch mechanism 600 one step in the vertical direction. When the wiper set of the switch mechanism 600 is driven one step in the vertical direction the sets of switch springs S615, S616 and S617 are actuated. More particularly, the set of switch springs S615 is actuated into disengagement, thereby to prepare a series circuit substantially identical to that previously traced and including the conductor C512 and the resistors 1118 and 1119 in the primary register 50 for energizing in series the upper windings of the transfer relay R660 and the split relay R670. However, in the present example, the split relay R670 does not operate due to the inclusion of the resistor 1118 in the primary register 50 in the above-traced circuit for energizing in series the upper windings of the transfer relay R660 and the split relay R670, in view of the fact that the split relay R670 is of the marginal type. The set of switch springs S616 is actuated into engagement, thereby to prepare a circuit traced hereinafter for energizing the release magnet M614. The set of switch springs S617 is actuated in order to complete, at the contacts 619 thereof, an obvious circuit, including the contacts 661 and 658, for energizing the winding of the step relay R680. When thus energized the step relay R680 operates in order to prepare, at the contacts 682, a circuit traced hereinafter for energizing the rotary magnet M612, and to complete, at the contacts 681, a holding circuit for energizing the winding thereof. The holding circuit for energizing the winding of the step relay R680 extends from ground by way of the contacts 697, 681 and 613, the contacts 619 of the set of switch springs S617 and the winding of R680 to battery. Also, the step relay R680 completes, at the contacts 681, a path including the contacts 697, the set of switch springs S627 and the contacts 658 for short-circuiting the winding of the switch-through relay R690, thereby positively to prevent operation of the latter relay at this time.

At the conclusion of the digit 0 repeated to the line relay R650 in the primary selector 40 by the line relay R920 in the primary register 50, the wiper set of the switching mechanism 600 in the primary selector 40 occupies its tenth vertical step. At this time, the cut-in relay R630 restores and shortly thereafter the transfer relay R660 restores, incident to the operation of the release relay R1060 in the primary register 50, as previously explained.

Upon restoring, the cut-in relay R630 interrupts, at the contacts 631 and 632, the previously traced alternative loop circuit for energizing in series the upper and lower windings of the party line relay R510 and the upper winding of the line relay R920 in the primary register 50, thereby to cause the line relay R920 to restore. Also, the cut-in relay R630 interrupts, at the contacts 633, the previously traced holding circuit for energizing the winding of the send relay R640, thereby to cause the latter relay to restore. Upon restoring, the send relay R640 recompletes, at the contacts 642 and 645, the previously traced original loop circuit for energizing in series the upper windings of the line relay R650 and the transfer relay R660. Also, at this time, the upper winding of the split relay R670 is included in the loop circuit due to the actuated position of the set of switch springs S615. However, the resistance of the loop circuit, including the upper winding of the line relay R650, the upper winding of the transfer relay R660 and the upper winding of the split relay R670, in addition to the substation equipment at the calling private subscriber substation TP, is considerably high and of such a value that the split relay R670 will not operate and the transfer relay R660 is not retained in its operated position; although, the line relay R650 is retained in its operated position. When the transfer relay R660 restores it completes, at the contacts 662, the previously mentioned circuit for energizing the rotary magnet M612, this circuit extending from ground by way of the contacts 658, 662 and 682 and the rotary magnet M612 to battery. When thus energized the rotary magnet M612 operates to drive the wiper set of the switch mechanism 600 one step in the rotary direction and to interrupt, at the contacts 613, the previously traced holding circuit for energizing the winding of the step relay R680, thereby to cause the latter relay to restore. Upon restoring, the step relay R680 interrupts, at the contacts 682, the previously traced circuit for energizing the rotary magnet M612, thereby to cause the latter magnet to restore. At this point, it is noted that the set of switch springs S620 is actuated when the wiper set of the switch mechanism 600 is driven ten steps in the vertical direction away from its normal vertical position. Accordingly, when the rotary magnet M612 restores at this time it completes, at the contacts 613, an alternative circuit for energizing the winding of the step relay R680, this circuit extending from ground by way of the contacts 671, the contacts 624 of the set of switch springs S623, the contacts 621 of the set of switch springs S620, the contacts 696 and 613, the contacts 619 of the set of switch springs S617, and the winding of R680 to battery. Also, an alternative path, including the contacts 671, the contacts 624 of the set of switch springs S623, the contacts 621 of the set of switch springs S620, the contacts 696, the set of switch springs S627 and the contacts 658, is completed for short-circuiting the winding of the switch-through relay R690, thereby positively to prevent operation of the latter relay at this time. When thus energized the step relay R680 reoperates, thereby to recomplete, at the contacts 682, the previously traced circuit for energizing the rotary magnet M612 in order to cause the latter magnet to reoperate. The rotary magnet M612 and the step relay R680 interact, in the manner described above, thereby to cause the wiper set of the switch mechanism 600 to be driven step by step in the rotary direction until the wipers of the wiper set engage the eighth contact set in the associated tenth level of the contact bank 700. At this time, a cam carried by the wiper shaft of the switch mechanism 600 actuates the set of switch springs S623, thereby to interrupt, at the contacts 624 thereof, a further point in the previously traced circuit for energizing the winding of the step relay R680; and to prepare, at the contacts 625 thereof, an alternative circuit for energizing the winding of the step relay R680.

More particularly, at this time, the test wiper 603 of the wiper set is connected by way of the contacts 673, the contacts 625 of the set of switch springs S623, the contacts 621 of the set of switch springs S620, the contacts 696 and 613, the contacts 619 of the set of switch springs S617 and the winding of R680 to battery. Thus, the wipers of the wiper set of the switch mechanism 600 engage the eighth contact set in the tenth level of the associated contact bank 700 terminating the first trunk extending to the manual operator position 0; and further operation of the primary selector 40 is continued in the event the first trunk mentioned extending to the manual operator position 0 is busy at this time. More particularly, ground or battery potential respectively appear upon the control conductor of the last-mentioned trunk in the event this trunk is busy or idle. Assuming that the trunk mentioned is busy at this time, ground potential appears upon the control conductor thereof and is applied to the test wiper 603 of the wiper set of the switch mechanism 600 in order to complete the previously traced alternative circuit for energizing the winding of the step relay R680, thereby to cause the latter relay to reoperate. When the step relay R680 is thus reoperated the rotary magnet M612 is reoperated in order to drive the wiper set of the switch mechanism 600 an additional step in the rotary direction, whereupon the wipers of the wiper set engage the next trunk extending to the manual operator position 0.

Assuming that the last-mentioned trunk extending to the manual operator position 0 is idle at this time, battery potential appears upon the control conductor thereof and is applied to the test wiper 603 of the wiper set of the switch mechanism 600, thereby to complete a path substantially identical to that previously traced for short-circuiting the winding of the step relay R680 in order positively to prevent reoperation of the latter relay at this time. Also, the application of battery potential to the test wiper 603 completes a circuit for energizing the winding of the switch-through relay R690, this circuit extending from ground by way of the contacts 658, the set of switch springs S627, the winding of R690, the contacts 696, the contacts 621 of the set of switch springs S620, the contacts 625 of the set of switch springs S623, the contacts 673 and the test wiper 603 having battery potential thereon. When thus energized the switch-through relay R690 operates to complete, at the contacts 695, a path substantially identical to that traced above for applying direct ground potential, at the contacts 658, to the test wiper 603, thereby to cause the trunk circuit, not shown, associated with the seized trunk extending to the manual operator position 0 to operate; whereupon ground potential is returned over the control conductor of the seized trunk to the test wiper 603. The return of ground potential from the trunk circuit associated with the seized trunk to the test wiper 603 completes a holding circuit, including the contacts 673, the contacts 625 of the set of switch springs S623, the contacts 621 of the set of switch springs S620, the contacts 695, the set of switch springs S627, the contacts 613 and the contacts 619 of the set of switch springs S617, for energizing the winding of the switch-through relay R690 in series with the winding of the step relay R680. When this holding circuit is completed the switch-through relay R690 is retained in its operated position; however, the step relay R680 does not operate due to the high series resistance of the winding of the switch-through relay R690. Also, the return of ground potential from the trunk circuit associated with the seized trunk to the test wiper 603 completes a path, including the contacts 673, the contacts 625 of the set of switch springs S623, the contacts 621 of the set of switch springs S620, the contacts 695, and the contacts 648, for applying ground potential to the control conductor C423 of the trunk 420, thereby to retain the line switch 30 in its operated position subsequent to the restoration of the hold relay R655 in the primary selector 40. Also, the application of ground potential to the control conductor C423 of the trunk 420 retains the last-mentioned trunk marked as busy to the other line switches 31, etc., having access thereto.

Also, upon operating, the switch-through relay R690 interrupts, at the contacts 691 and 693, the previously traced loop circuit for energizing in series the upper winding of the line relay R650, the upper winding of the transfer relay R660 and the upper winding of the split relay R670, thereby to cause the line relay R650 to restore. Further, the switch-through relay R690 interrupts, at the contacts 697, the previously traced circuit for energizing the winding of the hold relay R655, thereby to cause the latter relay to restore shortly thereafter. Upon restoring, the hold relay R655 interrupts, at the contacts 658, the previously traced original path for applying ground potential to the control conductor C423 of the trunk 420; however, at this time, the previously traced alternative path for applying ground potential to the control conductor C423 of the trunk 420 is completed. Further, the switch-through relay R690 completes, at the contacts 692 and 694, a connection between the calling private subscriber substation TP and the manual operator position 0, this connection extending from the line conductor C421 of the trunk 420 by way of the contacts 642 and 692, and the line wiper 601 of the wiper set to one of the line conductors of the seized trunk; and from the line conductor C422 of the trunk 420 by way of the contacts 645 and 694 and the line wiper 602 of the wiper set to the other line conductor of the seized trunk, the line conductors C421 and C422 of the trunk 420 being connected by way of the line switch 30 and the private subscriber line 401 to the private subscriber substation TP, and the line conductors of the seized trunk being connected to the position equipment at the manual operator position 0 after the operator at the last-mentioned position answers the call. Accordingly, the subscriber at the calling private subscriber substation TP and the operator at the manual operator position 0 may converse at this time.

Returning now to the subsequent operation of the primary register 50, it is pointed out that, when the line relay R920 therein restores incident to the restoration of the cut-in relay R630 in the primary selector 40, the primary register 50 is released. More particularly, upon restoring, the line relay R920 interrupts, at the contacts 923, the previously mentioned circuit for energizing the winding of the hold relay R1040, thereby to cause the latter relay to restore shortly thereafter, the hold relay R1040 being of the slow-to-release type. Upon restoring, the hold relay R1040 effects the complete release of the primary register 50, in a manner more fully explained hereinafter, whereupon ground potential is removed from the test conductor C516, thereby to mark the primary register 50 as idle to the finder switches F500, etc., having access thereto.

The release of the established connection between the calling private subscriber substation TP and the manual operator position 0, described above, is primarily under the control of the subscriber at the calling private subscriber substation TP and is effected when the subscriber thereat replaces the receiver of the telephone instrument at the private subscriber substation TP upon its associated switchhook, thereby to interrupt the previously traced loop circuit extending therefrom to the trunk circuit associated with the trunk seized by the switch mechanism 600. When the loop circuit mentioned is interrupted the trunk circuit associated with the trunk seized by the switch mechanism 600 is released, thereby to mark the trunk mentioned as idle, assuming that the operator at the manual operator position 0 has disconnected from this trunk at this time; and to remove the application of ground potential from the test wiper 603 of the wiper set of the switch mechanism 600. When ground potential is removed from the test wiper 603 the previously traced holding circuit for energizing the winding of the switch-through relay R690 in series with the winding of the step relay R680 is interrupted, thereby to cause the switch-through relay R690 to restore. Upon restoring, the switch-through relay R690 interrupts, at the contacts 695, a further point in the previously traced path for applying ground potential to the control conductor C423 of the trunk 420, and completes, at the contacts 697, a circuit for energizing the release magnet M614. The last-mentioned circuit extends from ground by way of the contacts 697, 652 and 657, the release magnet M614 and the set of switch springs S616 to battery. When thus energized the release magnet M614 operates to release the wiper set of the switch mechanism 600 and to cause it to be returned to its normal rotary and vertical positions, whereupon the sets of switch springs S623, S620, S615, S616 and S617 are actuated. More particularly, the set of switch springs S616 is actuated into disengagement, thereby to interrupt the previously traced circuit for energizing the release magnet M614 in order to cause the latter magnet to restore. At this time, the primary selector 40 is completely released and available for further use.

When ground potential is removed from the control conductor C423 of the trunk 420 the previously traced holding circuit for energizing the rotary magnet M411 of the line switch 30 is interrupted, thereby to cause the latter magnet to deenergize and effect the release of the line switch 30. When the line switch 30 is thus released the private subscriber line 401 is marked as idle to the connectors having access thereto. At this time, the established connection between the calling private subscriber substation TP and the called manual operator position 0 is completely released.

In the foregoing explanation of the mode of operation of the primary selector 40, it was assumed that there was an idle trunk in the group extending to the manual operator position 0; however, it may occur that there is no idle trunk in the group mentioned at this time. In this event, the step relay R680 and the rotary magnet M612 interact, in the manner previously explained, whereby the wiper set of the switch mechanism 600 is driven in the rotary direction eleven steps away from its normal rotary position in order to actuate the sets of switch springs S626 and S627. More particularly, the set of switch springs S627 is actuated into disengagement, thereby positively to prevent operation of the switch-through relay R690; while the set of switch springs S626 is actuated into engagement, thereby to complete an obvious circuit, including the busy tone conductor C604, for energizing the lower winding of the line relay R650. When the lower winding of the line relay R650 is thus energized busy tone voltage is induced into the upper winding thereof; whereby busy tone current is returned over the previously traced loop circuit extending between the primary selector 40 and the calling private subscriber substation TP in order to indicate to the subscriber thereat the all-busy condition mentioned. The subscriber at the calling private subscriber substation TP then effects the release of the line switch 30 and the primary selector 40.

More particularly, the subscriber at the calling private subscriber substation TP effects the release of the primary selector 40 by replacing the receiver of the telephone instrument thereat upon its associated switchhook, thereby to interrupt the previously traced loop circuit extending therefrom to the primary selector 40. When the loop circuit mentioned is interrupted the previously traced circuit for energizing in series the upper windings of the line relay R650, the transfer relay R660 and the split relay R670 is interrupted; thereby to cause the line relay R650 to restore, the transfer relay R660 and the split relay R670 occupying their restored positions at this time. Upon restoring, the line relay R650 interrupts, at the contacts 651, the previously traced circuit for energizing the winding of the hold relay R655, thereby to cause the latter relay to restore shortly thereafter, the hold relay R655 being of the slow-to-release type. Upon restoring, the hold relay R655 completes, at the contacts 657, the previously traced circuit for energizing the release magnet M614, thereby to cause the latter magnet to operate. Upon operating, the release magnet M614 effects the release of the wiper set of the switch mechanism 600, whereby the wiper set is returned to its normal rotary and vertical positions. When the wiper set of the switch mechanism 600 is thus released the sets of switch springs S623, S620, S626, S627, S615, S616 and S617 are actuated. More particularly, the set of switch springs S616 is actuated into disengagement, thereby to interrupt the previously traced circuit for energizing the release magnet M614 in order to cause the latter magnet to restore; while the set of switch springs S626 is actuated into disengagement, thereby to interrupt the previously traced circuit, including the busy tone conductor C604, for energizing the lower winding of the line relay R650. Also, the hold relay R655 interrupts, at the contacts 658, the previously traced path for applying ground potential to the control conductor C423 of the trunk 420. At this time, the primary selector 40 is completely released and available for further use.

When ground potential is removed from the control conductor C423 of the trunk 420 the previously traced holding circuit for energizing the rotary magnet M411 in the line switch 30 is interrupted, thereby to cause the latter magnet to deenergize and effect the release of the line switch 30. When the line switch 30 is thus released the private subscriber line 401 is marked as idle to the connectors having access thereto.

In view of the foregoing explanation of the mode of operation of the primary selector 40 and the primary register 50 to effect the extension of a call from the calling private subscriber substation TP to the called manual operator position 0, it will be understood that this equipment is operative, in a substantially identical manner, to effect the extension of a call from the calling private subscriber substation TX or from any one of the calling party subscriber substations TS1, TS2, TS3 and TS4 to the called manual operator position 0.

*Special service calls in exchange 1 zone 38*

Assuming that the call extending from the calling private subscriber substation TP to the primary selector 40 and the primary register 50 is to be extended to a special service operator position, such, for example, as the information operator position 113, in exchange 1 zone 38, the subscriber at the calling private subscriber substation TP proceeds to dial the directory number of the information operator position 113. The directory number of each special service operator position comprises three digits, the first two digits of which are 1 and 1, the directory number of the information operator position 113 being 113.

Accordingly, the subscriber at the calling private subscriber substation TP proceeds to dial the first digit 1, thereby to cause a corresponding number of impulses to be transmitted over the private subscriber line 401, in the manner previously explained. The operations of the primary register 50 and the primary selector 40, in response to the first digit 1, are substantially identical to those previously explained. More particularly, at the conclusion of the first digit 1, the wipers noted of the first code switch A800 in the primary register 50 engage the first contacts in the associated contact banks; and shortly thereafter the transfer relay R860 therein restores. Upon restoring, the transfer relay R860 interrupts, at the contacts 862, the previously traced circuit for energizing the winding of the transfer slave relay R1070, thereby to cause the latter relay to restore. Upon restoring, the transfer slave relay R1070 prepares, at the contacts 1076 and 1075, respectively, the previously mentioned circuits for energizing the windings of the translate relay R1050 and the release relay R1060. In the present example, the circuit for energizing the winding of the translate relay R1050 is not completed in view of the fact that the first digit 1 registered in the first code switch A800 does not indicate that the first digit received from the calling private subscriber substation TP is to be translated; while the circuit for energizing the winding of the release relay R1060 is completed in view of the fact that the first digit 1 registered in the first code switch A800 indicates that no register translator is to be utilized and that the call may be extended to its destination directly under the control of the calling device at the calling private subscriber substation TP. More particularly, the circuit for energizing the winding of the release relay R1060 extends from ground by way of the contacts 921, the wiper 801 of the first code switch A800 and the engaged first contact in the associated contact bank, the release conductor C863, the contacts 1075 and the winding of R1060 to battery. When thus energized the release relay R1040 operates in order to effect the restoration of the cut-in relay R630 and the transfer relay R660 in the primary selector 40, in the manner previously explained. Upon restoring, the cut-in relay R630 effects the restoration of the send relay R640 in the primary selector 40; and the latter relay effects the restoration of the line relay R920 in the primary register 50. Upon restoring, the line relay R920 effects the restoration of the hold relay R1040, whereupon the primary register 50 is released, in a manner more fully explained hereinafter.

Considering now the operation of the primary selector 40 during the dialing of the first digit 1 and prior to the release of the cut-in relay R630 and the transfer relay R660, it is again pointed out that the line relay R920 in the primary register 50 repeats the impulse of the first digit 1 to the line relay R650 in the primary selector 40. The line relay R650 follows the first digit 1, thereby to control the vertical magnet M611, whereby the wiper set of the switch mechanism 600 is driven one step in the vertical direction. When the wiper set of the switch mechanism 600 is driven one step in the vertical direction, the sets of switch springs S615, S616, S617 and S620 are again actuated, in the manner previously explained. Subsequent to the restoration of the cut-in relay R630 and the send relay R640 the previously traced loop circuit extending between the calling private subscriber substation TP and the primary selector 40 is again recompleted, whereby the line relay R650 is retained in its operated position; the split relay R670 remains in its restored position; and the transfer relay R660 restores, in the manner previously explained. Upon restoring, the transfer relay R660 effects the previously explained interaction between the step relay R680 and the rotary magnet M612, whereby the wipers of the wiper set are driven automatically step by step in the rotary direction into engagement with the sixth contact set in the first level terminating the first trunk in the group extending to special service selectors. At this time, the set of switch springs S623 is actuated, in the manner previously explained; whereby the test wiper 603 of the wiper set is operatively connected by way of the previously traced paths including the contacts 625 of the set of switch springs S623 and the contacts 621 of the set of switch springs S620 to the windings of the switch-through relay R690 and the step relay R680. Accordingly, the first trunk extending to the group of special service selectors and terminated by the sixth contact set in the first level of the contact bank 700 is tested, in the manner previously described. Subsequent operation of the primary selector 40 depends upon the idle or busy condition of the selected trunk, whereby the switch mechanism 600 is operated to seize a trunk extending to an idle special service selector.

Assuming that the trunk extending to the special service selector 49 is idle, the switch mechanism 600 is controlled to seize the trunk extending thereto; whereupon the switch-through relay R690 operates in order to effect the restoration of the line relay R650 and the hold relay R655, in the manner previously explained. At this time, the loop circuit is extended from the calling private subscriber substation TP through the primary selector 40 to the special service selector 49, in an obvious manner. Ground potential in the special service selector 49 is returned over the seized trunk to the test wiper 603 of the wiper set of the switch mechanism 600, thereby to complete the previously traced holding circuit for energizing the winding of the switch-through relay R690 in series with the winding of the step relay R680 in order to retain the primary selector 40 in its operated position. Also, the ground potential returned from the special service selector to the test wiper 603 retains the application of ground potential upon the control conductor C423 of the trunk 420, thereby to retain the line switch 30 in its operated position. Accordingly, at this time, the connection has been extended from the calling private subscriber substation TP to the special service selector 49.

The subscriber at the calling private subscriber substation TP then proceeds to dial the second digit 1 and the third digit 3 into the special service selector 49. It is again noted that the special service selector 49 is of the drop-back type, whereby the wiper set of the Strowger mechanism therein is operated to its first vertical level in response to the second digit 1 and then dropped back to its normal vertical position. The wiper set of the Strowger mechanism in the special service selector 49 is then operated to its third vertical level in response to the third digit 3; and then operates automatically to seize an idle trunk extending to the information operator position 113, thereby to complete a communication connection between the calling private subscriber substation TP and the information operator position 113 when the operator at the last-mentioned position answers the call on the trunk mentioned.

The release of the apparatus involved in the established connection between the calling private subscriber substation TP and the information operator position 113 is effected when the subscriber at the calling private subscriber substation TP replaces the receiver of the telephone instrument thereat upon its associated switchhook, in the manner previously explained.

In the foregoing explanation of the mode of operation of the primary selector 40, it was assumed that there was an idle special service selector in the group mentioned; however, it may occur that there is no idle special service selector in this group at this time. In this event, the step relay R680 and the rotary magnet M612 interact, in the manner previously explained; whereby the wiper set of the switching mechanism 600 is driven in the rotary direction eleven steps away from its normal rotary position in order to cause busy tone current to be returned over the loop circuit to the calling private subscriber substation TP, in the manner previously explained. In this event, the subscriber at the calling private subscriber substation TP effects the release of the line switch 30 and the primary selector 40, in the manner previously explained, by replacing the receiver of the telephone instrument at the calling private subscriber substation TP upon its associated switchhook.

In view of the above explanation of the extension of a call from the calling private subscriber substation TP to the information operator position 113, it will be readily appreciated that a call may be extended, in a substantially identical manner, to the toll operator position 110 or to the miscellaneous operator position 112, the operations of the primary selector 40 and the primary register 50 being identical in each case. In this connection, it is pointed out that the directory number of the toll operator position 110 is 110, while the directory number of the miscellaneous operator position 112 is 112.

In view of the foregoing explanation of the mode of operation of the primary selector 40 and the primary register 50 to effect the extension of a call from the calling private subscriber substation TP to the called information operator position 113, to the toll operator position 110 or to the miscellaneous operator position 112, it will be understood that this equipment is operative, in a substantially identical manner, to effect the extension of a call from the calling private subscriber substation TX or from any one of the calling party subscriber substations TS1, TS2, TS3, and TS4 to any called one of the operator positions mentioned above.

*Local calls in exchange 1 zone 38*

Assuming that the call extending from the calling private subscriber substation TP to the primary selector 40 and the primary register 50 is to be extended to the called private subscriber substation TX in exchange 1 zone 38, the subscriber at the calling private subscriber substation TP proceeds to dial the directory number of the called private subscriber substation TX. The directory number of the called private subscriber substation TX comprises a code portion, including the digits 381 identifying the called zone and exchange, and a numerical portion, including the digits 0901 identifying the line terminal of the private subscriber line 404 extending to the called private subscriber substation TX. Thus, the directory number of the called private subscriber substation TX is 381–0901.

Accordingly, the subscriber at the calling private subscriber substation TP proceeds to dial the first digit 3, thereby to cause a corresponding number of impulses to be transmitted over the private subscriber line 401, in a well-known manner. The line relay R920 in the primary register 50 follows the impulses transmitted over the calling private subscriber line 401 in view of the fact that the circuit for energizing the upper winding thereof includes the previously traced loop circuit extending to the calling private subscriber substation TP. Accordingly, the line relay R920 operates and restores intermittently in accordance with the digit 3. The line relay R920 repeats, at the contacts 924, the impulses of the first digit 3 by way of the winding of the transfer relay R860 and the wiper 832 of the sequence switch S830 and the engaged home contact in the associated contact bank to the magnet AM803 of the first code switch A800; and repeats, at the contacts 921, the impulses of the first digit 3 by way of the wiper 831 of the sequence switch S830 and the engaged home contact in the associated contact bank and the conductor C514 to the line relay R650 in the primary selector 40, in the manner previously explained. Thus, the line relay R650 follows the impulses of the first digit 3 and drives the wiper set of the switch mechanism 600 three steps in the vertical direction, in the manner previously explained.

At the conclusion of the first digit 3, the wipers noted of the first code switch A800 engage the third contacts in the associated contact banks; the line relay R920, the hold relay R1040, the transfer relay R860 and the transfer slave relay R1070 occupy their operated positions; while the digit cutoff relay R1110 occupies its partially operated position, as previously explained. Shortly following the conclusion of the first digit 3 the transfer relay R860 restores as the latter relay is of the slow-to-release type. Upon restoring, the transfer relay R860 interrupts, at the contacts 861, the previously traced circuit for energizing the magnet SM834 of the sequence switch S830, thereby to cause the latter magnet to restore and drive the wipers noted of the sequence switch S830 one step in the counterclockwise direction. Also, the transfer relay R860 interrupts, at the contacts 862, the previously traced circuit for energizing the winding of the transfer slave relay R1070, thereby to cause the latter relay to restore. Upon restoring, the transfer slave relay R1070 interrupts, at the contacts 1074, the previously traced path for short-circuiting the upper winding of the digit cutoff relay R1110, thereby to cause the latter relay to operate fully. When the digit cutoff relay R1110 operates fully it interrupts, at the contacts 1111, the previously traced circuit, including the dial tone conductor C1125, for energizing the lower winding of the line relay R920, thereby to interrupt the application of dial tone potential to the previously traced loop circuit extending to the calling private subscriber substation TP.

Also, upon restoring, the transfer slave relay R1070 prepares, at the contacts 1076 and 1075, respectively, the previously mentioned circuits for energizing the windings of the translate relay R1050 and the release relay R1060. In the present example, the circuit for energizing the winding of the translate relay R1050 is not completed in view of the fact that the first digit 3 registered in the first code switch A800 does not indicate that this digit received from the calling private subscriber substation TP is to be translated; moreover, the circuit for energizing the winding of the release relay R1060 is not completed in view of the fact that the first digit 3 registered in the first code switch A800 does not indicate that a register translator will not be utilized ultimately. In view of the fact that the release relay R1060 remains restored, the previously traced path for applying ground potential to the test conductor C516 is retained completed, thereby to retain the cut-in relay R630 in the primary selector 40 in its operated position; and the previously traced path for applying battery potential by way of the resistors 1119 and 1118 to the conductor C512 is retained completed, thereby to retain the transfer relay R660 in the primary selector 40 in its operated position. At this point, it is noted that, when the wiper set of the switch mechanism 600 is driven in the vertical direction away from its normal vertical position, the set of switch springs S615 is actuated, whereby the upper winding of the split relay R670 is included in the previously traced circuit in series relation with the upper winding of the transfer relay R660; however, the split relay R670 does not operate at this time due to the high series resistance of the resistor 1118 included in the circuit mentioned.

When the wipers noted of the sequence switch S830 are driven one step in the counterclockwise direction the wiper 831 thereof disengages the home contact in the associated contact bank, thereby to interrupt the previously traced path for applying ground potential to the conductor C514. When ground potential is removed from the control conductor C514 the previously traced circuit for energizing the upper winding of the line relay R650 in the primary selector 40 is interrupted, thereby to cause the latter relay to restore. Upon restoring, the line relay R650 interrupts, at the contacts 651, the previously traced circuit for energizing the winding of the hold relay R655, thereby to cause the latter relay to restore shortly thereafter. Upon restoring, the hold relay R655 completes, at the contacts 657, the previously traced circuit for energizing the release magnet M614, thereby to cause the latter magnet to operate and release the wiper set of the switch mechanism 600; whereupon the wiper set is returned to its normal rotary and vertical positions. When the wiper set is thus released the sets of switch springs S615, S616 and S617 are actuated, in the manner previously explained.

The subscriber at the calling private subscriber substation TP proceeds to dial the second digit 8 at this time, whereupon the line relay R920 in the primary register 50 again follows the impulses transmitted over the private subscriber line 401. The impulses of the second digit 8 are not repeated by the line relay R920 in the primary register 50 to the line relay R650 in the primary selector 40, due to the fact that no path is completed between the ground contacts 921 and the conductor C514 at the present time. Each time the line relay R920 restores it completes, at the contacts 924, a circuit for energizing the winding of the transfer relay R860 in series with the magnet BM813 of the second code register B810, this circuit extending from ground by way of the contacts 924 and 1046, the winding of R860, the contacts 1054, the wiper 832 of the sequence switch S830 and the engaged first contact in the associated contact bank, and the magnet BM813 to battery. Accordingly, the transfer relay R830 operates at the beginning of the second digit 8 in order to effect operation of the transfer slave relay R1070, in the manner previously explained. Each time the line relay R920 reoperates it interrupts, at the contacts 924, the above-traced circuit for energizing in series the winding of the transfer relay R860 and the magnet BM813 of the second code switch S810. Accordingly, the transfer relay R860 remains operated during impulsing. Also, upon operating, the transfer relay R860 recompletes, at the contacts 861, the previously traced circuit for energizing the magnet SM834 of the sequence switch S830, thereby to condition the wipers noted of the sequence switch S830 to be driven an additional step in the counterclockwise direction.

Each time the magnet BM813 of the second code switch B810 is thus energized and subsequently deenergized, the wipers noted of the second code switch B810 are driven one step in the clockwise direction. When the wipers noted of the second code switch B810 are driven away from their home positions the set of switch springs BS815 is actuated.

Upon operating, the transfer slave relay R1070 again interrupts, at the contacts 1076 and 1075, the previously mentioned circuits for respectively energizing the windings of the translate relay R1050 and the release relay R1060. Also, the transfer slave relay R1070 completes, at the contacts 1071, an obvious circuit, including the contacts 1112, for energizing the mark magnet MM1172 in the mechanical impulse repeater 1170, thereby to cause the latter magnet to operate. Also, during the second digit 8, each time the line relay R920 restores it completes, at the contacts 922, an obvious circuit, including the contacts 1114, for energizing the receive magnet RM1171 in the mechanical impulse repeater 1170. Accordingly, the impulses of the second digit 8 are repeated by the line relay R920 both to the magnet BM813 of the second code switch B810 and to the receive magnet RM1171 of the mechanical impulse repeater 1170.

At the conclusion of the second digit 8, the wipers noted of the second code switch B810 engage the eighth contacts in the associated contact banks, and the second digit 8 is registered in the mechanical impulse repeater 1170. Shortly following the conclusion of the second digit 8 the transfer relay R860 restores to interrupt, at the contacts 861, the previously traced circuit for energizing the magnet SM834 in order to cause the latter magnet to restore; whereupon the wipers noted of the sequence switch S830 are driven into engagement with the second contacts in the associated contact banks. Also, the transfer relay R860 interrupts, at the contacts 862, the previously traced circuit for energizing the winding of the transfer slave relay R1070, thereby to cause the latter relay to restore. Upon restoring, the transfer slave relay R1070 interrupts, at the contacts 1071, the previously traced circuit for energizing the mark magnet MM1172 in the mechanical impulse repeater 1170, thereby to cause the latter magnet to restore and mark the completion of the second digit 8. Also, the transfer slave relay R1070 prepares, at the contacts 1076 and 1075, respectively, the previously mentioned circuits for energizing the translate relay R1050 and the release relay R1060. In the present example, the circuit for energizing the winding of the translate relay R1050 is not completed in view of the fact that the first digit 3 registered in the first code switch A800, in combination with the second digit 8 registered in the second code switch B810, does not indicate that the digits mentioned received from the calling private subscriber substation TP are to be translated; moreover, the circuit for energizing the winding of the release relay R1060 is not completed in view of the fact that the first digit 3 registered in the first code switch A800, in combination with the second digit 8 registered in the second code switch B810, does not indicate that a register translator will not be utilized ultimately.

When the wipers noted of the sequence switch S830 are driven into engagement with the second contacts in the associated contact banks an alternative circuit is completed for energizing the upper winding of the line relay R650 in the primary selector 40, this circuit extending from ground by way of the contacts 921, the wiper 801 of the first code switch A800 and the engaged third contact in the associated contact bank, the wiper 811 of the second code switch B810 and the engaged eighth contact in the associated contact bank; the wiper 831 of the sequence switch S830 and the engaged second contact in the associated contact bank, the contacts 1051, C514, the wiper 504 of the finder switch F500, the contacts 644 and 693, and the upper winding of R650 to battery. When thus energized the line relay R650 reoperates to complete, at the contacts 651, the previously traced circuit for energizing the winding of the hold relay R655, thereby to cause the latter relay to reoperate.

The subscriber at the calling private subscriber substation TP then proceeds to dial the third digit 1 at this time, whereupon the line relay R920 in the primary register 50 again follows the impulse transmitted over the private subscriber line 401. The line relay R920 repeats the impulse of the third digit 1 by way of the ground contacts 921 over the previously traced circuit to the line relay R650 in the primary selector 40, whereby the line relay R650 controls the vertical magnet M611 to drive the wiper set of the switch mechanism 600 one step in the vertical direction. Also, the line relay R920 completes and then interrupts, at the contacts 924, a circuit substantially identical to that previously traced for energizing in series the winding of the transfer relay R860 and the magnet CM822 of the third code switch C820, the last-mentioned circuit including the wiper 832 of the sequence switch S830 and the engaged second contact in the associated contact bank. When this series circuit is completed the transfer relay R860 operates in order to effect operation of the transfer slave relay R1070, in the manner previously explained. Also, the transfer relay R860 completes, at the contacts 861, the previously traced circuit for energizing the magnet SM834, thereby to cause the latter magnet to operate and condition the wipers noted of the sequence switch S830 to be driven an additional step in the counterclockwise direction. When the magnet CM822 is thus energized and subsequently deenergized the single wiper 821 of the third code switch C820 is driven one step in the counterclockwise direction, and the set of switch springs CS823 is actuated.

Upon operating, the transfer slave relay R1070 again completes, at the contacts 1071, the previously traced circuit for energizing the mark magnet MM1172 in the mechanical impulse repeater 1170, thereby to cause the latter magnet to reoperate. Further, it is noted that the line relay R920 repeats, by way of the ground contacts 922, the third digit 1 to the receive magnet RM1171 in the mechanical impulse repeater 1170. Further, the transfer slave relay R1070 completes, at the contacts 1072, an obvious path, including the contacts 1113, for short-circuiting the resistor 1118; whereby low resistance battery potential is applied by way of the previously traced path to the conductor C512. The application of low resistance battery potential to the conductor C512 completes a low resistance circuit for energizing in series the upper and lower windings of the transfer relay R660 and the split relay R670 in the primary selector 40; the above-mentioned circuit being substantially identical to that previously traced, the sets of switch springs S615, S616 and S617 being actuated at this time. When this low resistance series circuit is completed for energizing the upper windings of the transfer relay R660 and the split relay R670 the transfer relay R660 is retained in its operated position and the split relay R670 operates. Upon operating, the split relay R670 completes, at the contacts 675, an obvious holding circuit, including the contacts 658, for energizing the lower winding thereof. Also, the split relay R670 prepares the test wiper 603 of the wiper set of the switch mechanism 600 to test the first five trunks terminated by the first five contact sets in the first level of the associated contact bank 700, in a manner more fully explained hereinafter.

At the conclusion of the third digit 1, the single wiper 821 of the third code switch C820 engages the first contact in the associated contact bank and the third digit 1 is registered in the mechanical impulse repeater 1170. Shortly following the third digit 1 the transfer relay R860 restores, thereby to effect the restoration of the transfer slave relay R1070, in the manner previously explained. Also, the transfer relay R860 interrupts, at the contacts 861, the previously traced circuit for energizing the magnet SM834 of the sequence switch S830, thereby to cause the latter magnet to restore and drive the wipers noted of the sequence switch S830 an additional step in the counterclockwise direction.

Upon restoring, the transfer slave relay R1070 interrupts, at the contacts 1071, the previously traced circuit for energizing the mark magnet MM1172 in the mechanical impulse repeater 1170, thereby to cause the latter magnet to restore and mark the third digit 1 in the mechanical impulse repeater 1170. Also, the transfer slave relay R1070 interrupts, at the contacts 1072, the previously traced path for short-circuiting the resistor 1118, which action is without effect at this time. Further, the transfer slave relay R1070 prepares, at the contacts 1076 and 1075, respectively, the previously mentioned circuits for energizing the windings of the translate relay R1050 and the release relay R1060. In the present example, the circuit for energizing the winding of the translate relay R1050 is not completed in view of the fact that the combination of the first digit 3 registered in the first code switch A800 and the second digit 8 registered in the second code switch B810 and the third digit 1 registered in the third code switch C820, does not indicate that the digits mentioned received from the calling private subscriber substation TP are to be translated; while the circuit for energizing the winding of the release relay R1060 is completed in view of the fact that the combination of the first digit 3 registered in the first code switch A800 and the second digit 8 registered in the second code switch B810 and the third digit 1 registered in the third code switch C820 indicates that no register translator is to be utilized and that the call may be extended to its destination directly under the control of the calling device at the calling private subscriber substation TP. More particularly, the circuit for energizing the winding of the release relay R1060 extends from the grounded wiper 821 of the third code switch C820 and the engaged first contact in the associated contact bank, by way of the release conductor C863, the contacts 1075 and the winding of R1060 to battery. When thus energized the release relay R1060 operates to complete, at the contacts 1064, the previously traced holding circuit for energizing the winding thereof, and to interrupt, at the contacts 1061, the previously traced path for applying ground potential to the test conductor C516; thereby to effect the restoration of the cut-in relay R630 and the send relay R640 in the primary selector 40, in the manner previously explained. Also, the release relay R1060 interrupts, at the contacts 1062, the previously traced path for applying resistance battery potential to the conductor C512; thereby to interrupt the previously traced circuit for energizing the upper winding of the transfer relay R660 in series with the upper winding of the split relay R670 in the primary selector 40, whereupon the transfer relay R660 restores shortly thereafter, in the manner previously explained.

Upon restoring, the cut-in relay R630 effects the restoration of the send relay R640, as previously noted, and effects the restoration of the line relay R920 in the primary register 50, as previously explained. Upon restoring, the line relay R920 effects the restoration of the hold relay R1040, whereby the primary register 50 is released in a manner more fully explained hereinafter.

Upon restoring, the send relay R640 recompletes, at the contacts 642 and 645, the previously traced loop circuit extending between the calling private subscriber substation TP and the primary selector 40, this loop circuit including the upper winding of the line relay R650 and the upper windings of the transfer relay R660 and the split relay R670. At this time, the line relay R650 is retained in its operated position and the transfer relay R660 restores shortly thereafter, as previously explained. Upon restoring, the transfer relay R660 initiates the previously described interaction between the step relay R680 and the rotary magnet M612; whereby the first five trunks terminated by the first five contact sets in the first level of the associated contact bank 700 are successively tested by the test wiper 603 of the wiper set of the switch mechanism 600, in a manner substantially identical to that previously explained. More particularly, the test circuit mentioned extends from the test wiper 603 of the wiper set by way of the contacts 672, the contacts 624 of the set of switch springs S623, the contacts 621 of the set of switch springs S620, the contacts 696 and 613, the contacts 619 of the set of switch springs S617, and the winding of the step relay R680 to battery. At this point, it is again noted that the set of switch springs S620 is actuated when the wiper set of the switch mechanism 600 is moved one step in the vertical direction away from its normal vertical position.

The primary selector 40 operates in order to seize an idle one of the trunks in the group terminated by the first five contact sets in the first level of the associated contact bank 700 and extending to an idle first selector in the first group. Assuming that the primary selector 40 seizes a trunk in the group mentioned, extending to the first selector 41, the latter first selector being idle at this time, further operation of the primary selector 40 is arrested. More particularly, the switch-through relay R690 operates in order to effect the restoration of the line relay R650 and the hold relay R655, in the manner previously explained.

When the trunk extending to the first selector 41 is thus seized by the primary selector 40 the first selector 41 operates in order to return ground potential over the seized trunk to the test wiper 603 of the wiper set of the switch mechanism 600, thereby to complete the previously traced holding circuit for energizing the winding of the switch-through relay R690 in series with the winding of the step relay R680 and to complete an obvious alternative holding circuit for energizing the lower winding of the split relay R670 in order to retain the primary selector 40 in its operated position. Also, at this time, the ground potential returned from the first selector 41 over the seized trunk to the test wiper 603 of the wiper set of the switch mechanism 600 is applied to the control conductor C423 of the trunk 420, thereby to retain the line switch 30 in its operated position. At this time, the loop circuit extending from the calling private subscriber substation TP is extended by way of the line switch 30 and the primary selector 40 to the first selector 41; and the first selector 41 is conditioned to be responsive to a digit dialed thereinto.

The subscriber at the calling private subscriber substation TP then proceeds to dial the fourth digit 0, the fifth digit 9, the sixth digit 0 and the seventh digit 1, successively, in the usual manner. The operation of the first selector 41, in response to the fourth digit 0, the operation of the second selector 42, in response to the fifth digit 9, and the operation of the individual connector 43, in response to the sixth digit 0 and the seventh digit 1, are entirely conventional; thereby to cause the connection to be forwarded to the private subscriber line 404 extending to the called private subscriber substation TX. The individual connector 43 operates to cause ringing current to be projected over the private subscriber line 404 to the called private subscriber substation TX, thereby to operate the ringer thereat. When the call is answered at the called private subscriber substation TX an obvious communication connection is completed between the calling private subscriber substation TP and the called private subscriber substation TX.

When the individual connector 43 seizes the private subscriber line 404 extending to the called private subscriber substation TX, apparatus therein operates in order to mark the private subscriber line 404 as busy to the other connectors having access thereto.

It should be noted that the incoming toll lines and the incoming trunks, such as 713, terminate in individual incoming first selector switches, similar to first selector 41, and have their bank contacts multipled together with the bank contacts of the local first selector switches 41, so that incoming calls from subscribers in zones 46, 62, 73 and other exchanges in zone 38 may be completed through the local second selectors 42 and connectors, individual or party, to the local subscribers in zone 38, exchange 1.

The apparatus may be arranged for either calling party or last party release. However, assuming that the apparatus is arranged for calling party release, when the subscriber at the calling private subscriber substation TP replaces the receiver of the telephone instrument thereat upon its associated switchhook the previously traced loop circuit extending between the calling private subscriber substation TP and the individual connector 43 is interrupted, thereby to cause the individual connector 43 to be released. When the individual connector 43 is thus released the private subscriber line 404 extending to the called private subscriber substation TX is marked as idle to the connectors having access thereto, assuming that the subscriber at the called private subscriber substation TX has, at this time, replaced the receiver of the telephone instrument thereat upon its associated switchhook. Further, the release of the individual connector 43 effects the release of the second selector 42 and the first selector 41, in a well-known manner, and causes ground potential to be removed from the control conductor of the trunk seized by the wiper set of the switch mechanism 600 in the primary selector 40; whereby ground potential is removed from the test wiper 603 of the wiper set in order to interrupt the previously traced holding circuit for energizing the winding of the switch-through relay R690 in series with the winding of the step relay R680 and the previously traced holding circuit for energizing the lower winding of the split relay R670. The switch-through relay R690 and the split relay R670 then restore in order to effect the release of the primary selector 40 and the line switch 30, in the manner previously explained. When the line switch 30 is released the private subscriber line 401 extending to the calling private subscriber substation TP is marked as idle to the connectors having access thereto. Accordingly, at this time, all of the apparatus utilized in the established connection between the calling private subscriber substation TP and the called private subscriber substation TX is completely released and available for further use.

In the foregoing explanation of the mode of operation of the primary selector 40 it was assumed that there was an idle first selector in the first group, including the first selector 41; however, it may occur that there is no idle first selector in the group mentioned at this time. In this event, the step relay R680 and the rotary magnet M612 interact, in the manner previously explained; whereby the wiper set of the switch mechanism 600 is driven in the rotary direction to engage the sixth contact set in the first level in the associated contact bank 700, whereupon the set of switch springs S623 is actuated. More particularly, the set of switch springs S623 is actuated to complete, at the contacts 625 thereof, a direct ground circuit, including the contacts 674, the contacts 621 of the set of switch springs S620, the contacts 696, 613 and the contacts 619 of the set of switch springs S617 for energizing the winding of the step relay R680. Accordingly, the step relay R680 and the rotary magnet M612 continue to interact in order to drive the wiper set of the switch mechanism 600 eleven steps in the rotary direction away from its normal rotary position, whereupon the sets of switch springs S626 and S627 are actuated. The set of switch springs S626 is actuated into engagement in order to cause busy tone current to be returned over the previously traced loop circuit extending between the calling private subscriber substation TP and the primary selector 40 in order to indicate to the subscriber thereat the all-busy condition mentioned. The subscriber at the calling private subscriber substation TP then effects the release of the primary selector 40 and the line switch 30, in the manner previously explained, by replacing the receiver of the telephone instrument at the calling private subscriber substation TP upon its associated switchhook.

In view of the foregoing explanation of the mode of operation of the primary selector 40 and the primary register 50 to effect the extension of a call from the calling private subscriber substation TP to the called private subscriber substation TX, it will be understood that this equipment is operative, in a substantially identical manner, to effect the extension of a call from the calling private subscriber substation TP to any one of the called party subscriber substations TS1, TS2, TS3 and TS4; or from the calling private subscriber substation TX to the called private subscriber substation TP or to any one of the called party subscriber substations TS1, TS2, TS3 and TS4; or from any one of the calling party subscriber substations TS1, TS2, TS3 or TS4 to the called private subscriber substation TP or TX.

*Calls to other exchanges in zone 38*

Assuming that the call extending from the calling private subscriber substation TP to the primary selector 40 and the primary register 50 is to be extended to a called subscriber substation in exchange 5 zone 38, the subscriber at the calling private subscriber substation TP proceeds to dial the directory number of the called subscriber substation. The directory number of the called subscriber substation comprises a code portion, including the digits 385, identifying the called zone and exchange, and a numerical portion, including four digits, such, for example, as the digits 1234, identifying the line terminal of the subscriber line extending thereto.

Accordingly, the subscriber at the calling private subscriber substation TP proceeds to dial the first digit 3, the second digit 8 and the third digit 5, in the manner previously explained. The line relay R920 in the register translator 50 follows the first digit 3, the second digit 8 and the third digit 5, thereby to cause the respective digits to be registered in the first code switch A800, the second code switch B810 and the third code switch C820. The line relay R920 in the primary register 50 repeats the first digit 3 to the line relay R650 in the primary selector 40 in order to cause the wiper set of the switch mechanism 600 in the primary selector 40 to be driven three steps, in the manner previously explained. At the conclusion of the first digit 3, the wiper 831 of the sequence switch S830 in the primary register 50 disengages the home contact in the associated contact bank, thereby to interrupt the previously traced circuit for energizing the upper winding of the line relay R650, thereby to cause the latter relay to restore and effect the release of the wiper set of the switch mechanism 600 in the primary selector 40, in the manner previously explained. The line relay R920 in the primary register 50 does not repeat the second digit 8 to the line relay R650 in the primary selector 40 due to the fact that the wiper 831 of the sequence switch S830 engages the first contact in the associated contact bank during the second digit 8. Finally, the line relay R920 in the primary register 50 repeats the third digit 5 to the line relay R620 in the primary selector 40 due to the fact that the wiper 831 of the sequence switch S830 engages the second contact in the associated contact bank during the third digit 5. The circuit for repeating the third digit 5 to the upper winding of the line relay R650 in the primary selector 40 extends from the grounded contacts 921 governed by the line relay R920 by way of the wiper 801 of the first code switch A800 and the engaged third contact in the associated contact bank, the wiper 811 of the second code switch B810 and the engaged eighth contact in the associated contact bank, the wiper 831 of the sequence switch S830 and the engaged second contact in the associated contact bank, the contacts 1051, C514, the wiper 504 of the finder switch F500, the contacts 644 and 693 and the upper winding of R650 to battery.

At the conclusion of the third digit 5, the wipers noted of the sequence switch S830 are driven an additional step in the counterclockwise direction, whereupon the wiper 831 thereof disengages the second contact in the associated contact bank in order to interrupt the previously traced circuit for energizing the upper winding of the line relay R650 in the primary selector 40; whereupon the latter relay restores in order to effect the release of the wiper set in the switch mechanism 600 in the primary selector 40, in the manner previously explained.

Also, at the conclusion of the third digit 5, the wiper 821 of the third code switch C820 engages the fifth contact in the associated contact bank, whereupon a circuit is completed for energizing the winding of the translate relay R1050 incident to the restoration of the transfer slave relay R1070, the latter relay restoring incident to the restoration of the transfer relay R860 following the third digit 5, in the manner previously explained. The circuit for energizing the winding of the translate relay R1050 extends from the grounded wiper 821 of the third code switch C820 and the engaged fifth contact in the associated contact bank, C864, the contacts 1076 and the winding of R1050 to battery. When thus energized the translate relay R1050 operates to complete, at the contacts 1056, an obvious holding circuit, including the contacts 1063 and 1047, for energizing the winding thereof. Also, the second digit 8 and third digit 5 are registered and stored in the mechanical impulse repeater 1170 in the manner previously explained.

Upon operating, the translate relay R1050 effects operation of the register translator allotter 60 in order to cause an idle one of the register translators in the associated group to be connected to the primary register 50, in a manner more fully explained hereinafter. For example, the register translator 70 may be connected to the primary register 50 by way of the finder switch F1180. When the register translator 70 is connected to the primary register 50 the send switch U840 operates to transmit the first digit 3 to the register translator 70 to be registered while the mechanical impulse repeater 1170 operates to transmit the second digit 8 and the third digit 5 to the register translator 70 to be registered. The fourth digit 1, the fifth digit 2, the sixth digit 3 and the seventh digit 4 are subsequently received by the primary register 50, then stored in the mechanical impulse repeater 1170, and finally transmitted therefrom to the register translator 70 to be registered. The three code digits 3, 8 and 5 registered in the register translator 70 effects operation of the latter apparatus to select a route extending from exchange 1 zone 38 to exchange 5 zone 38, in a manner more fully explained hereinafter. Subsequently, the register translator 70 operates in order to transmit the four numerical digits 1, 2, 3 and 4 over the selected route in order to cause the automatic switching apparatus in exchange 5 zone 38 to seize the subscriber line extending to the called subscriber substation, whereby a connection is completed between the calling private subscriber substation TP in exchange 1 zone 38 and the called subscriber substation in exchange 5 zone 38.

The exact mode of operation of the primary register 50 and the register translator 70, in order to effect the completion of the established connection mentioned above, is explained more fully hereinafter. Also, the release of this established connection is under the control of the subscriber at the calling private subscriber substation TP and is effected when this subscriber replaces the receiver of the telephone instrument upon its associated switchhook. The detailed operation of the apparatus, incident to the release of this established connection, is described more fully hereinafter.

*Toll calls from exchange 1 zone 38 to exchange 4 zone 62*

Assuming that the call extending from the calling private subscriber substation TP to the primary selector 40 and the primary register 50 is to be extended to a called subscriber substation in exchange 4 zone 62, the subscriber at the calling private subscriber substation TP proceeds to dial the directory number of the called subscriber substation. The directory number of the called subscriber substation comprises a code portion, including the digits 624 identifying the called zone and exchange, and a numerical portion including four digits, such, for example, as the digits 1234, identifying the line terminal of the subscriber line extending to the called subscriber substation.

Accordingly, the subscriber at the calling private subscriber substation TP proceeds to dial the first digit 6, thereby to cause the digit mentioned to be registered in the first code switch A800 in the primary register 50. Also, the wiper set of the switch mechanism 600 is operated to its sixth vertical level in accordance with the first digit 6, in the manner previously described. In the primary register 50, at the conclusion of the first digit 6, the line relay R920, the hold relay R1040, the transfer relay R860 and the transfer slave relay R1070 occupy their operated positions; the digit cutoff relay R1110 occupies its partially operated position; the wipers noted of the first code switch A800 engage the sixth contacts in the associated contact banks; and the magnet SM834 of the sequence switch S830 occupies its operated position. In the primary selector 40, the cut-in relay R630, the send relay R640, the line relay R650, the hold relay R655, the transfer relay R660 and the step relay R680 occupy their operated positions; while the wiper set of the switch mechanism 600 occupies its sixth vertical level.

Shortly following the conclusion of the first digit 6 the transfer relay R860 restores in order to effect the restoration of the transfer slave relay R1070, in the manner previously explained. Also, upon restoring, the transfer relay R860 interrupts, at the contacts 861, the previously traced circuit for energizing the magnet SM834 of the sequence switch S830, thereby to cause the latter magnet to restore in order to drive the wipers noted of the sequence switch S830 one step in the counterclockwise direction. When the wipers noted of the sequence switch S830 disengage the home contacts in the associated contact banks the previously traced circuit, including the grounded contact 921 and the wiper 831 of the sequence switch S830 and the engaged home contact in the associated contact bank, is interrupted for energizing the winding of the line relay R650 in the primary selector 40, thereby to cause the latter relay to restore. Upon restoring, the line relay R650 effects the restoration of the hold relay R655, which latter relay effects the operation of the release magnet M614; whereby the wiper set of the switch mechanism 600 is returned to its normal vertical position, in the manner previously explained. When the wiper set of the switch mechanism 600 is returned to its normal vertical position the sets of switch springs S615, S616 and S617 are actuated, in the manner previously described.

Upon restoring, the transfer slave relay R1070 interrupts, at the contacts 1074, the previously traced path for short-circuiting the upper winding of the digit cutoff relay R1110, thereby to cause the latter relay to operate fully, as previously noted. Also, the transfer slave relay R1070 prepares, at the contacts 1076 and 1075, respectively, the previously mentioned circuits for energizing the windings of the translate relay R1050 and the release relay R1060. In the present example, the circuit for energizing the winding of the translate relay R1050 is completed in view of the fact that the first digit 6 registered in the first code switch A800 indicates that the digit mentioned received from the calling private subscriber substation TP is to be translated; while the circuit for energizing the winding of the release relay R1060 is not completed in view of the fact that the first digit 6 registered in the first code switch A800 indicates that a register translator is to be utilized in extending the call from the calling private subscriber substation TP. More particularly, the circuit for energizing the winding of the translate relay R1050 extends from ground by way of the contacts 921, the wiper 801 of the first code switch A800 and the engaged sixth contact in the associated contact bank, the translate conductor C864, the contacts 1076 and the winding of R1050 to battery. When thus energized the translate relay R1050 operates to complete, at the contacts 1056, an obvious holding circuit, including the contacts 1047 and 1063, for energizing the winding thereof. Also, the translate relay R1050 interrupts, at the contacts 1051, a further point in the previously traced path for applying ground potential to the conductor C514; and prepares, at the contacts 1052, an alternative path for applying ground potential to the conductor C514, for a purpose more fully explained hereinafter. Further, the translate relay R1050 interrupts, at the contacts 1058, an obvious path for applying ground potential to the test conductor C984; and completes, at the contacts 1057, an obvious path for applying battery potential by way of the windings of the cutoff relays R950 and R1080 to the test conductor C984, thereby to mark the primary register 50 as a calling primary register, Also, the translate relay R1050 completes, at the contacts 1059, an obvious circuit, including the contacts 1065 and 1083, for energizing the winding of the start relay R1150 in the register translator allotter 60.

When thus energized the start relay R1150 operates to complete, at the contacts 1151, a path for applying battery potential by way of the magnet FM1162 and the contacts 1163 to the single wiper 1161 of the finder switch F1160. At this point, it is noted that the wiper 1161 of the finder switch F1160 normally engages a contact in the associated contact bank terminating a start conductor extending to one of the register translators in the associated group. In the event the last-mentioned register translator is idle, high resistance ground potential appears upon the associated start conductor; on the other hand, in the event the last-mentioned register translator is busy, direct ground potential appears upon the associated start conductor. Assuming that the register translator mentioned is busy, direct ground potential appears upon the associated start conductor, thereby to complete a circuit, including the wiper 1161 of the finder switch F1160, for energizing the magnet FM1162. When thus energized the magnet FM1162 operates to condition the wiper 1161 of the finder switch F1160 to be driven one step in the clockwise direction; and to interrupt, at the contacts 1163, the previously traced circuit for energizing the magnet FM1162. Accordingly, the magnet FM1162 restores, thereby to drive the wiper 1161 of the finder switch F1160 one step in the clockwise direction; and to prepare, at the contacts 1163, the previously traced circuit for energizing the magnet FM1162. Hence, the magnet FM1162 operates intermittently, thereby to drive the wiper 1161 of the finder switch F1160 step by step in the clockwise direction until it engages a contact in the associated contact bank terminating a start conductor extending to an idle register translator in the associated group.

Assuming that the register translator 70 is the first idle register translator in the associated group, when the wiper 1161 of the finder switch F1160 engages the contact in the associated contact bank terminating the start conductor C1152 extending to the register translator 70, further operation of the finder switch F1160 is arrested. More particularly, when the wiper 1161 of the finder switch F1160 engages the contact in the associated contact bank terminating the start conductor C1152 extending to the register translator 70, a series circuit is completed for energizing the winding of the start relay R1410 in the register translator 70 and the magnet FM1162, this circuit extending from ground by way of the winding of R1410, the contacts 1451 and 1362, the start conductor C1152, the wiper 1161 of the finder switch F1160 and the engaged contact in the associated contact bank, the contacts 1163, the magnet FM1162 and the contacts 1151 to battery. When this series circuit is completed the start relay R1410 in the register translator 70 operates; however, the magnet FM1162 of the finder switch F1160 does not operate due to the high series resistance of the winding of the start relay R1410.

Upon operating, the start relay R1410 completes, at the contacts 1411, an obvious circuit for energizing the upper winding of the hold relay R1260, thereby to cause the latter relay to operate. Also, the start relay R1410 completes, at the contacts 1412 and 1413, a test circuit including the test conductor C1194 extending to the test wiper 1184 of the finder switch F1180, the winding of the cut-in relay R1360 and the magnet FM1188 of the finder switch F1180. More particularly, the wipers noted of the finder switch F1180 engage contacts in the associated contact banks terminating a group of conductors extending to one of the primary registers in the associated group. Accordingly, at this time, ground potential appears upon the test conductor extending from each primary register, which is not a calling primary register at this time, and is applied to the test wiper 1184 of the finder switch F1180 by way of the engaged contact in the associated contact bank terminating the test conductor mentioned. The application of ground potential to the test wiper 1184 of the finder switch F1180 completes a path including the test conductor C1194, the contacts 1368, 1413, 1360 and 1412 for short-circuiting the winding of the cut-in relay R1360. Also, the application of ground potential to the test wiper 1184 of the finder switch F1180 completes a circuit, including the test conductor C1194, the contacts 1368 and 1413, the conductor C1198, the contacts 1189 and battery, for energizing the magnet FM1188. When thus energized the magnet FM1188 operates to condition the wipers noted of the finder switch F1180 to be driven one step in the counterclockwise direction, and to interrupt, at the contacts 1189, the previously traced circuit for energizing the magnet FM1188. Accordingly, the magnet FM1188 restores, thereby to drive the wipers noted of the finder switch F1180 one step in the counterclockwise direction, and to reprepare, at the contacts 1189, the previously traced circuit for energizing the magnet FM1188. Hence, the magnet FM1188 operates intermittently in order to drive the wipers noted of the finder switch F1180 step by step in the counterclockwise direction until the first calling primary register in the associated group is found.

Assuming that the calling primary register 50 is the first calling primary register in the associated group, when the wipers noted of the finder switch F1180 engage the contacts in the associated contact banks terminating the conductors extending to the primary register 50, further operation of the finder switch F1180 is arrested. More particularly, when the test wiper 1184 of the finder switch F1180 engages the contact in the associated contact bank terminating the test conductor C984, a series circuit is completed for energizing the windings of the cutoff relays R950 and R1080 in the primary register 50 and the cut-in relay R1360 in the register translator 70. This series circuit extends from ground by way of the contacts 1412 and 1360, the winding of R1360, the contacts 1413 and 1368, the test conductor C1194, the test wiper 1184 of the finder switch F1180 and the engaged contact in the associated contact bank, the test conductor C984, the contacts 1057 and the windings of R1080 and R950 to battery. When this series circuit is completed the cutoff relays R950 and R1080 in the primary register 50 and the cut-in relay R1360 in the register translator 70 operate. Upon operating, the cutoff relay R1080 in the primary register 50 completes, at the contacts 1082, a holding circuit, including the contacts 1065 and 1059, for energizing the winding thereof in series with the winding of the cutoff relay R950. Also, the cutoff relay R1080 interrupts, at the contacts 1083, the previously traced circuit for energizing the winding of the start relay R1150 in the register translator allotter 60, thereby to cause the latter relay to restore. Further, the cutoff relay R1080 completes, at the contacts 1082, a path including the contacts 1065, 1059 and 1057 for applying ground potential to the test conductor C984. Upon operating, the cut-in relay R1360 in the register translator 70 interrupts, at the contacts 1360, the previously traced original operating circuit for energizing the winding thereof in series with the windings of the cutoff relays R950 and R1080; and completes, at the contacts 1369, a series holding circuit for energizing the winding thereof and the magnet FM1188 of the finder switch F1180. The last-mentioned holding circuit extends from the grounded test conductor C984 by way of the test wiper 1184 of the finder switch F1180 and the engaged contact in the associated contact bank, C1194, the contacts 1369 and 1265, the winding of R1360, C1198, the contacts 1189 and the magnet FM1188 to battery. When this series holding circuit is completed the cut-in relay R1360 is retained in its operated position. However, the magnet FM1188 of the finder switch F1180 is not operated due to the high series resistance of the winding of the cut-in relay R1360. Also, the cut-in relay R1360 completes, at the contacts 1367, an obvious holding circuit, including the contacts 1263, for energizing the lower winding of the hold relay R1260; and completes, at the contacts 1363, an obvious path for applying direct ground potential to the start conductor C1152, thereby to mark the register translator 70 as busy to the finder switch F1160 in the register translator allotter 60.

Also, the cut-in relay R1360 prepares, at the contacts 1366, a point in a chain circuit, including the chain conductor C1365, for applying ground potential by way of the meter M1365 to the all-trunk-busy conductor C1153 extending to the register translator allotter 60. It will be understood that, when all of the register translators in the associated group are busy, ground potential is applied by way of the winding of the meter M1365, the chain conductor C1365 and the contacts 1366 to the all-trunk-busy conductor C1153 extending to the register translator allotter 60. At this time, in the event operation of the finder switch F1160 in the register translator allotter 60 is initiated, it will operate to seize the all-trunk-busy conductor C1153, thereby to operate the meter M1365 and to arrest further operation of the finder switch F1160 until one of the register translators in the associated group is idle, in an obvious manner. When one of the register translators in the associated group becomes idle, ground potential is removed by way of the meter M1365 and the chain conductor C1365 from the all-trunk-busy conductor C1153; whereupon further operation of the finder switch F1160 in the register translator allotter 60 is initiated to hunt for the idle register translator in the associated group, in an obvious manner.

Further, the cut-in relay R1360 interrupts, at the contacts 1362, the previously traced circuit for energizing the winding of the start relay R1410 in the register translator 70 in series with the magnet FM1162 of the finder switch F1160 in the register translator allotter 60, whereby the start relay R1410 restores. Finally, the cut-in relay R1360 prepares, at the contacts 1361′, 1362′, 1363′ and 1364′, operative connections by way of the finder switch F1180 between the register translator 70 and the primary register 50, for purposes more fully explained hereinafter.

Also, upon operating, the cutoff relay R1080 completes, at the contacts 1086, an alternative circuit for energizing the upper winding of the transfer relay R660 in the primary selector 40; and interrupts, at the contacts 1087, the previously traced original circuit for energizing the upper winding of the transfer relay R660. The alternative circuit mentioned extends from ground by way of the set of switch springs S615, the upper winding of R660, the contacts 691 and 641, the wiper 502 of the finder switch F500, C512, the contacts 1086, C987, the wiper 1187 of the finder switch F1180, C1197 and the contacts 1211 to resistance battery. Also, the cutoff relay R1080 completes, at the contacts 1084, an alternative circuit for energizing the upper winding of the line relay R650 in the primary selector 40, this circuit extending from ground by way of the contacts 1423 and 1361′, C1195, the wiper 1185 of the finder switch F1180, C985, the contacts 1084 and 1052, C514, the wiper 504 of the finder switch F500, the contacts 644 and 693 and the upper winding of R650 to battery. When the above-traced circuit is completed the line relay R650 in the primary selector 40 reoperates in order to effect reoperation of the hold relay R655.

Upon operating, the cutoff relay R950 prepares, at the contacts 951, a test circuit traced hereinafter between the line switch 30 individually associated with the calling private subscriber substation TP and the detector 80. Also, the cutoff relay R950 completes, at the contacts 953 and 955, a circuit for energizing in multiple the upper and lower windings of the pulse relay R930; this circuit extending from ground by way of the multiple in the contact bank associated with the wiper 842 of the send switch U840, the contacts 955, the wiper 842 of the send switch U840 and the engaged home contact in the associated contact bank, the contacts 953 and 931 and the upper and lower windings of R930 to battery. It is noted that an adjustable condenser 934 is included in the circuit for energizing the lower winding of the pulse relay R930, whereby the rate of operation of the pulse relay R930 may be adjusted. When thus energized the pulse relay R930 operates to interrupt, at the contacts 931, the previously traced circuit for energizing in multiple the upper and lower windings thereof, whereupon the pulse relay R930 restores. Accordingly, the pulse relay R930 operates and restores intermittently at a predetermined rate, approximately twenty times per second in the present example.

Further, the cutoff relay R950 completes, at the contacts 954, a circuit for energizing the winding of the control relay R970, this circuit extending from ground by way of the contacts 1053, 972, the contacts 817 of the set of switch springs BS815, the contacts 954 and the winding of R970 to battery. When thus energized the control relay R970 operates to complete, at the contacts 973, an obvious holding circuit, including the contacts 1048, for energizing the winding thereof. Also, the control relay R970 interrupts, at the contacts 972, the previously traced original circuit for energizing the winding thereof; and completes, at the contacts 975, a circuit for energizing the winding of the delay send relay R1030. The last-mentioned circuit extends from ground by way of the wiper 833 of the sequence switch S830 and the engaged first contact in the associated contact bank, the wiper 812 of the second code switch B810 and the engaged home contact in the associated contact bank, the contacts 975 and the winding of R1030 to battery. When thus energized the delay send relay R1030 operates to interrupt, at the contacts 1031, a further point in the previously traced circuit for energizing the send magnet SM1173 in the mechanical impulse repeater 1170; thereby positively to prevent operation of the latter magnet in order to delay the sending operation of the mechanical impulse repeater 1170 at this time.

Also, the control relay R970 completes, at the contacts 971, a circuit for energizing the winding of the send relay R1010, this circuit extending from ground by way of the contacts 1176, 1175 and 1174, the winding of R1010 and the contacts 971 to battery. When thus energized the send relay R1010 operates to complete, at the contacts 1011, an obvious holding circuit for energizing the winding of the send slave relay R1020, thereby to cause the latter relay to operate. Further, the send relay R1010 completes, at the contacts 1012, a circuit, including the contacts 974, for energizing the magnet BM813 of the second code switch B810, thereby to cause the latter magnet to operate and condition the wipers noted of the second code switch B810 to be driven one step in the clockwise direction. Finally, the send relay R1010 completes, at the contacts 1013, a circuit, including the contacts 1081, C983, the wiper 1186 of the finder switch F1180, C1196 and the contacts 1362′ and 1455, for energizing the magnet SM1843 of the register sequence switch S1840 in the register translator 70, thereby to cause the latter magnet to operate in order to condition the wipers noted of the register sequence switch S1840 to be driven one step in the counterclockwise direction.

Each time the pulse relay R930 operates and restores it completes and interrupts, at the contacts 932, an obvious circuit for energizing the magnet UM843 of the send switch U840, thereby to cause the latter magnet to operate and restore; whereby the wipers noted of the send switch U840 are driven step by step in the clockwise direction. Also, each time the pulse relay R930 operates it completes, at the contacts 933, a circuit for energizing in series the windings of the mark relay R1340 and the step relay R1350 in the register translator 70. This circuit extends from the grounded send conductor C865 by way of the contacts 933 and 957, C981, the wiper 1181 of the finder switch F1180, C1191, the contacts 1364′ and the windings of R1350 and R1340 to battery; resistance ground potential being connected to the send conductor C865 by way of the resistor 851 or direct ground potential being connected to the send conductor C865 by way of the wiper 802 of the first code switch A800 and the wiper 841 of the send switch U840, in a manner more fully explained hereinafter. Each time the pulse relay R930 restores it interrupts, at the contacts 933, the above-traced circuit for energizing in series the windings of the step relay R1350 and the mark relay R1340.

When the wipers noted of the send switch U840 are moved one step in the clockwise direction away from their home positions the wiper 842 thereof engages the first contact in the associated contact bank included in the previously mentioned ground multiple, whereby an obvious direct circuit substantially identical to that previously traced is completed for energizing in multiple the upper and lower windings of the pulse relay R930. In the present example, the wiper 802 of the first code switch A800 engages the sixth contact in the associated contact bank which is directly multiplied to the fourth contact in the contact bank associated with the wiper 841 of the send switch U840. Accordingly, the pulse relay R930 operates and restores four times to transmit four high resistance ground impulses by way of the resistor 851 over the send conductor C865; and then operates and restores to send one direct ground impulse by way of the wiper 802 and the engaged sixth contact in the associated contact bank of the first code switch A800 and the wiper 841 of the send switch U840 and the engaged fourth contact in the associated contact bank over the send conductor C865; and then sends a number of additional high resistance impulses by way of the resistor 851 over the send conductor C865.

Each time a high resistance ground impulse or a direct ground impulse is transmitted over the send conductor C865 the step relay R1350 operates; however, the mark relay R1340 operates only when a direct ground impulse is sent over the send conductor C865 in view of the fact that the mark relay R1340 is of the marginal type. Hence, at this time, the step relay R1350 operates and restores four times; then the step relay R1350 and the mark relay R1340 operate and restore once; and then the step relay R1350 operates and restores a plurality of times. Each time the step relay R1350 operates and restores it completes and then interrupts, at the contacts 1351, a circuit for energizing the magnet AM1714 of the first code switch A1710, this circuit extending, when completed, from ground by way of the contacts 1351 and 1512, C130 and the magnet AM1714 to battery. Accordingly, the magnet AM1714 operates and restores intermittently, thereby to drive the wipers noted of the first code switch A1710 step by step in the counterclockwise direction. Also, each time the step relay R1350 operates and restores it completes and then interrupts, at the contacts 1352, an obvious circuit for energizing the magnet UMB1832 of the station switch UB1830, whereby the single wiper of the station switch UB1830 is driven step by step in the counterclockwise direction. Each time the mark relay R1340 operates and restores it completes and then interrupts, at the contacts 1341, an obvious path including the wiper 1831 of the station switch UB1830.

In the present example, the step relay R1350 operates and restores four times before it reoperates in conjunction with the mark relay R1340. Accordingly, when the mark relay R1340 operates the wipers noted of the first code switch A1710 have been driven four steps in the counterclockwise direction; similarly, the single wiper 1831 of the station switch UB1830 has been driven four steps in the counterclockwise direction. Accordingly, when the mark relay R1340 operates it completes, at the contacts 1341, the previously mentioned marking circuit, including the wiper 1831 of the station switch UB1830 and the engaged fourth contact in the associated contact bank; thereby to complete an obvious circuit including the conductor C135 for energizing the winding of the first digit relay R1510. When thus energized the first digit relay R1510 operates to complete, at the contacts 1511, an obvious holding circuit, including the grounded hold conductor C1353, for energizing the winding thereof, ground potential being applied to the hold conductor C1353 at the contacts 1264. Also, upon operating, the first digit relay R1510 interrupts, at the contacts 1512, the previously traced circuit for energizing the magnet AM1714, thereby positively to arrest further operation of the first code switch A1710. Accordingly, in the present example, operation of the first code switch A1710 is arrested when the wipers thereof, previously noted, engage the fourth contacts in the associated contact banks. When the wipers 1712 and 1711 of the first code switch A1710 engage the fourth contacts in the associated contact banks the WXYZ marking conductors C1952 are marked in accordance with the code Y—Z corresponding to the digit 6 which is registered in the first code switch A800 in the primary selector 40. Also, when the wiper 1713 of the first code switch A1710 engages the fourth contact in the associated contact bank the fifth wiper 1645 of the wiper set in the composite code switch P1640 is selected and marked with ground potential, for a purpose more fully explained hereinafter.

In view of the foregoing explanation of the mode of operation of the send switch U840 in the primary register 50 and the step relay R1350, the mark relay R1340, the first digit relay R1510 and the first code switch A1710 in the register translator 70, it will be understood that subsequent operation of the step relay R1350 has no effect upon the setting of the first code switch A1710 due to the operation of the first digit relay R1510 following the fourth operation and restoration of the step relay R1350. However, subsequent operation and restoration of the step relay R1350 cause further operation of the station switch UB1830, in the manner explained above. Upon the eighth operation and restoration of the step relay R1350 the wiper 1831 of the station switch UB1830 is driven into engagement with the eighth contact in the associated contact bank terminating the conductor C134, thereby to prepare a circuit for energizing the winding of the extended service relay R1520; however, this circuit is not completed upon the next operation of the pulse relay R930 in view of the fact that the extended service conductor C866 terminated by the eighth contact in the contact bank associated with the wiper 841 of the send switch U840 has no ground potential thereon, the extended service relay R940 occupying its restored position at this time. Similarly, upon the ninth, tenth and eleventh operations and restorations of the step relay R1350, the wiper 1831 of the station switch UB1830 is driven into successive engagement with the respective ninth, tenth and eleventh contacts in the associated contact banks respectively terminating the conductors C133, C132 and C131, thereby successively to prepare circuits for respectively energizing the party relays R1530, R1540 and R1550; however, these circuits are not completed upon the corresponding operations of the pulse relay R930 in view of the fact that the party conductors C867, C868 and C869 respectively terminated by the ninth, tenth and eleventh contacts in the contact bank associated with the wiper 841 of the send switch U840 have no ground potential thereon, the corresponding party relays R1120, R1130 and R1140 occupying their restored positions at this time.

The intermittent operation of the pulse relay R930 in the primary register 50 continues, as explained above, until the wipers noted of the send switch U840 are driven into engagement with the twenty-fourth contacts in the associated contact banks. More particularly, when the wiper 842 of the send switch U840 disengages the twenty-third contact in the associated contact bank the previously traced holding circuit for energizing in multiple the upper and lower windings of the pulse relay R930 is interrupted, thereby to arrest further operation of the latter relay.

The subscriber at the calling private subscriber substation TP then proceeds to dial the second digit 2, thereby to cause the line relay R920 in the primary register 50 to follow the impulses of the digit mentioned. Each time the line relay R920 restores it completes, at the contacts 924, an alternative circuit for energizing the winding of the transfer relay R860, this circuit extending from ground by way of the contacts 924 and 1046, the winding of R860 and the contacts 1055 to resistance battery. When thus energized the transfer relay R860 operates to complete, at the contacts 861, the previously traced circuit for energizing the magnet SM834 of the sequence switch S830, thereby to cause the latter magnet to operate and condition the wipers noted of the sequence switch S830 to be driven an additional step in the counterclockwise direction. Also, the transfer relay R860 completes, at the contacts 862, the previously traced circuit for energizing the winding of the transfer slave relay R1070, thereby to cause the latter relay to operate. Upon operating, the transfer slave relay R1070 completes, at the contacts 1071, the previously traced circuit for energizing the mark magnet MM1172 in the mechanical impulse repeater 1170 in order to cause the latter magnet to operate. Also, the line relay R920 repeats, at the grounded contacts 922, the impulses of the second digit 2 to the receive magnet RM1171 in the mechanical impulse repeater 1170; whereby the receive magnet RM1171 operates and restores in order to register the second digit 2 in the mechanical impulse repeater 1170. When the first impulse of the second digit 2 is registered in the mechanical impulse repeater 1170 the set of switch springs S1177 is actuated into engagement, thereby to prepare a circuit traced hereinafter for energizing the upper winding of the release hold relay R960.

At the conclusion of the second digit 2, the line relay R920 reoperates, thereby to cause the restoration of the transfer relay R860 shortly thereafter. Upon restoring, the transfer relay R860 interrupts, at the contacts 861, the previously traced circuit for energizing the magnet SM834 of the sequence switch S830, thereby to cause the latter magnet to restore and drive the wipers noted of the sequence switch S830 an additional step in the counterclockwise direction. When the wiper 833 of the sequence switch S830 disengages the first contact in the associated contact bank the previously traced circuit for energizing the winding of the delay send relay R1030 is interrupted, thereby to cause the latter relay to restore. Also, the transfer relay R860 interrupts, at the contacts 862, the previously traced circuit for energizing the winding of the transfer slave relay R1070, thereby to cause the latter relay to restore. Upon restoring, the transfer slave relay R1070 interrupts, at the contacts 1071, the previously traced circuit for energizing the mark magnet MM1172 in the mechanical impulse repeater 1170; thereby to cause the latter magnet to restore and mark the digit 2 as registered in the mechanical impulse repeater 1170.

Upon restoring, the delay send relay R1030 completes, at the contacts 1031, an obvious circuit, including the contacts 1021, for energizing the send magnet SM1173 in the mechanical impulse repeater 1170; thereby to cause the latter magnet to operate and interrupt, at the contacts 1174, the previously traced circuit for energizing the winding of the send relay R1010, whereupon the latter relay restores. Upon restoring, the send relay R1010 interrupts, at the contacts 1012, the previously traced circuit for energizing the magnet BM813 of the second code switch B810, thereby to cause the latter magnet to restore and drive the wipers noted of the second code switch B810 one step in the clockwise direction. When the wiper 812 of the second code switch B810 is driven one step in the clockwise direction into engagement with the first contact in the associated contact bank, the previously traced circuit for energizing the winding of the delay send relay R1030 is again completed, this circuit including the grounded wiper 833 of the sequence switch S830 and the engaged second contact in the associated contact bank. When thus energized the delay send relay R1030 reoperates to interrupt, at the contacts 1031, the previously traced circuit for energizing the send magnet SM1173 in the mechanical impulse repeater 1170, thereby to cause the latter magnet to restore in order to recomplete, at the contacts 1174, the previously traced circuit for energizing the winding of the send relay R1010; whereupon the latter relay reoperates. Also, when the send relay R1010 restores, prior to the reoperation thereof described above, it interrupts, at the contacts 1013, the previously traced circuit for energizing the magnet SM1843 of the register sequence switch S1840; thereby to cause the latter magnet to restore and drive the wipers noted of the register sequence switch S1840 one step in the counterclockwise direction.

Upon reoperating, the send relay R1010 recompletes, at the contacts 1012, the previously traced circuit for energizing the magnet BM813 of the second code switch B810, thereby to cause the latter magnet to operate in order to condition the wipers noted of the second code switch B810 to be driven an additional step in the clockwise direction. Also, upon reoperating, the send relay R1010 recompletes, at the contacts 1013, the previously traced circuit for energizing the magnet SM1843; thereby to cause the latter magnet to operate in order to condition the wipers noted of the register sequence switch S1840 to be driven an additional step in the counterclockwise direction.

At this time, the mechanical impulse repeater 1170 proceeds to transmit the second digit 2 registered therein by way of the set of impulse springs S1178. More particularly, the second digit 2 is transmitted by way of the set of impulse springs S1178 in the mechanical impulse repeater 1170 to the magnet BM1723 of the second code switch B1720; the circuit extending, when completed, from ground by way of the set of impulse springs S1178, the contacts 1085, C986, the wiper 1183 of the finder switch F1180, C1193, the contacts 1363', the wiper 1841 of the register sequence switch S1840 and the engaged first contact in the associated contact bank C128 and the winding of BM1723 to battery. Each time the above-traced circuit is completed and then interrupted the magnet BM1723 operates and restores, thereby to drive the wipers noted of the second code switch B1720 one step in the counterclockwise direction; and to complete and then interrupt, at the contacts 1725, an obvious circuit, including the contacts 1252, for energizing the vertical magnet PM1650 of the composite code switch P1640. When the vertical magnet PM1650 is thus energized and subsequently deenergized it operates and then restores, thereby to drive the wiper set of the composite code switch P1640 one step in the vertical direction.

Hence, the mechanical impulse repeater 1170 transmits the second digit 2 by way of the set of impulse springs S1178 to the magnet BM1723 of the second code switch B1720; and the latter magnet repeats to the vertical magnet PM1650 of the composite code switch P1640. After the second digit 2 has been transmitted from the mechanical impulse repeater 1170 the wipers noted of the second code switch B1720 engage the second contacts in the associated contact banks and the wiper set of the composite code switch P1640 occupies its second vertical position. When the wipers noted of the second code switch B1720 engage the second contacts in the associated contact banks the W and Y conductors in the associated set of WXYZ marking conductors 1953 are marked with ground potential, the marking of the set of marking conductors 1953 mentioned corresponding to the digit 2.

The subscriber at the calling private subscriber substation TP then proceeds to dial the third digit 4, thereby to cause the line relay R920 in the primary register 50 to follow the impulses of the digit mentioned. The line relay R920 effects reoperation of the transfer relay R860; and the latter relay effects reoperation of the transfer slave relay R1070, in the manner previously explained. Also, the line relay R920 repeats the impulses of the third digit 4 to the receive magnet RM1171, whereby the third digit 4 is registered in the mechanical impulse repeater 1170, in the manner previously explained. At the conclusion of the third digit 4, the line relay R920 remains reoperated, thereby to effect restoration of the transfer relay R860 and the consequent restoration of the transfer slave relay R1070. The transfer relay R860 causes the wipers mentioned of the sequence switch S830 to be driven an additional step in the counterclockwise direction, in the manner previously explained; whereupon the delay send relay R1030 restores in order to effect reoperation of the send magnet SM1173 in the mechanical impulse repeater 1170. The send magnet SM1173 effects restoration of the send relay R1010, whereupon the wipers noted of the second code switch B810 are driven an additional step in the clockwise direction, thereby to effect reoperation of the delay send relay R1030, in the manner previously explained. Also, the send relay R1010 causes the wipers noted of the register sequence switch S1840 in the register translator 70 to be driven an additional step in the counterclockwise direction, in the manner previously explained. Upon reoperating, the delay send relay R1030 effects the restoration of the send magnet SM1173 in the mechanical impulse repeater 1170, whereby the send relay R1010 is reoperated, in the manner described above.

At this time, the mechanical impulse repeater 1170 transmits the third digit 4 registered therein by way of the set of impulse springs S1178 to the magnet CM1734 of the third code switch C1730. The circuit for energizing the magnet CM1734 extends, when completed, from ground by way of the set of impulse springs S1178 in the mechanical impulse repeater 1170, the contacts 1085, C986, the wiper 1183 of the finder switch F1180, C1193, the contacts 1363', the wiper 1841 of the register sequence switch S1840 and the engaged second contact in the associated contact bank, C127, and the magnet CM1734 to battery. Hence, the magnet CM1734 is operated and restored four times, whereby the wipers noted of the third code switch C1730 are driven four steps in the counterclockwise direction. Also, the magnet CM1734 completes and interrupts four times, at the contacts 1735, an obvious circuit, including the contacts 1251, for energizing the rotary magnet PM1651 of the composite code switch P1640. The consequent operation and restoration of the rotary magnet PM1651, four times, causes the wiper set of the composite code switch P1640 to be driven four steps in the rotary direction. At this time, the wipers noted of the third code switch C1730 engage the fourth contacts in the associated contact banks, thereby to mark the X and Y conductors in the associated set of marking conductors 1954 with ground potential, the marking mentioned of the set of marking conductors 1954 corresponding to the third digit 4.

The subscriber at the calling private subscriber substation TP then proceeds to dial successively the digits 1, 2, 3 and 4 constituting the numerical portion of the directory number; whereby the apparatus in the primary register 50 and the register translator 70 operates, in the manner previously explained, in order to cause the fourth, fifth, sixth and seventh digits mentioned to be registered first in the mechanical impulse repeater 1170 and then to be transmitted therefrom to the register translator 70. The fourth, fifth, sixth and seventh digits are respectively registered in the first numerical switch D1740, the second numerical switch E1750, the third numerical switch F1810 and the fourth numerical switch G1820 in the register translator 70, in a manner substantially identical to that previously explained. At the conclusion of the dialing of the digits mentioned at the calling private subscriber substation TP, the wipers noted of the first numerical switch D1740 engage the first contacts in the associated contact banks, thereby to mark with ground potential the W and X conductors in the associated group of WXYZ marking conductors 1955, the marking mentioned corresponding to the digit 1; the wipers noted of the second numerical switch E1750 engage the second contacts in the associated contact banks, thereby to mark with ground potential the W and Y conductors in the associated group of WXYZ marking conductors 1956, the marking mentioned corresponding to the digit 2; the wipers noted of the third numerical switch F1810 engage the third contacts in the associated contact banks, thereby to mark with ground potential the W and Z conductors in the associated group of WXYZ marking conductors 1957, the marking mentioned corresponding to the digit 3; and the wipers noted of the fourth numerical switch G1820 engage the fourth contacts in the associated contact banks, thereby to mark with ground potential the X and Y conductors in the associated group of WXYZ marking conductors 1958, the marking mentioned corresponding to the digit 4. At this point, it is noted that, when the wipers noted of the second code register B1720 and the third code register C1730 are respectively moved away from their home positions, the sets of switch springs BS1726 and CS1737 are respectively actuated; similarly, when the wipers noted of the first numerical switch D1740, the second numerical switch E1750, the third numerical switch F1810 and the fourth numerical switch G1820 are respectively moved away from their home positions, the sets of switch springs DS1747, ES1756, FS1816 and GS1825 are respectively actuated.

Considering now the operation of the register translator 70 in greater detail, it is pointed out that, after the third digit 4 has been transmitted from the mechanical impulse repeater 1170 in the primary register 50 to the register translator 70, the first digit 6 is registered in the first code switch A1710, the second digit 2 is registered in the second code switch B1720 and the third digit 4 is registered in the third code switch C1730. The wiper 1713 of the first code switch A1710 engages the fourth contact in the associated contact bank, thereby to select the fifth wiper 1645 of the wiper set of the composite code switch P1640; and the wiper set of the composite code switch P1640 occupies its second vertical position and its fourth rotary position. Also, at the conclusion of the third digit 4, the wipers noted of the register sequence switch S1840 are moved to engage the third contacts in the associated contact banks, in the manner previously described. When the wiper 1842 of the sequence switch S1840 engages the third contact in the associated contact bank a circuit is completed for energizing in multiple the upper and lower windings of the pulse relay R1310, this circuit extending from ground by way of the wiper 1842 of the register sequence switch S1840 and the engaged third contact in the associated contact bank, C1471, the contacts 1313 and the windings of R1310 to battery. It is noted that the lower winding of the pulse relay R1310 includes an adjustable condenser 1315, whereby the rate of operation of the pulse relay R1310 may be adjusted. Accordingly, the pulse relay R1310 operates intermittently, approximately twenty times per second in the present example, for a purpose more fully explained hereinafter.

Also, at this time, ground potential is applied by way of the wiper 1713 of the first code switch A1710 and the engaged fourth contact in the associated contact bank to the fifth wiper 1645 of the wiper set in the composite code switch P1640; while the fifth wiper P1645 mentioned engages the 2 up 4 in contact in the associated contact bank, which contact is connected to a predetermined contact in the contact bank associated with the wiper 1628 of the wiper set in the rate and route switch R1620 by way of the jumper 1672. More specifically, for purpose of illustration, the 2 up 4 in contact in the contact bank associated with the fifth wiper 1645 of the wiper set in the composite code switch P1640 is connected to the 9 up 4 in contact in the contact bank associated with the wiper 1628 of the wiper set in the rate and route switch R1620. The 9 up 4 in contact in the contact bank associated with the wiper 1628 corresponds to a routing for the present call via exchange 1 zone 73, the exchange in zone 46 and exchange 1 zone 62 to exchange 4 zone 62, which route comprises four routing digits. The particular four routing digits required do not bear any relationship whatever with respect to the first digit 6, the second digit 2 and the third digit 4 dial; but are designated in conformity with the trunking plan utilized, which is assumed to be via the route specified above. More specifically, the routing digits required in order to route the call via the route specified comprise the four digits 2462. Hence, the first, second and third digits 6, 2 and 4 dialed at the calling private subscriber substation TP must be converted into the four routing digits 2, 4, 6 and 2, which routing digits correspond to the route specified in conformity with the established trunking plan.

Accordingly, the rate and route switch R1620 is operated to its ninth vertical position and its fourth rotary position in order to cause the wipers noted of the wiper set therein to seize the respective 9 up 4 in contacts in the associated contact banks. In order to accomplish this end, the contacts in each level of the contact bank associated with the wiper 1628 of the wiper set in the rate and route switch R1620 are connected by way of individual resistors, each having a high resistance, to the numerically corresponding control contact in the vertical control contact bank associated with the vertical control wiper 1629. For example, each contact in the first level of the contact bank associated with the wiper 1628 of the wiper set in the rate and route switch R1620 is connected by way of an individual resistor 1679 to the first contact in the vertical control contact bank associated with the vertical control wiper 1629.

As previously explained, when the wipers noted of the register sequence switch S1840 engage the third contacts in the associated contact banks, the pulse relay R1310 is set into operation. Each time the pulse relay R1310 operates at this time a circuit is completed for energizing the vertical magnet RM1630 of the rate and route switch R1620, this circuit extending from ground by way of the contacts 1311, 1222 and 1232 and the vertical magnet RM1630 to battery; and each time the pulse relay R1310 restores it interrupts, at the contacts 1311, the previously traced circuit for energizing the vertical magnet RM1630. Accordingly, the vertical magnet RM1630 operates intermittently, thereby to drive the wiper set in the rate and route switch R1620 step by step in the vertical direction. When the vertical control wiper 1629 of the wiper set in the rate and route switch R1620 engages the ninth contact in the associated vertical control contact bank, resistance ground potential is applied thereto by way of the previously traced path, including the jumper 1672, from the grounded wiper 1713 of the first code switch A1710. This application of ground potential to the vertical control wiper 1629 of the wiper set in the rate and route switch R1620 completes a circuit for energizing the upper winding of the transfer relay R1230 in series with the vertical magnet RM1630, this circuit extending from the grounded vertical control wiper 1629 of the wiper set mentioned by way of the upper winding of R1230 and the vertical magnet RM1630 to battery. At this point, it is noted that the above-traced circuit for energizing the upper winding of the transfer relay R1230 is completed when the pulse relay R1310 restores following the ninth impulse, as ground potential is applied by way of the contacts 1311, 1222 and 1232 to the terminal of the upper winding of the transfer relay R1230 prior to the restoration of the pulse relay R1310.

When thus energized the transfer relay R1230 operates to complete, at the contacts 1234, an obvious holding circuit, including the grounded hold conductor C1353, for energizing the lower winding thereof. Further, the transfer relay R1230 interrupts, at the contacts 1232, the previously traced original circuit for energizing the vertical magnet RM1630 of the rate and route switch R1620; and prepares, at the contacts 1233, a circuit for energizing the rotary magnet RM1631 of the rate and route switch R1620. The circuit for energizing the rotary magnet RM1630 extends, when completed, from ground by way of the contacts 1311, 1222 and 1233 and the rotary magnet RM1631 to battery. Accordingly, the intermittent operation of the pulse relay R1310 causes the rotary magnet RM1631 to operate intermittently, thereby to drive the wiper set in the rate and route switch R1620 step by step in the rotary direction.

When the wiper 1628 of the wiper set in the rate and route switch R1620 engages the 9 up 4 in contact in the associated contact bank, direct ground potential is applied thereto by way of the jumper 1672 from the grounded wiper 1713 of the first code switch A1710, thereby to complete a circuit for energizing the lower winding of the stop relay R1220 in series with the rotary magnet RM1630, this circuit extending from the grounded wiper 1628 of the wiper set in the rate and route switch R1620 by way of the lower winding of R1220 and the rotary magnet RM1631 to battery. It is noted that the above-traced circuit for energizing the lower winding of the stop relay R1220 is completed upon the restoration of the pulse relay R1310 following the fourth impulse as direct ground potential is applied by way of the contacts 1311, 1222 and 1233 to one terminal of the lower winding of the stop relay R1220 prior to the restoration of the pulse relay R1310. Further, it is noted that the stop relay R1220 is of the marginal type and will operate only when direct ground potential is encountered by the wiper 1628 of the wiper set in the rate and route switch R1620. When thus energized the stop relay R1220 operates to complete, at the contacts 1224, an obvious holding circuit, including the grounded hold conductor C1353, for energizing the upper winding thereof; and to interrupt, at the contacts 1212, the previously traced original circuit for energizing the rotary magnet RM1631 of the rate and route switch R1620. Accordingly, at this time, the wiper set in the rate and route switch R1620 occupies its ninth vertical and its fourth rotary positions.

It is noted that, when the wiper set in the composite code switch P1640 is moved way from its normal vertical position, the set of switch springs PS1652 is actuated; similarly, when the wiper set in the rate and route switch R1620 is moved away from its normal vertical position the set of switch springs RS1632 is actuated. When the set of switch springs RS1632 is thus actuated a holding circuit for energizing the windings of the pulse relay R1310 is completed, this circuit extending from ground by way of the contacts 1225, the contacts 1635 of the set of switch springs RS1632, C1471, the contacts 1313 and the windings of R1310 to battery. Accordingly, when the stop relay R1220 operates it also interrupts, at the contacts 1225, the above-traced holding circuit for energizing the windings of the pulse relay R1310, thereby to arrest further operation of the latter relay at this time.

Considering now the jumper arrangement among the contacts in the contact banks in the rate and route switch R1620, it is noted that the respective 9 up 4 in contacts in the contact banks respectively associated with the wipers 1625, 1624, 1623 and 1622 of the wiper set in the rate and route switch R1620 are respectively connected by way of the jumper 1675 to the second, fourth, sixth and second marking conductors in the marking cable 1881; while the 9 up 4 in contact in the contact bank associated with the wiper 1621 of the wiper set in the rate and route switch R1620 is connected by way of the jumper 1674 to the control conductor C113.

The operations of the rate and route switch R1620 described above, in response to the operation of the composite code switch P1640, take place in an extremely short interval of time at the third digit 4; and in the meanwhile the subscriber at the calling private subscriber substation TP continues to dial the fourth digit 1, the fifth digit 2, the sixth digit 3 and the seventh digit 4 in order to cause the digits mentioned to be registered in the respective first numerical switch D1740, the second numerical switch E1750, the third numerical switch F1810 and the fourth numerical switch G1820, in the manner previously explained.

Continuing now with the operation of the register translator 70, upon operating, the stop relay R1220 completes, at the contacts 1221, an obvious circuit, including the contacts 1421, for energizing in multiple the upper and lower windings of the pulse relay R1420. It is noted that the upper winding of the pulse relay R1420 includes an adjustable condenser 1324, whereby the rate of operation thereof may be adjusted. In the present instance, the pulse relay R1420 is adjusted to approximately ten impulses per second. Also, the stop relay R1220 completes, at the contacts 1226, a circuit for energizing the winding of the digit spacer relay R1440, this circuit extending from ground by way of the contacts 1226, the wiper 1611 of the digit sequence switch N1610 and the engaged home contact in the associated contact bank, C120, the contacts 1462 and 1453 and the winding of R1440 to resistance battery. At this point, it is noted that the above-traced circuit for energizing the winding of the digit spacer relay R1440 must be initially completed when the pulse relay R1420 occupies its restored position in view of the fact that a path is completed for short-circuiting the winding of the digit spacer relay R1440 prior to the operation thereof and while the pulse relay R1420 occupies its operated position. The path mentioned extends from one terminal of the winding of R1440 by way of the contacts 1422 and 1444 to the other terminal of the winding of R1440.

When thus energized the digit spacer relay R1440 operates to interrupt, at the contacts 1444, a point in the previously traced path for short-circuiting the winding thereof; and to prepare, at the contacts 1443, a circuit traced hereinafter for energizing the magnet KM1924 of the sender switch K1920. The above-mentioned circuit for energizing the magnet KM1924 is completed upon the next operation of the pulse relay R1420 and extends from ground by way of the contacts 1226, the wiper 1611 of the digit sequence switch N1610 and the engaged home contact in the associated contact bank, C120, the contacts 1462, 1453, 1422 and 1443 and the magnet KM1924 to battery. When thus energized the magnet KM1924 operates, thereby to condition the wipers noted of the sender switch K1920 to be driven one step in the counterclockwise direction. When the pulse relay R1420 next restores it interrupts, at the contacts 1422, the previously traced circuit for energizing the magnet KM1924, thereby to cause the latter magnet to restore and drive the wipers noted of the sender switch K1920 one step in the counterclockwise direction. Thus, the pulse relay R1420 causes the wipers noted of the sender switch K1920 to be driven step by step in the counterclockwise direction.

At this point, it is noted that the circuit for energizing the upper winding of the line relay R650 in the primary selector 40 and including the conductor C1195 comprises two branches; the first branch including the grounded contact 1423 of the pulse relay R1420 and the second branch including the wiper 1922 of the sender switch K1920 and the engaged grounded home and first contacts in the associated contact bank. Accordingly, upon operating, the pulse relay R1420 interrupts, at the contacts 1423, the first branch in the circuit for energizing the upper winding of the line relay R650 in the primary selector 40. However, the circuit for energizing the upper winding of the line relay R650 is not interrupted at this time due to the completed second branch therein, including the wiper 1922 of the sender switch K1920 and the engaged home contact in the associated contact bank. Hence, when the wiper 1922 of the sender switch K1920 is driven two steps in the counterclockwise direction it disengages the first contact in the associated contact bank, thereby to interrupt the second branch in the previously traced circuit for energizing the upper winding of the line relay R650 in the primary selector 40. Accordingly, after the wipers noted of the sender switch K1920 engage the second contacts in the associated contact banks, further operation of the pulse relay R1420 is effective intermittently to interrrupt, at the contacts 1423, the first branch in the previously traced circuit for energizing the upper winding of the line relay R650 in the primary selector 40, whereby the line relay R650 follows subsequent impulsing of the pulse relay R1420. The line relay R650 in the primary selector 40 operates intermittently in order to drive the wiper set in the switch mechanism 600 step by step in the vertical direction.

The operation of the pulse relay R1420, described above, continues until the wiper 1923 of the sender switch K1920 engages a mark contact in the associated contact bank; the fourth contact in the contact bank associated with the wiper 1923 being marked in the present instance as this contact terminates the second marking conductor in the marking cable 1881, whereby a circuit is completed for energizing the winding of the digit stop relay R1460. This circuit extends from ground by way of the contacts 1262, the wiper 1613 of the digit sequence switch N1610 and the engaged home contact in the associated contact bank, the wiper 1625 of the wiper set in the rate and route switch R1620 and the engaged 9 up 4 in contact in the associated contact bank, the jumper 1675, the second marking conductor in the marking cable 1881, the wiper 1923 of the sender switch K1920 and the engaged fourth contact in the associated contact bank, and the winding of R1460 to battery. When thus energized the digit stop relay R1460 operates, for a purpose more fully explained hereinafter. At this point, it is noted that, upon operating, the digit spacer relay R1440 completes, at the contacts 1441, a circuit for energizing the magnet NM1614 of the digit sequence switch N1610, this circuit extending from ground by way of the contacts 1461 and 1441 and the magnet NM1614 to battery. When thus energized the magnet NM1614 operates, thereby to condition the wipers noted of the digit sequence switch N1610 to be driven one step in the counterclockwise direction.

Upon operating, the digit stop relay R1460 completes, at the contacts 1466, a holding circuit for energizing the winding thereof, this circuit extending from ground by way of the set of switch springs KS1926, the contacts 1466 and the winding of R1460 to battery. At this point, it is noted that the set of switch springs KS1926 is actuated into engagement when the wipers noted of the sender switch K1920 are driven one step in the counterclockwise direction. Also, the digit stop relay R1460 interrupts, at the contacts 1461, the previously traced circuit for energiing the magnet NM1614, thereby to cause the latter magnet to restore and drive the wipers noted of the digit sequence switch N1610 one step in the counterclockwise direction. Further, the digit stop relay R1460 completes, at the contacts 1465, an obvious path in multiple to the contacts 1423 controlled by the pulse relay R1420, and consequently a holding circuit substantially identical to that previously traced for energizing the upper winding of the line relay R650 in the primary selector 40. Hence, further operation of the line relay R650 in the primary selector 40 is arrested at this time, thereby positively to arrest further movement of the wiper set in the switch mechanism 600; whereby the wiper set in the switch mechanism 600 is arrested in the second vertical position corresponding to the first routing digit 2. Also, the digit stop relay R1460 interrupts, at the contacts 1462, the previously traced circuit for energizing the winding of the digit spacer relay R1440, thereby to cause the latter relay to restore. Upon restoring, the digit spacer relay R1440 completes, at the contacts 1442, an alternative circuit for energizing the magnet KM1924 of the sender switch K1920, this circuit extending from ground by way of the wiper 1921 of the sender switch K1920 and the engaged contact in the associated contact bank, the contacts 1442 and 1925 and the magnet KM1924 to battery. Accordingly, the magnet KM1924 operates intermittently at this time in order to drive the wipers noted of the sender switch K1920 step by step in the counterclockwise direction until the wiper 1921 thereof disengages the twelfth contact and engages the thirteenth contact in the associated contact bank, thereby to interrupt, at the twelfth contact mentioned, the previously traced circuit for energizing the magnet KM1924 and to complete, at the thirteenth contact mentioned, an alternative circuit for energizing the winding of the digit spacer relay R1440. The last-mentioned circuit extends from ground by way of the wiper 1921 of the sender switch K1920 and the engaged thirteenth contact in the associated contact bank, the contacts 1463 and the winding of R1440 to resistance battery.

When thus energized the digit spacer relay R1440 reoperates, thereby to recomplete, at the contacts 1443, an alternative circuit for energizing the magnet KM1924 of the sender switch K1920. The last-mentioned circuit extends from ground by way of the wiper 1921 of the sender switch K1920 and the engaged thirteenth contact in the associated contact bank, the contacts 1463, the contacts 1422, assuming that the pulse relay R1420 is operated at this time, the contacts 1443 and the magnet KM1924 to battery. When the magnet KM1924 is energized it operates, thereby to condition the wipers noted of the sender switch K1920 to be driven an additional step in the counterclockwise direction. Accordingly, at this time, the pulse relay R1420 completes intermittently, at the contacts 1422, the above-traced circuit for energizing the magnet KM1924, thereby to cause the magnet mentioned to operate intermittently; whereupon the wipers noted of the sender switch K1920 are driven additional steps in the counterclockwise direction until the wiper 1921 thereof disengages the seventeenth contact in the associated contact bank and engages the eighteenth contact therein, thereby to interrupt the previously traced alternative circuit for energizing the winding of the digit spacer relay R1440 and the previously traced alternative circuit for intermittently energizing the magnet KM1924. When the previously traced alternative circuit for energizing the winding of the digit spacer relay R1440 is interrupted, the latter relay restores, thereby to complete, at the contacts 1442, the previously traced circuit including the contacts 1925 for energizing the magnet KM1924, thereby to cause the latter magnet again to be energized intermittently; whereupon the wipers noted of the sender switch K1920 are driven step by step in the counterclockwise direction until the wiper 1921 thereof disengages the twenty-fourth contact in the associated contact bank and reengages the home contact therein, thereby to interrupt the above-traced circuit for energizing the magnet KM1924. When the wipers noted of the sender switch K1920 are thus returned to their home positions the set of switch springs KS1926 is actuated, thereby to interrupt the previously traced holding circuit for energizing the winding of the digit stop relay R1460, whereupon the latter relay restores. When the digit stop relay R1460 restores the cycle of operation of the sender switch K1920 is completed.

It is pointed out that the wipers noted in the sender switch K1920 are first driven step by step in the counterclockwise direction away from their home positions at a relatively low speed, thereby to insure that the impulses transmitted to the upper winding of the line relay R650 in the primary selector 40 are at a proper impulsing rate. Upon operation of the digit stop relay R1460 the wipers noted of the sender switch K1920 are driven at a relatively high speed into engagement with the thirteenth contacts in the associated contact banks; and thereafter the wipers noted of the sender switch K1920 are driven at a relatively low speed until they engage the eighteenth contacts in the associated contact banks, thereby to insure a proper time interval or space between successive digits transmitted to the primary selector 40. Finally, the wipers noted of the sender switch K1920 are driven at a relatively high speed after they engage the eighteenth contacts in the associated contact banks back into their home positions.

Accordingly, at this time, the first routing digit 2 registered in the rate and route switch R1620 has been transmitted by the sender switch K1920 to the primary selector 40; the wipers noted of the sender switch K1920 have been returned to their home positions in readiness to transmit the second routing digit 4; and the wipers noted of the digit sequence switch N1610 engage the first contacts in the associated contact banks, thereby to render the control of the sender switch K1920 in accordance with the second routing digit 4 registered in the rate and route switch R1620. Also, at this time, an alternative circuit for energizing the winding of the digit spacer relay R1440 is completed, this circuit extending from ground by way of the contacts 1266, the wiper 1611 of the digit sequence switch N1610 and the engaged first contact in the associated contact bank, C120, the contacts 1462 and 1453 and the winding of R1440 to resistance battery. Accordingly, the digit spacer relay R1440 reoperates, thereby to cause the second routing digit 4 registered in the rate and route switch R1620 to be transmitted by the sender switch K1920, in the manner explained above.

In view of the foregoing explanation of the cycle of operation of the sender switch K1920 to transmit the first routing digit 2 to the primary selector 40, it will be readily understood that the second routing digit 4, the third routing digit 6 and the fourth routing digit 2 will be sequentially transmitted to the primary selector 40, in an identical manner; the first routing digit 2, the second routing digit 4, the third routing digit 6 and the fourth routing digit 2 being registered in the contact banks respectively associated with the wipers 1625, 1624, 1623 and 1622 of the wiper set in the rate and route switch R1620, in the manner previously explained.

At this point, it is noted that the rate and route switch R1620 is adapted to register as many as five routing digits; the actual number of routing digits required for a given call being determined by the trunking plan of the system, four digits being utilized in the present example. In the event all five routing digits are not utilized, the present example, the contacts in the associated contact banks engaged by corresponding ones of the wipers 1625 to 1621, inclusive, are connected by the jumper 1674 to the control conductor C113. Accordingly, in the present case, the 9 up 4 in contact in the contact bank associated with the wiper 1621 of the wiper set in the rate and route switch R1620 is connected by way of the jumper 1674 to the control conductor C113. Hence, at the conclusion of the fourth routing digit 2, when the wiper 1613 of the digit sequence switch N1610 engages the fourth contact in the associated contact bank an alternative circuit is completed for energizing the magnet NM1614, this circuit extending from ground by way of the contacts 1262, the wiper 1613 of the digit sequence switch N1610 and the engaged fourth contact in the associated contact bank, the wiper 1621 of the wiper set mentioned and the engaged 9 up 4 in contact in the associated contact bank, the jumper 1674, the control conductor C113, the contacts 1615 and the magnet NM1614 to battery. When thus energized the magnet NM1614 operates, thereby to interrupt, at the contacts 1615, the previously traced alternative circuit for energizing the magnet mentioned. Hence, the magnet NM1614 operates and restores immediately, thereby to drive the wipers noted of the sequence switch N1610 an additional step in the counterclockwise direction and into engagement with the fifth contacts in the associated contact banks.

In the event the subscriber at the calling private subscriber substation TP has completed the dialing of the fourth digit 1 at this time and has at least started to dial the fifth digit 2, the first numerical switch D1740 has registered therein the fourth digit 1 and the wipers noted of the second numerical switch E1750 have been moved away from their home positions. Accordingly, at this time, both of the sets of switch springs DS1747 and ES1756 have been actuated. When the set of switch springs ES1756 is actuated there is completed, at the contacts 1759 thereof, an alternative circuit for energizing the winding of the digit spacer relay R1440, this circuit extending from the contacts 1759 of the set of switch springs ES1756, by way of C116, the wiper 1611 of the digit sequence switch N1610 and the engaged fifth contact in the associated contact bank, C120, the contacts 1462 and 1453, and the winding of R1440 to resistance battery. Upon operating, the digit spacer relay R1440 recycles the sender switch K1920, thereby to cause the latter switch to transmit directly the fourth digit 1 stored in the first numerical switch D1740. At this point, it is noted that the circuit for energizing the winding of the digit stop relay R1460, after the fourth digit 1 stored in the first numerical switch D1740 has been transmitted by the sender switch K1920 to the primary selector 40, extends from ground by way of the contacts 1262, the wiper 1613 of the digit sequence switch N1610 and the engaged fifth contact in the associated contact bank, C105, the contacts 1243, C110, the wiper 1741 of the first numerical switch D1740 and the engaged first contact in the associated contact bank, the first marking conductor in the marking cable 1881, the wiper 1923 of the sender switch K1920 and the engaged third contact in the associated contact bank, and the winding of R1460 to battery. Accordingly, the sender switch K1920 is operative at this time to transmit to the primary selector 40 the fourth digit 1 stored in the first numerical switch D1740.

In view of the above description of the operation of the second numerical switch E1750 to cause the sender switch K1920 to transmit the fourth digit 1 stored in the first numerical switch D1740 to the primary selector 40, it will be understood that the operation of the third numerical switch F1810 is effective to cause the sender switch K1920 to transmit the fifth digit 2 stored in the second numerical switch E1750 to the primary selector 40. In this case, the alternative circuit for energizing the winding of the digit spacer relay R1440 is substantially identical to that previously traced and includes the contacts 1817 of the set of switch springs FS1816 and the wiper 1611 of the digit sequence switch N1610 and the engaged sixth contact in the associated contact bank; while the alternative circuit for energizing the winding of the digit stop relay R1460 is substantially identical to that previously traced and includes the wiper 1613 of the digit sequence switch N1610 and the engaged sixth contact in the associated contact bank, the wiper 1751 of the second numerical switch E1750 and the engaged second contact in the associated contact bank and the wiper 1923 of the sender switch K1920 and the engaged fourth contact in the associated contact bank.

Similarly, the operation of the fourth numerical switch G1820 is effective to cause the sender switch K1920 to transmit the sixth digit 3 stored in the third numerical switch F1810 to the primary selector 40. In this case, the alternative circuit for energizing the winding of the digit spacer relay R1440 is substantially identical to that previously traced and includes the contacts 1829 of the set of switch springs GS1825, the wiper 1611 of the digit sequence switch N1610 and the engaged seventh contact in the associated contact bank; while the alternative circuit for energizing the winding of the digit stop relay R1460 is substantially identical to that previously traced and includes the wiper 1613 of the digit sequence switch N1610 and the engaged seventh contact in the associated contact bank, the wiper 1811 of the third numerical switch F1810 and the engaged third contact in the associated contact bank, and the wiper 1923 of the sender switch K1920 and the engaged fifth contact in the associated contact bank.

Finally, the operation of the fourth numerical switch G1820 is effective to cause the sender switch K1920 to transmit the seventh digit 4 stored in the fourth numerical switch G1820 to the primary selector 40. In this case, the alternative circuit for energizing the winding of the digit spacer relay R1440 is substantially identical to that previously traced and includes the contacts 1829 of the set of switch springs GS1825 and the wiper 1611 of the digit sequence switch N1610 and the engaged eighth contact in the associated contact bank; while the alternative circuit for energizing the winding of the digit stop relay R1460 is substantially identical to that previously traced and includes the wiper 1613 of the digit sequence switch N1610 and the engaged eighth contact in the associated contact bank, the wiper 1821 of the fourth numerical switch G1820 and the engaged fourth contact in the associated contact bank, and the wiper 1923 of the sender switch K1920 and the engaged sixth contact in the associated contact bank.

Prior to considering further operation of the register translator 70 and the operation of the primary selector 40 in response to the various digits transmitted thereto, the operation of the detector 80 to detect the line terminal of the private subscriber line 401 and, consequently, the numerical portion of the directory number of the calling private subscriber substation TP is described below.

*Operation of the detector*

In the register translator 70, after the third digit 4 is registered in the third code switch C1730, operation of the rate and route switch R1620 is initiated in the manner previously explained. More particularly, when the wiper set in the rate and route switch R1620 is driven nine steps in the vertical direction, the transfer relay R1230 operates in order to cause the wiper set in the last-mentioned switch to be driven step by step in the rotary direction, in the manner previously explained. Also, upon operating, the transfer relay R1230 completes, at the contacts 1235, an obvious path, including the contacts 1323, for applying ground potential to the start conductor C1371 extending to the detector 80. The application of ground potential to the start conductor C1371 completes an obvious circuit for energizing the winding of the start relay R2220 in the detector 80, thereby to cause the latter relay to operate. Upon operating, the start relay R2220 completes, at the contacts 2221, a circuit for energizing the magnet FM2212 of the finder switch F2210, assuming that the detector 80 is idle at this time. The circuit for energizing the magnet FM2212 extends from ground by way of the contacts 2293, 2231 and 2213 and the magnet FM2212 to battery. When thus energized the magnet FM2212 operates to condition the single wiper 2211 of the finder switch F2210 to be driven one step in the counterclockwise direction, and to interrupt, at the contacts 2213, the previously traced circuit for energizing the magnet FM2212. Accordingly, the magnet FM2212 operates intermittently, thereby to drive the wiper 2211 of the finder switch F2210 step by step in the counterclockwise direction until it engages a contact in the associated contact bank terminating a test conductor having battery potential thereon identifying a calling register translator. In the present example, battery potential is applied by way of the storage relay R1330 in the register translator 70 and the contacts 1321 and 1231 to the test conductor C1271, thereby identifying the last-mentioned register translator as a calling register translator. Hence, when the wiper 2211 of the finder switch F2210 engages the contact in the associated contact bank terminating the test conductor C1271, a circuit is completed for energizing in series the winding of the hold relay R2290 in the detector 80 and the winding of the storage relay R1330 in the register translator 70; this circuit extending from ground by way of the winding of R2290, the wiper 2211 of the finder switch F2210 and the engaged contact in the associated contact bank C1271, the contacts 1231 and 1321 and the winding of R1330 to battery. When this series circuit is completed the hold relay R2290 and the storage relay R1330 operate. Upon operating, the hold relay R2290 interrupts, at the contacts 2293, the previously traced circuit for energizing the magnet FM2212 of the finder switch F2210, thereby positively to prevent further operation of the finder switch F2210 at this time. Also, the hold relay R2290 completes, at the contacts 2292, an obvious circuit, including the contacts 2287, for energizing the winding of the test hold relay R2270, thereby to cause the latter relay to operate; and completes, at the contacts 2292, an obvious circuit, including the contacts 2253, for energizing the winding of the release relay R2240, thereby to cause the latter relay to operate. Upon operating, the test hold relay R2270 completes, at the contacts 2275, an obvious circuit for energizing the winding of the test hold relay R2260, thereby to cause the latter relay to operate.

In the register translator 70, upon operating, the storage relay R1330 completes, at the contacts 1331, an obvious circuit for energizing the winding of the storage slave relay R1940, thereby to cause the latter relay to operate. Also, prior to this time, ground potential was applied to the hold conductor C1353, thereby to complete an obvious circuit, including the contacts 1937, for energizing the master magnet SUM1935 of the mechanical storage unit SU1930. When thus energized the master magnet SUM1935 operated to complete, at the contacts 1936, an obvious holding circuit including the resistor 1938 and the grounded hold conductor C1353 for energizing the last-mentioned magnet. Also, upon operating, the master magnet SUM1935 released the mechanical interlock restraining the individual unit or WXYZ magnets in the various code storage devices S1931, S1932, S1933 and S1934 against operation. Upon operating, the storage slave relay R1940 prepares, at the contacts 1947, 1948, 1949 and 1940, etc., circuits for energizing the various WXYZ magnets in the code storage devices S1931, etc. More particularly, the storage slave relay R1940 prepares circuits for energizing the WXYZ magnets in the respective code storage devices S1931, S1932, S1933 and S1934 by way of the respective groups of WXYZ marking conductors 1970, 1979, 1978 and 1977. Further, the storage slave relay R1940 prepares, at the contacts 1942, a circuit traced hereinafter for energizing the winding of the cutoff relay R1320; and completes, at the contacts 1941, a connection between the S lead S431 extending to the line switch 30 individually associated with the private subscriber line 401 and detector 80. This connection extends from the S lead S431 by way of the line switch 30, the control conductor C423 of the trunk 420, the contacts 647, the wiper 503 of the finder switch F500, C515, the contacts 951, C982, the wiper 1182 of the finder switch F1180, C1192, the contacts 1361 and 1941, and C 1971 to one terminal of the winding 2204 of the transformer 2202 in the detector 80. Finally, the storage slave relay R1940 prepares, at the contacts 1943, 1944, 1945 and 1946, paths for applying ground potential to the respective hold conductors C1973, C1974, C1975 and C1976 extending to the detector 80. In the present example, no ground potential is applied to the second, third and fourth hold conductors C1974, C1975 and C1976, respectively, due to the fact that each of the party relays R1530, R1540 and R1550 in the register translator 70 occupies its restored position; however, ground potential is applied to the first hold conductor C1973 due to the fact that each of the party relays R1530, R1540 and R1550 occupies its restored position. The path for applying ground potential to the first hold conductor C1973 extending to the detector 80 includes the contacts 1532, 1542 and 1552 and the conductor C1.

Returning now to the operation of the detector 80, it is pointed out that the S lead S431 also extends directly to the detector 80, the S lead S431 appearing before the tenth A relay in the tenth group, the A relay mentioned being 00A, as previously noted.

Also, upon operating, the hold relay R2290 completes, at the contacts 2291, an obvious multiple circuit, including the contacts 2282 and C2206, for energizing the windings of the ten C relays 0C to 9C, inclusive, thereby to cause the latter relays to operate. Upon operating, the respective C relays 0C to 9C, inclusive, connect the corresponding 100 test leads in the associated ten groups to corresponding ones of the test conductors C2500 to C2509, inclusive, in the group of ten, the ten test conductors mentioned extending to the respective ten amplifiers 0AMP to 9AMP, inclusive, as previously noted. Upon operating, the test hold relay R2260 completes, at the contacts 2262, an obvious path, including the contacts 2273, for applying ground potential to the hold conductor C2297; and completes, at the contacts 2264, an obvious circuit, including the contacts 2286 and 2232, for energizing in multiple the windings of the pulse relay R2230. When thus energized the pulse relay R2230 operates to interrupt, at the contacts 2232, the previously traced circuit for energizing the upper and lower windings thereof, thereby to cause the latter relay to restore. Accordingly, the pulse relay R2230 operates intermittently. It is noted that the rate of operation of the pulse relay R2230 may be adjusted by means of the adjustable condenser 2233 included in the circuit for energizing the lower winding thereof, in the manner previously explained.

Each time the pulse relay R2230 operates it completes, at the contacts 2231, an obvious path for applying ground potential to the pulse conductor C2298. The first time ground potential is applied to the pulse conductor C2298 an obvious circuit, including the contacts KC3, KB3 and KA3, is completed for energizing the winding of the first step relay 1K. When thus energized the first step relay 1K operates to complete, at the contacts 1K3, an obvious path, including the contacts KB1 and the grounded hold conductor C2297, for short-circuiting the winding of the cycle relay KA. Subsequently, when ground is removed from the pulse conductor C2298, a holding circuit is completed for energizing in series the winding of the first step relay 1K and the winding of the cycle relay KA, this circuit extending from the grounded hold conductor C2297 by way of the contacts KB1, the winding of KA, the contacts 1K3, and the winding of 1K to battery. When this series holding circuit is completed the first step relay 1K is retained in its operated position and the cycle relay KA operates. Upon operating, the cycle relay KA interrupts, at the contacts KA1, a point in a holding circuit traced hereinafter for energizing the winding of the cycle relay KC; interrupts, at the contacts KA3, a further point in the previously traced original circuit for energizing the winding of the first step relay 1K; and prepares, at the contacts KA2, a circuit traced hereinafter for energizing the winding of the second step relay 2K. The next time ground potential is applied to the pulse conductor C2298 the previously mentioned circuit for energizing the winding of the second step relay 2K is completed, this circuit extending from the grounded pulse conductor C2298 by way of the contacts KC3, KB3, KA2 and 1K4, and the winding of 2K to battery. When thus energized the second step relay 2K operates to complete, at the contacts 2K3, a path substantially identical to that previously traced for short-circuiting the winding of the cycle relay KB. Subsequently, when ground potential is removed from the pulse conductor C2298 a holding circuit is completed for energizing in series the winding of the second step relay 2K and the winding of the cycle relay KB, this circuit extending from the grounded hold conductor C2297 by way of the contacts KC1, the winding of KB, the contacts 2K3, and the winding of 2K to battery. When this holding circuit is completed the second step relay 2K is retained in its operated position and the cycle relay KB operates. Upon operating, the cycle relay KB interrupts, at the contacts KB1, the previously traced holding circuit for energizing in series the winding of the cycle relay KA and the winding of the first step relay 1K, thereby to cause the latter relays to restore. Also, the cycle relay KB interrupts, at the contacts KB3, a further point in the previously traced original circuit for energizing the winding of the second step relay 2K; and prepares, at the contacts KB2, a point in a circuit substantially identical to that previously traced for energizing the winding of the third step relay 3K. Upon restoring, the cycle relay KA prepares, at the contacts KA1, a point in the previously mentioned holding circuit for energizing the winding of the cycle relay KC.

In view of the above description of the cycle of operation of the step relays 1K, 2K, etc., it will be understood that the step relays 1K to 0K, inclusive, and the cycle relays KA, KB and KC are operated in the following order:

| Number of Operations and Restorations of the Pulse Relay R2230 | Operated Step and Cycle Relays |
|---|---|
| 1 | 1K and KA. |
| 2 | 2K and KB. |
| 3 | 3K and KC. |
| 4 | 4K and KA. |
| 5 | 5K and KB. |
| 6 | 6K and KC. |
| 7 | 7K and KA. |
| 8 | 8K and KB. |
| 9 | 9K and KC. |
| 10 | 0K and KA. |

Also, upon operating, the first step relay 1K completes, at the contacts 1K2, an obvious path, including the contacts 2274 and C2219, for applying ground potential to the first marking conductor in the cable 2601, thereby to complete a circuit for energizing the winding of the first B relay 1B, not shown, in the associated group of ten in order to cause the latter relay to operate, whereby the first group of 1000 S leads is tested, in a manner more fully explained hereinafter; similarly, the second step relay 2K completes, at the contacts 2K2, an obvious path, including the contacts 2274 and C2219, for applying ground potential to the second marking conductor in the cable 2601, thereby to complete a circuit for energizing the winding of the second B relay 2B, not shown, in the associated group of ten in order to cause the latter relay to operate, whereby the second group of 1000 S leads is tested; etc. Finally, the tenth step relay 0K completes, at the contacts 0K2, an obvious path, including the contacts 2274 and C2219, for applying ground potential to the tenth marking conductor C2300 in the cable 2601, thereby to complete an obvious circuit for energizing the winding of the tenth B relay 0B in the associated group of ten in order to cause the latter relay to operate, whereby the tenth group of 1000 S leads is tested.

More particularly, upon operating, the tenth B relay 0B prepares, at the contacts 0B0 to 0B9, inclusive, circuits for energizing the windings of the ten A relays in the associated group, the A relays 00A to 09A, inclusive. At this point, it is again noted that only the ones of the A relays 00A to 09A, inclusive, which are connected to the first hold conductor C1973 are operated at this time in view of the fact that only the first hold conductor C1973 has ground potential thereon, in the present example. Accordingly, at this time, the A relays 00A, 01A, 05A, etc., and 09A are operated while the A relays 02A, 03A and 04A are not operated, the A relays 02A, 03A and 04A being respectively connected to the second, third and fourth hold conductors C1974, C1975 and C1976, respectively. Accordingly, the tenth B relay 0B is operative to effect the testing of the 1000 S leads in the tenth group, in an extremely rapid manner, in view of the fact that 300 of the S leads in the 0 thousand group are eliminated immediately due to the failure of the A relays 02A, 03A and 04A to operate. The circuits for energizing the windings of the various A relays 00A, 01A, etc., associated with the tenth B relay 0B respectively include the contacts 0B0, 0B1, etc., and the grounded first hold conductor C1973.

When thus energized the tenth A relay 00A operates to connect the tenth group of 100 S leads in the 0 thousand group of S leads to the corresponding tenth group of 100 test leads; the first A relay 01A operates to connect the first group of 100 S leads in the 0 thousand group of S leads to the corresponding first group of 100 test leads; etc. Accordingly, at this time, the tenth group of 100 S leads in the 0 thousand group of S leads is connected by the tenth A relay 00A to the tenth group of 100 test leads, and therefrom by the tenth C relay 0C to the tenth test conductor C2500; the first group of 100 S leads in the 0 thousand group of S leads is connected by the first A relay 01A to the first group of 100 test leads, and therefrom by the first C relay 1C to the first test conductor C2501; etc. The tenth test conductor C2500 is connected by way of the tenth amplifier 0AMP to the common conductor C2205; the first test conductor C2501 is connected by way of the first amplifier 1AMP to the common conductor C2205; etc. Finally, the common conductor C2205 is connected to the other terminal of the winding 2204 of the transformer 2202.

At this time, the tone generator 2201 is operating, the circuit for operating the tone generator 2201 being completed at the contacts 2296 due to the operated position of the hold relay R2290. The tone generator 2201 produces a 2000 cycle current which traverses the winding 2203 of the transformer 2202 and induces a corresponding voltage in the winding 2204 of the transformer 2202. The voltage induced in the winding 2204 of the transformer 2202 is connected by way of one terminal thereof, the conductor C1971 and the previously traced path, including the register translator 70, the primary register 50, the primary selector 40 and the line switch 30 to the S lead S431; which latter lead is connected by way of the previously traced path, including the tenth amplifier 0AMP, and the common conductor C2205 to the other terminal of the winding 2204 of the transformer 2202; the above-traced circuit being completed in view of the fact that the S lead S431 extends to the line switch 30 individually associated with the private subscriber line 401, the numerical portion of the directory number of the private subscriber line 401 being 0099, as previously noted. However, the other circuits via the other nine amplifiers are not completed, for the reason noted above.

Hence, at this time, the tenth amplifier 0AMP operates in order to complete an obvious circuit for energizing the winding of the tenth test stop relay 0R. When thus energized the tenth test stop relay 0R operates to complete, at the contacts 0R1, an obvious circuit, including the contacts 227, C2208 and C2600, for energizing the left-hand winding of the tenth test lock relay 0S, thereby to cause the latter relay to operate. Upon operating, the tenth test lock relay 0S completes, at the contacts 0S1, an obvious holding circuit, including the contacts 2295 and C2214, for energizing the right-hand winding thereof in series with the winding of the test relay R2280. When this series circuit is completed the tenth test lock relay 0S is retained in its operated position and the test relay R2280 operates. Upon operating, the test relay R2280 interrupts, at the contacts 2286, the previously traced circuit for energizing the windings of the pulse relay R2230, thereby to cause the latter relay to restore and arrest further cyclic operation of the step relays 0K to 9K, inclusive. Also, the test relay R2280 completes, at the contacts 2289, a holding circuit, including the conductor C2216, the contacts 0S5, C2710 and the contacts 00A1, for energizing the winding of the tenth A relay 00A, thereby to retain the latter relay in its operated position. Further, the test relay R2280 interrupts, at the contacts 2282, the previously traced multiple circuits for energizing the windings of the ten C relays 0C to 9C, inclusive, thereby to cause the latter relay to restore. When the tenth C relay 0C restores it interrupts, at the associated contacts, the previously traced circuit, including the tenth test conductor C2500, for operating the tenth amplifier 0AMP, thereby to cause the latter amplifier to restore in order to effect the restoration of the tenth stop relay 0R.

Further, the test relay R2280 completes, at the contacts 2281, an obvious path, including the contacts 2272, for applying ground potential to the marking conductor C2255; and completes, at the contacts 2280, an obvious path, including the contacts 2279, for applying ground potential to the marking conductor C2215. The application of ground potential to the marking conductor C2255 is effective to complete a path for applying ground potential to certain of the WXYZ conductors in the first group of marking conductors 1970, depending upon the particular operated one of the step relays 0K to 9K, inclusive, at this time. In the present example, the tenth step relay 0K occupies its operated position, a holding circuit being completed for energizing the winding of the tenth step relay 0K and the cycle relay KA at this time. The tenth step relay 0K occupies its operated position in view of the fact that one of the ten amplifiers 0AMP to 9AMP, inclusive, was operated incident to the operation of the tenth B relay 0B, the tenth B relay 0B being operated incident to operation of the tenth step relay 0K, as previously explained. Hence, in the present example, the ground potential appearing upon the marking conductor C2255 is applied by way of the contacts 0K5 and 2312 to the Z conductor in the first group of marking conductors 1970. The application of ground potential to the Z conductor in the first group of marking conductors 1970 completes an obvious circuit for energizing the Z magnet in the first storage device S1931 in the mechanical storage unit SU1930 in the register translator 70; whereby the latter magnet operates in order to effect a mechanical locking of its associated armature under the control of the master magnet SUM1935, whereby ground potential is applied to the Z conductor in the group of WXYZ marking conductors 1960 in the register translator 70, for a purpose more fully explained hereinafter. The marking of the Z conductor in the first group of marking conductors 1970 corresponds to the digit 0, whereby the digit 0 is registered in the first storage device S1931 in the mechanical storage unit SU1930 in the register translator 70. The application of ground potential to the marking conductor C2215 is effective to complete a path for applying ground potential to certain of the WXYZ conductors in the second group of marking conductors 1979, depending upon the particular operated one of the test lock relays 0S to 9S, inclusive, at this time; which, in turn, depends upon which of the ten amplifiers 0AMP to 9AMP, inclusive, was operated during the prior test, as previously explained.

In the present example, the tenth test lock relay 0S occupies its operated position, a holding circuit being completed for energizing the right-hand winding thereof in series with the winding of the test relay R2280 at this time. Hence, in the present example, the ground potential appearing upon the marking conductor C2215 is applied by way of the contacts 0S2 to the Z conductor in the second group of marking conductors 1979. The application of ground potential to the Z conductor in the second group of marking conductors 1979 corresponds to the digit 0 and is effective to cause the digit 0 to be registered in the second storage device S1932 in the mechanical storage unit SU1930, in the manner described above.

Further, upon operating, the test relay R2280 interrupts, at the contacts 2287, the previously traced circuit for energizing the winding of the test hold relay R2270, thereby to cause the latter relay to restore shortly thereafter, the test hold relay R2270 being of the slow-to-release type. Upon restoring, the test hold relay R2270 interrupts, at the contacts 2272, the previously traced path for applying ground potential to the marking conductor C2255; and interrupts, at the contacts 2279, the previously traced path for applying ground potential to the marking conductor C2215. Also, the test hold relay R2270 interrupts, at the contacts 2273, the previously traced path for applying ground potential to the hold conductor C2297, thereby to interrupt the previously traced holding circuit for energizing the winding of the cycle relay KA in series with the tenth step relay 0K in order to cause the latter relays to restore. Also, the test hold relay R2270 interrupts, at the contacts 2274, the previously traced operating circuit for energizing the winding of the tenth B relay 0B, thereby to cause the latter relay to restore; and interrupts, at the contacts 2277, a further point in the previously traced original operating circuit for energizing the left-hand winding of the tenth test lock relay 0S. Further, the test hold relay R2270 completes, at the contacts 2278, an obvious path for applying ground potential to the conductor C2217, thereby to complete a circuit for energizing the winding of one of the ten D relays 0D to 9D, inclusive, depending upon the particular operated one of the ten test lock relays 0S to 9S, inclusive, at this time. In the present example, the tenth test lock relay 0S occupies its operated position; accordingly, the application of ground potential to the conductor C2217 completes an obvious circuit, including the contacts 0S4 and C2700, for energizing the winding of the tenth D relay 0D. When thus energized the tenth D relay 0D operates to connect the tenth group of 100 test leads to the riser cable 2500, for a purpose more fully explained hereinafter. Finally the test hold relay R2270 interrupts, at the contacts 2275, the previously mentioned circuit for energizing the winding of the test hold relay R2260, thereby to cause the latter relay to restore shortly thereafter, the test hold relay R2260 being of the slow-to-release type.

Upon restoring, the test hold relay R2260 completes, at the contacts 2261, an obvious alternative path, including the contacts 2284, for applying ground potential to the hold conductor C2297; and completes, at the contacts 2263, an alternative circuit, including the contacts 2285, 2252 and 2232, for energizing the windings of the pulse relay R2230, whereby the latter relay again operates and restores intermittently. Further, the test hold relay R2260 completes, at the contacts 2267, a circuit, including the contacts 2276 and 2294, for energizing the winding of the switch relay R2310, thereby to cause the latter relay to operate in order to prepare, at the contacts 2311, etc., paths for applying ground potential to the various WXYZ conductors in the third group of marking conductors 1978. Each time the pulse relay R2230 operates and restores at this time, ground potential is again applied and removed from the pulse conductor C2298; whereby the step relays 1K, 2K, etc., are operated sequentially and locked in series with the cycle relays KA, KB, etc., in the manner previously explained.

Upon operating, the first step relay 1K completes, at the contacts 1K1, an obvious path, including the contacts 2265 and C2218, for applying ground potential to the first conductor in the cable 2101, thereby to complete a circuit for energizing the winding of the first E relay 1E, not shown, in the associated group of ten in order to cause the latter relay to operate, whereby the first group of ten conductors in the riser cable 2500 is tested; the group mentioned comprising one of ten groups in the riser cable 2500 which are connected by way of the operated tenth D relay 0D to the tenth group of 100 test leads; which tenth group of 100 test leads is connected by way of the operated tenth A relay 00A to the tenth group of 100 S leads in the 0 thousand group; the tenth group of 100 S leads in the 0 thousand group, including the S lead S431 extending to the line switch 30 individually associated with the private subscriber line 401, as previously noted. Similarly, upon operating, the second step relay 2K completes, at the contacts 2K1, an obvious path, including the contacts 2265 and C2218, for applying ground potential to the second conductor in the cable 2101, thereby to complete a circuit for energizing the winding of the second E relay 2E, not shown, in the associated group of ten in order to cause the latter relay to operate; whereby the second group of ten conductors in the riser cable 2500 is tested, in the manner explained above. Finally, the ninth step relay 9K completes, at the contacts 9K1, an obvious path, including the contacts 2265 and C2218, for applying ground potential to the ninth conductor C2319 in the cable 2101, thereby to complete an obvious circuit for energizing the winding of the ninth E relay 9E in the associated group of ten in order to cause the latter relay to operate; whereby the ninth group of ten conductors in the riser cable 2500 is tested.

More particularly, upon operating, the ninth E relay 9E completes, at the associated contacts, connections between the ten conductors in the ninth group in the riser cable 2500 and the respective ten test conductors C2500 to C2509, inclusive. At this time, the tenth group of 100 S leads in the 0 thousand group is connected by way of the operated tenth A relay 00A to the corresponding tenth group of 100 test conductors; and the ten groups of test leads in the tenth group of test leads are connected by the operated tenth D relay 0D to the ten groups of conductors in the riser cable 2500; and the ten conductors in the ninth group in the riser cable 2500 are respectively connected by the ninth E relay 9E to the respective ten test conductors C2500 to C2509, inclusive.

Hence, at this time, a circuit is completed for operating the ninth amplifier 9AMP in view of the fact that the S lead S431 extends to the line switch 30 individually associated with the private subscriber line 401; the last two digits of the numerical portion of the directory number of the private subscriber line 401 being 99.

Upon operating, the ninth amplifier 9AMP effects operation of the ninth test stop relay 9R, in the manner previously explained. Upon operating, the ninth test stop relay 9R completes, at the contacts 9R2, a circuit for energizing the winding of the ninth test mark relay 9T in series with the winding of the test relay R2250, this circuit extending from ground by way of the contacts 2288 and 2266, the winding of R2250, C2207, the contacts 9R2 and the winding of 9T to battery. When this series circuit is completed the test relay R2250 and the ninth test mark relay 9T operate. Upon operating, the test relay R2250 interrupts, at the contacts 2252, the previously traced alternative circuit for energizing the windings of the pulse relay R2230, thereby to arrest further operation of the latter relay at this time. Also, the test relay R2250 completes, at the contacts 2251, a path, including the contacts 2271 and 2281, for applying ground potential to the marking conductor C2255; and completes, at the contacts 2254, an obvious path for applying ground potential to the marking conductor C2209.

The application of ground potential to the marking conductor C2255 is effective to complete a path for applying ground potential to certain of the WXYZ conductors in the third group of marking conductors 1978, depending upon the particular operated one of the step relays 0K to 9K, inclusive, at this time. In the present example, the ninth step relay 9K occupies its operated position, a holding circuit being completed for energizing the winding of the ninth step relay 9K and the cycle relay KC at this time. The ninth step relay 9K occupies its operated position in view of the fact that one of the ten amplifiers 0AMP to 9AMP, inclusive, operated incident to the operation of the ninth E relay 9E, the ninth E relay 9E being operated incident to operation of the ninth step relay 9K, as previously explained. In the present example, the ground potential appearing upon the marking conductor C2255 is applied by way of the contacts 9K5 and 2313 to the Y conductor in the third group of marking conductors 1978. The application of ground potential to the Y conductor in the third group of marking conductors 1978 corresponding to the digit 9 causes the digit 9 to be registered in the third storage device S1933 in the mechanical storage unit SU1930 in the register translator 70, in the manner previously explained. The application of ground potential to the marking conductor C2209 is effective to complete a path for applying ground potential to certain of the WXYZ conductors in the fourth group of marking conductors 1977, depending upon the particular operated one of the test mark relays 0T to 9T, inclusive, at this time; which in turn depends upon which of the ten amplifiers 0AMP to 9AMP, inclusive, was operated during the prior test, as previously explained. In the present example, the ninth test mark relay 9T occupies its operated position, a circuit being completed for energizing the winding thereof in series with the winding of the test relay R2250 at this time. Hence, in the present example, the ground potential appearing upon the marking conductor C2209 is applied by way of the contacts 9T1 to the Y conductor in the fourth group of marking conductors 1977. The application of ground potential to the Y conductor in the fourth group of marking conductors 1977 corresponding to the digit 9 is effective to cause the digit 9 to be registered in the fourth storage device S1934 in the mechanical storage unit SU1930 in the register translator 70, in the manner described above.

Finally, the test relay R2250 interrupts, at the contacts 2253, the previously traced circuit for energizing the winding of the release relay R2240, thereby to cause the latter relay to restore shortly thereafter, the release relay R2240 being of the slow-to-release type. Upon restoring, the release relay R2240 completes, at the contacts 2241, a circuit for energizing the winding of the cutoff relay R1320 in the register translator 70, this circuit extending from ground by way of the contacts 2283 and 2241, C1972, the contacts 1942, and the winding of R1320 to battery. When thus energized the cutoff relay R1320 operates to complete, at the contacts 1324, an obvious holding circuit, including the grounded hold conductor C1353, for energizing the winding thereof. Also, the cutoff relay R1320 interrupts, at the contacts 1323, the previously traced path for applying ground potential to the start conductor C1371, thereby to interrupt the previously traced circuit for energizing the winding of the start relay R2220 in the detector 80, whereupon the latter relay restores. Also, the cutoff relay R1320 interrupts, at the contacts 1321, the previously traced holding circuit for energizing the winding of the storage relay R1330 in the register translator 70 in series with the winding of the hold relay R2290 in the detector 80, thereby to cause the latter relays to restore. Upon restoring, the storage relay R1330 interrupts, at the contacts 1331, the previously traced circuit for energizing the winding of the storage slave relay R1940, thereby to cause the latter relay to restore. Upon restoring, the storage slave relay R1940 interrupts, at the contacts 1941, the previously traced connection extending between the winding 2204 of the transformer 2202 in the detector 80 and the S lead S431 extending to the line switch 30. Also, the storage slave relay R1940 interrupts, at the contacts 1947, etc., the previously prepared circuits for energizing the various WXYZ magnets in the storage devices in the mechanical storage unit SU1930. Finally, the storage slave relay R1940 interrupts, at the contacts 1943, etc., the previously prepared connections to the four hold conductors C1973, C1974, C1975 and C1976 extending to the detector 80.

At this time, the detector 80 has operated to detect the numerical portion of the directory number of the private subscriber line 401 extending to the calling private subscriber substation TP and has effected the registration of the detected numerical portion of the directory number mentioned in the mechanical storage unit SU1930 in the register translator 70. More particularly, at this time, the four digits 0, 0, 9 and 9 representing the numerical portion of the directory number of the private subscriber line 401 are respectively registered in the first, second, third and fourth code storage devices S1931, S1932, S1933 and S1934 in the mechanical storage unit SU1930 in the register translator 70.

Incident to the restoration of the hold relay R2290 in the detector 80 the release of this detector is effective. More particularly, upon restoring, the hold relay R2290 interrupts, at the contacts 2295, the previously traced holding circuit for energizing the winding of the test relay R2280 in series with the right-hand winding of the test lock relay 0S, thereby to cause the latter relays to restore. Also, the hold relay R2290 interrupts, at the contacts 2294, the previously traced circuit for energizing the winding of the switch relay R2310, thereby to cause the latter relay to restore; and interrupts, at the contacts 2296, the previously traced circuit for operating the tone generator 2201. Upon restoring, the test relay R2280 interrupts, at the contacts 2281, the previously traced path for applying ground potential to the marking conductor C2255; interrupts, at the contacts 2283, the previously traced original circuit for energizing the winding of the cutoff relay R1320 in the register translator 70; and interrupts, at the contacts 2284, the previously traced holding circuit for energizing the winding of the cycle relay KC in series with the winding of the ninth step relay 9K, thereby to cause the latter relays to restore. Further, the test relay R2280 interrupts, at the contacts 2288, the previously traced circuit for energizing the winding of the test relay R2250 in series with the winding of the ninth test marking relay 9T, thereby to cause the latter relays to restore. Further, the test relay R2280 interrupts, at the contacts 2289, the previously traced holding circuit for energizing the winding of the tenth A relay 00A, thereby to cause the latter relay to restore. Finally, the test relay R2280 interrupts, at the contacts 2280, the previously traced path for applying ground potential to the marking conductor C2215. Upon restoring, the ninth step relay 9K interrupts, at the contacts 9K1, the previously traced circuit for energizing the winding of the ninth E relay 9E, thereby to cause the latter relay to restore. At this time, the detector 80 is completely released and available for further use.

*Extension of the call by the register translator*

Incident to the setting up of the present call the register translator 70 first transmits the four routing digits 2462 to the primary selector 40, in the manner previously explained. More particularly, the four routing digts are transmitted by way of the grounded contacts 1423 of the pulse relay R1420, the contacts 1361′, C1195, the wiper 1185 of the finder switch F1180, C985, the contacts 1084 and 1052, C514 and the wiper 504 of the finder switch F500 to the primary selector 40; whereby the line relay R650 follows the first routing digit 2 in order to cause the wiper set of the switch mechanism 600 to be driven two steps in the vertical direction, in the manner previously explained. When the first routing digit 2 is completely transmitted from the register translator 70 the digit stop relay R1460 operates, as previously explained, in order to complete, at the contacts 1465, a holding circuit substantially identical to that traced above for energizing the upper winding of the line relay R650, thereby positively to prevent further operation of the wiper set of the switch mechanism 600 in the primary selector 40 in the vertical direction. Also, the digit stop relay R1460 completes, at the contacts 1467, an obvious circuit for energizing the winding of the control relay R1210 in the register translator 70. When thus energized the control relay R1210 operates to complete, at the contacts 1213, an obvious holding circuit, including the grounded hold conductor C653, for energizing the winding thereof.

Also, the control relay R1210 interrupts, at the contacts 1211, the previously traced holding circuit for energizing the upper winding of the transfer relay R660 in series with the upper winding of the split relay R670 in the primary selector 40, thereby to cause the transfer relay R660 to restore shortly thereafter, the latter relay being of the slow-to-release type. Upon restoring, the transfer relay R660 interrupts, at the contacts 661, the previously traced circuit for energizing the winding of the step relay R680, thereby to cause the latter relay to restore. Upon restoring, the step relay R680 causes operation of the rotary magnet M612, whereby the rotary magnet M612 and the step relay R680 interact, in the manner previously explained, in order to cause the wiper set of the switch mechanism 600 to be driven step by step in the rotary direction to hunt for an idle trunk in the associated group terminated in the second level in the contact bank 700. In this case, the test circuit for energizing the winding of the step relay R680, when the test wiper 603 of the wiper set in the switch mechanism 600 engages a busy contact, extends from the grounded test wiper 603 by way of the contacts 622 of the set of switch springs S620, the contacts 696 and 613, the contacts 619 of the set of switch springs S617, and the winding of R680 to battery. Assuming that the trunk extending to the toll ticket repeater 90 is the first idle trunk in the group terminated in the second level of the contact bank 700 of the switch mechanism 600, the switch mechanism 600 operates in order to cause the wiper set thereof to seize the trunk mentioned; whereby a circuit is completed for energizing the winding of the switch-through relay R690, in the manner previously explained. When thus energized the switch-through relay R690 operates to interrupt, at the contacts 691, a further point in the previously traced holding circuit for energizing the upper winding of the transfer relay R660 in series with the upper winding of the split relay R670; and to interrupt, at the contacts 693, the previously traced holding circuit for energizing the upper winding of the line relay R650, thereby to cause the latter relay to restore and effect restoration of the hold relay R655, in the manner previously explained. Further, the switch-through relay R690 completes, at the contacts 692 and 694, switch-through connections between the line wipers 601 and 602 of the wiper set of the switch mechanism 600 and the register translator 70.

When the primary selector 40 thus operates to seize the trunk extending to the toll ticket repeater 90 the toll ticket reepater 90 is conditioned to respond to the second routing digit 4, the third routing digit 6 and the fourth routing digit 2, and to repeat the routing digits mentioned over the outgoing toll line 712 extending to exchange 1 zone 73. More particularly, at this time, ground potential is applied by way of the contacts 1423 and 1361', C1195, the wiper 1185 of the finder switch F1180, C985, the contacts 1084 and 1052, C514, the wiper 504 of the finder switch F500, the contacts 644 and 694 to the negative line wiper 602 of the wiper set in the switch mechanism 600; and therefrom by way of the negative line conductor of the seized trunk to an impulse relay in the toll ticket repeater 90.

In view of the above description, it will be understood that the first routing digit 2 is transmitted from the register translator 70 over the conductor C1195 to the line relay R650 in the primary selector 40; whereas, the second routing digit 4, the third routing digit 6 and the fourth routing digit 2 are transmitted from the register translator 70 over the conductor C1195 to the impulse relay in the toll ticket repeater 90. Thus, the line relay R650 in the primary selector 40 follows the first routing digit 2 in order to cause a corresponding operation of the primary selector 40, in the manner explained above; while the impulse relay in the toll ticket repeater 90 follows the second routing digit 4, the third routing digit 6 and the fourth routing digit 2 in order to cause these routing digits to be repeated over the toll line 712 extending to exchange 1 zone 73. Further, ground potential in the toll ticket repeater 90 is returned by way of the test wiper 603 of the wiper set in the switch mechanism 600 in order to retain the primary selector 40 and the line switch 30 in their operated positions, in the manner previously explained.

Subsequently, the register translator 70 operates to transmit the fourth, fifth, sixth and seventh digits dialed at the calling private subscriber substation TP, the digits 1, 2, 3 and 4, over the conductor C1195 and the negative line wiper 602 of the wiper set in the switch mechanism 600 to the toll ticket repeater 90. The fourth, fifth, sixth and seventh digits 1, 2, 3 and 4 correspond, respectively, to the numerical portion of the directory number of the called subscriber substation in exchange 4 zone 62; the digits transmitted to the toll ticket repeater 90 being repeated over the toll line 712, in the manner previously explained.

The second routing digit 4 transmitted over the toll line 712 is utilized in automatic switching apparatus in exchange 1 zone 73 to select an idle toll line extending between exchange 1 zone 73 and the exchange in zone 46; the third routing digit 6 transmitted over the toll line 712 is utilized in automatic switching apparatus in the exchange in zone 46 to select an idle toll line extending between the exchange in zone 46 and exchange 1 zone 62; while the fourth routing digit 2 transmitted over the toll line 712 is utilized in automatic switching apparatus in exchange 1 zone 62 to select an idle trunk extending between exchange 1 zone 62 and exchange 4 zone 62. The fourth, fifth, sixth and seventh digits 1, 2, 3 and 4, respectively, corresponding to the numerical portion of the directory number of the called subscriber substation in exchange 4 zone 62, are utilized in automatic switching apparatus in exchange 4 zone 62 to select the line terminal of the subscriber line extending to the called subscriber substation therein. The switching apparatus in exchange 4 zone 62 then operates, in accordance with conventional practice, in order to cause ringing current to be projected over the selected subscriber line extending to the called subscriber substation, thereby to operate the ringer thereat, in a manner well understood.

Returning now to the operation of the register translator 70, when the sixth digit 3 has been dialed at the calling private subscriber substation TP the wiper 1842 of the register sequence switch S1840 engages the sixth contact in the associated contact bank, thereby to prepare a point in an alternative circuit traced hereinafter for energizing the upper and lower windings of the pulse relay R1310; when the second routing digit 4 has been transmitted from the register translator 70 the wiper 1612 of the digit sequence switch N1610 engages the second contact in the associated contact bank, thereby to prepare another point in the previously mentioned alternative circuit for energizing the upper and lower windings of the pulse relay R1310; and when the cutoff relay R1320 operates, incident to the complete operation of the detector 80, it prepares, at the contacts 1322, a further point in the previously mentioned alternative circuit for energizing the upper and lower windings of the pulse relay R1310. At this time, after the sixth digit 3 has been dialed at the calling private subscriber substation TP, after the second routing digit 4 has been transmitted from the register translator 70, and after the numerical portion of the directory number of the calling private subscriber substation TP has been registered in the code storage devices S1931 to S1934, inclusive, in the mechanical code storage unit SU1930, the previously mentioned alternative circuit for energizing the upper and lower windings of the pulse relay R1310 is completed. This circuit extends from the grounded wiper 1842 of the register sequence switch S1840 and the engaged sixth contact in the associated contact bank, the contacts 1322, the wiper 1612 of the digit sequence switch N1610 and the engaged second contact in the associated contact bank, C1471, the contacts 1313 and the upper and lower windings of R1310 to battery. Accordingly, the pulse relay R1310 again operates intermittently, in the manner previously explained.

Upon operating, the pulse relay R1310 completes, at the contacts 1314, an obvoius circuit, including the contacts 1223, for energizing the magnet UM1915 of the storage transfer switch U1910. When thus energized the magnet UM1915 operates, thereby to condition the wipers noted of the storage transfer switch U1910 to be driven one step in the clockwise direction. Upon restoring, the pulse relay R1310 interrupts, at the contacts 1312, the previously mentioned circuit for energizing the magnet UM1915, thereby to cause the latter magnet to restore and drive the wipers noted of the storage transfer switch U1910 one step in the clockwise direction, whereupon the set of switch springs US1917 is actuated. When the set of switch springs US1917 is thus actuated there is completed, at the contacts 1912′ thereof, an obvious holding circuit, including the contacts 1436, C1471 and the contacts 1313, for energizing the upper and lower windings of the pulse relay R1310.

Also, upon operating, the pulse relay R1310 completes, at the contacts 1312, a path for applying ground potential, either direct ground potential by way of the wipers 1912, 1913 or 1914 of the storage transfer switch U1910, or resistance ground potential by way of the resistor 1414 to the conductor C1197. The path for applying resistance ground potential to the conductor C1197 extends from ground by way of the resistor 1414 and the contacts 1364, 1312 and 1212 to the conductor C1197; while the path for applying direct ground potential to the conductor C1197 extends from the ungrounded terminal of the resistor 1414 by way of the previously traced path to the conductor C1197; and from the ungrounded terminal of the resistor 1414 by way of the contacts 1431 to the wipers 1912 and 1913 of the storage transfer switch U1910 or from the ungrounded terminal of the resistor 1414 by way of the contacts 1432 to the wiper 1914 of the storage transfer switch U1910.

Accordingly, each time the pulse relay R1310 operates, resistance ground potential is applied to the conductor C1197 when the selected wiper 1912, 1913 or 1914 of the storage transfer switch U1910 engages a contact in the associated contact bank having no ground potential connected thereto; on the other hand, each time the pulse relay R1310 operates, direct ground potential is applied to the conductor C1197 when the selected wiper 1912, 1913 or 1914 of the storage transfer switch U1910 engages a contact in the associated contact bank having direct ground potential connected thereto.

At this point it is noted that, in the storage transfer switch U1910, the groups of WXYZ marking leads 1951, 1952, 1953, 1954, 1955 and 1956 are terminated, in a clockwise direction, in the contact bank associated with the wiper 1912; the group of WXYZ marking leads 1957 is terminated in both the lower portion of the contact bank associated with the wiper 1912 and the upper portion of the contact bank associated with the wiper 1913; the groups of WXYZ marking leads 1957, 1958, 1959, 1960 and 1961 are terminated, in a clockwise direction, in the contact bank associated with the wiper 1913; the group of WXYZ marking leads 1962 is terminated in both the lower portion of the contact bank associated with the wiper 1913 and the upper portion of the contact bank associated with the wiper 1914; and the group of WXYZ marking leads 1963 is terminated, in a clockwise direction, in the contact bank associated with the wiper 1940. The various WXYZ leads in the group of marking leads 1951 terminate by way of the jumper 1676 in the contact banks associated with the wipers 1626 and 1627 of the wiper set of the rate and route switch R1620. In a similar manner, the groups of WXYZ marking leads 1952, 1953 and 1954 respectively terminate in the contact banks of the first code switch A1710, the second code switch B1720 and the third code switch C1730; the groups of WXYZ marking leads 1955, 1956, 1957 and 1958 respectively terminate in the contact banks of the first numerical switch D1740, the second numerical switch E1750, the third numerical switch F1810 and the fourth numerical switch G1820. The Y lead in the group of WXYZ marking leads 1959 is adapted to be marked with ground potential incident to operation of the extended service relay R1520, in a manner more fully explained hereinafter; while the groups of WXYZ marking leads 1960, 1961, 1962 and 1963 respectively terminate in the code storage devices S1931, S1932, S1933 and S1934 in the mechanical code storage unit SU1930. Also, it is noted that four blank contacts are disposed between the sets of WXYZ leads 1958 and 1959 in the contact bank associated with the wiper 1913 of the storage transfer switch U1910, for a purpose more fully explained hereinafter.

At this time, the wiper set in the rate and route switch R1620 occupies its 9 up 4 in position, thereby to cause a corresponding rate factor applicable to the call from exchange 1 zone 38 to exchange 4 zone 62 to be selected. Assuming that the selected rate factor is 6, the wipers 1626 and 1627 of the wiper set in the rate and route switch R1620 mark the associated WXYZ leads in the group of marking leads 1951 in accordance with the digit 6, the Y and Z leads in the group of marking leads 1951 being marked. Also, the first code digit 6, the second code digit 2 and the third code digit 4 are respectively registered in the first code switch A1710, the second code switch B1720 and the third code switch C1730, thereby to cause the WXYZ leads in the groups of marking leads 1952, 1953 and 1954 to be marked, respectively, in accordance with the digits 2, 6 and 4; similarly, the first numerical digit 1, the second numerical digit 2, the third numerical digit 3 and the fourth numerical digit 4 are respectively registered in the first numerical switch D1740, the second numerical switch E1750, the third numerical switch F1810 and the fourth numerical switch G1820, thereby to cause the WXYZ leads in the groups of marking leads 1954, 1955 and 1956 to be marked, respectively, in accordance with the digits 1, 2, 3 and 4. The extended service relay R1920 does not occupy its operated position in the present example. Accordingly, there is no marking of the WXYZ leads in the group of marking leads 1959. Finally, the digits 0, 0, 9 and 9 are respectively registered in the code storage devices S1931, S1932, S1933 and S1934 in the mechanical storage unit SU1930, thereby to cause the WXYZ leads in the groups of marking leads 1960, 1961, 1962 and 1963 to be marked, respectively, in accordance with the digits 0, 0, 9 and 9.

In the storage transfer switch U1910 the wiper 1912 first successively engages the contacts in the associated contact bank; then the wiper 1913 successively engages the contacts in the associated contact bank; and finally the wiper 1914 successively engage the contacts in the associated contact bank. When the wipers noted of the storage transfer switch U1910 are driven one step in the clockwise direction the set of switch springs US1917 is actuated, as previously noted; whereupon there is completed, at the contacts 1911', a circuit, including the contacts 1433, for energizing the upper winding of the wiper switch relay R1430. When the upper winding of the wiper switch relay R1430 is thus energized this relay operates partially, thereby to complete, at the contacts 1434, an obvious path for short-circuiting the lower winding thereof. After the wipers noted of the storage transfer switch U1910 have been driven one complete revolution back into their home positions the set of switch springs US1917 is again actuated, thereby to interrupt, at the contacts 1911', thereof, the previously mentioned path for short-circuiting the lower winding of the wiper switch relay R1430, whereupon the latter relay operates fully. Upon operating fully, the wiper switch relay R1430 interrupts, at the contacts 1433, a further point in the previously traced original operating circuit for energizing the upper winding thereof, and to transfer, at the contacts 1431 and 1432, the previously traced direct ground path from the wipers 1912 and 1913 of the storage transfer switch U1910 to the wiper 1914 of the storage transfer switch U1910, for a purpose more fully explained hereinafter.

At this time, either direct ground potential or resistance ground potential is applied by way of one of the previously traced paths to the conductor C1197, and therefrom by way of the wiper 1187 of the finder switch F1180, C987, the contacts 1086, C512, the wiper 502 of the finder switch F500, the contacts 641 and 692 and the positive line wiper 601 of the wiper set in the switch mechanism 600 to the positive line conductor of the trunk extending to the toll ticket repeater 90; a step relay and a code relay in the toll ticket repeater being connected between the positive line conductor of the trunk extending thereto and battery. It is noted that the code relay in the toll ticket repeater 90 is of the marginal type. Accordingly, in the toll ticket repeater 90, the step relay operates each time either direct ground potential or resistance ground potential is applied to the conductor C1197 and, consequently, to the positive line conductor of the trunk extending thereto; while the code relay operates only each time direct ground potential is applied to the conductor C1197 and, consequently, to the positive line conductor of the trunk extending thereto.

Also, the toll ticket repeater 90 comprises a register switch and a mechanical code storage unit; the pulse relay R1310 being operative to operate the storage transfer switch U1910 in the register translator 70 and the storage register switch in the toll ticket repeater 90 in synchronism. Accordingly, the code markings corresponding to different digits appearing upon the WXYZ leads in the various groups of marking leads associated with the storage transfer switch U1910 are transferred by way of the storage register switch in the toll ticket repeater 90 to corresponding ones of the code storage devices in the toll ticket repeater 90.

At the conclusion of the cycle of operation of the storage transfer switch U1910 in the register translator 70 and the storage register switch in the toll ticket repeater 90, the various items of record information stored in the register translator 70 have been transferred to the various code storage devices in the mechanical code storage unit in the toll ticket repeater and represent the following information as indicated below:

| Switch in Register Translator 70 Transferred from — | Code Storage Device in Toll Ticket Repeater 90 Transferred to — | Nature of the Record Information |
|---|---|---|
| Rate and route switch R1620 | First | The rate factor applicable to the toll call between the calling private subscriber substation TP in exchange 1 zone 38 and the called subscriber substation in exchange 4 zone 62, the digit 6. |
| First code switch A1710 | Second | The respective first, second and third digits of the code portion of the directory number of the called subscriber substation identifying the zone and exchange thereof, the digits 6, 2 and 4. |
| Second code switch B1720 | Third | |
| Third code switch C1730 | Fourth | |
| First numerical register D1740 | Fifth | The respective first, second, third and fourth digits of the numerical portion of the directory number of the called subscriber substation identifying the subscriber line terminal thereof, the digits 1, 2, 3 and 4. |
| Second numerical register E1750 | Sixth | |
| Third numerical register F1810 | Seventh | |
| Fourth numerical register G1820 | Eighth | |
| | Ninth | |
| Extended service relay R1520 | Tenth | The extended service digit 9 in the event the calling private subscriber substation TP were rendered extended service, no digit being registered. |
| Code storage device S1931 | Eleventh | The respective first, second, third and fourth digits of the numerical portion of the directory number of the calling private subscriber substation TP identifying the subscriber line terminal thereof, the digits 0, 0, 9 and 9. |
| Code storage device S1932 | Twelfth | |
| Code storage device S1933 | Thirteenth | |
| Code storage device S1934 | Fourteenth | |

It is noted that the resistance ground and direct ground impulses transmitted by the pulse relay R1310 over the positive line conductor of the trunk extending to the toll ticket repeater 90 are transmitted simultaneously with the transmission of impulses by the pulse relay R1420 over the negative line conductor of the trunk extending to the toll ticket repeater 90. The impulses transmitted over the positive line conductor of the trunk extending to the toll ticket repeater 90 constitute code digits corresponding to record information digits; while the impulses transmitted over the negative line conductor of the trunk extending to the toll ticket repeater 90 constitute numerical digits corresponding to switch control digits. However, in view of the fact that the pulse relay R1310 operates considerably faster than the pulse relay R1420, the code digits are completely transmitted from the register translator 70 prior to the complete transmission of the numerical digits from the register translator 70.

It is pointed out that, after the wipers noted of the storage transfer switch U1910 in the register translator 70 have been driven one complete revolution in the clockwise direction, the wiper switch relay R1430 operates, as previously explained. Also, upon operating, the wiper switch relay R1430 completes, at the contacts 1437, an alternative circuit for energizing the upper and lower windings of the pulse relay R1310, this circuit extending from ground by way of the contacts 1437, the wiper 1911 of the storage transfer switch U1910 and the engaged home contact in the associated contact bank, the contacts 1435, C1471, the contacts 1313 and the windings of R1310 to battery. After the wipers noted of the storage transfer switch U1910 have been driven one complete revolution in the clockwise direction and six additional steps away from their home positions, all of the record information stored in the register translator 70 has been transferred to the various code storage devices in the mechanical storage unit in the toll ticket repeater 90, in the manner previously explained. Accordingly, when the wiper 1911 of the storage transfer switch U1910 disengages the fifth contact and engages the sixth contact in the associated contact bank, the previously traced alternative circuit for energizing the windings of the pulse relay R1310 is interrupted, thereby to arrest further operation of the latter relay at this time.

After the seventh digit 4 dialed at the calling private subscriber substation TP and registered in the fourth numerical switch G1820 in the register translator 70 has been transmitted therefrom to the toll ticket repeater 90, the wipers noted of the digit sequence switch N1610 are driven an additional step in the counterclockwise direction; whereupon the wiper 1613 of the last-mentioned switch engages the ninth contact in the associated contact bank, thereby to complete an alternative circuit for energizing the magnet NM1614 of the digit sequence switch N1610. The last-mentioned circuit extends from ground by way of the contacts 1262, the wiper 1613 of the digit sequence switch N1610 and the engaged ninth contact in the associated contact bank, C113, the contacts 1615 and the magnet NM1614 to battery. When thus energized the magnet NM1614 operates, thereby to interrupt, at the contacts 1615, the previously traced circuit for energizing the magnet NM1614, whereupon the latter magnet restores. Upon operating and restoring, the magnet NM1614 drives the wipers noted of the digit sequence switch N1610 an additional step in the counterclockwise direction; whereupon the wiper 1612 thereof engages the tenth contact in the associated contact bank in order to complete a further circuit for energizing the upper and lower windings of the pulse relay R1310. This circuit extends from ground by way of the contacts 1437, the wiper 1911 of the storage transfer switch U1910 and the engaged sixth contact in the associated contact bank, C115, the wiper 1612 of the digit sequence switch N1610 and the engaged tenth contact in the associated contact bank, C1471, the contacts 1313 and the windings of R1310 to battery. When this circuit is completed the pulse relay R1310 operates and restores, thereby to complete and interrupt, at the contacts 1312, the previously traced path for applying resistance ground potential by way of the resistor 1414 to the conductor C1197 and, consequently, to the positive line conductor of the trunk extending to the toll ticket repeater 90. Also, the pulse relay R1310 completes and interrupts, at the contacts 1314, the previously traced circuit for energizing the magnet UM1915 of the storage transfer switch U1910, thereby to cause the wipers noted of the last-mentioned switch to be driven an additional step in the clockwise direction; whereupon the wiper 1911 thereof engages the seventh contact in the associated contact bank, for a purpose more fully explained hereinafter.

When this addtional resistance ground impulse is transmitted over the conductor C1197 and consequently the positive line conductor of the trunk extending to the toll ticket repeater 90, the toll ticket repeater 90 switches through, thereby to complete a talking connection between the calling private subscriber substation TP in exchange 1 zone 33 and the called subscriber substation in exchange 4 zone 62.

When the wiper 1911 of the storage transfer switch U1910 engages the seventh contact in the associated contact bank an obvious circuit, including the contacts 1437 and C114, is completed for energizing the upper winding of the release relay R1450, thereby to cause the latter relay to operate. Upon operating, the release relay R1450 interrupts, at the contacts 1451, a further point in the previously traced circuit for energizing the winding of the start relay R1410, the latter relay occupying its restored position at this time. Also, the release relay R1450 prepares, at the contacts 1452, an alternative path for applying ground potential to the start conductor C1152. Further, the release relay R1450 interrupts, at the contacts 1455, the previously traced circuit for energizing the magnet SM1843, thereby to cause the latter magnet to restore and drive the wipers noted of the register sequence switch S1840 an additional step in the counterclockwise direction. Further, the release relay R1450 completes, at the contacts 1454, a circuit including the conductor C1198', the wiper 1188 of the finder switch F1180 and the conductor C988 for energizing the winding of the release relay R1060 in the primary register 50, thereby to cause the latter relay to operate and effect the release of the primary register 50 and the register translator 70.

*Release of the primary register and the register translator*

In the primary register 50, upon operating, the release relay R1060 completes, at the contacts 1064, the previously traced holding circuit for energizing the winding thereof. Also, the release relay R1060 interrupts, at the contacts 1061, the previously traced holding circuit for energizing the winding of the cut-in relay R630 in the primary selector 40 in series with the magnet FM507 of the finder switch F500, thereby to cause the cut-in relay R630 to restore. In the primary selector 40, upon restoring, the cut-in relay R630 interrupts, at the contacts 631 and 632, the previously traced series circuit for energizing the upper and lower windings of the party line relay R910 and the upper winding of the line relay R920 in the primary register 50, thereby to cause the line relay R920 to restore. Further, the cut-in relay R630 interrupts, at the contacts 633, the previously traced holding circuit for energizing the winding of the send relay R640 in the primary selector 40, thereby to cause the latter relay to restore. Upon restoring, the send relay R640 completes, at the contacts 642 and 645, the previously traced connection between the trunk 420 and the wiper set of the switch mechanism 600. Accordingly, at this time, a connection is completed between the calling private subscriber substation TP and the toll line 712 by way of the private subscriber line 401, the line switch 30, the trunk 420, the primary selector 40 and the toll ticket repeater 90; and therefrom by way of the automatic switching apparatus in exchange 1 zone 73, the exchange in zone 46, exchange 1 zone 62 and exchange 4 zone 62 to the subscriber line extending to the called subscriber substation.

In the primary register 50, upon restoring, the line relay R920 interrupts, at the contacts 923, the previously traced circuit for energizing the winding of the hold relay R1040, thereby to cause the latter relay to restore shortly thereafter, the hold relay R1040 being of the slow-to-release type. Also, upon operating, the release relay R1060 interrupts, at the contacts 1065, the previously traced holding circuit for energizing in series the windings of the cutoff relays R1080 and R950, thereby to cause the latter relays to restore. Upon restoring, the hold relay R1040 interrupts, at the contacts 1047, the previously traced holding circuit for energizing in series the upper and lower windings of the digit cutoff relay R1110 thereby to cause the latter relay to restore. Further, the hold relay R1040 completes, at the contacts 1043, a release circuit for energizing the lower winding of the release hold relay R960 in series with the magnet of one of the various switches. At this time, a circuit is completed for energizing the lower winding of the release hold relay R960 in series with the magnet SM834 of the sequence switch S830, the last-mentioned circuit extending from ground by way of the contacts 1043, the lower winding of R960, the contacts 837 of the set of switch springs SS836, the contacts 835 and the magnet SM834 to battery. When this series circuit is completed the release hold relay R960 operates, thereby to complete, at the contacts 961, an alternative holding circuit for energizing the winding of the send relay R1010, thereby to cause the latter relay to remain in its operated position at this time. Also, when the hold relay R1040 restores it interrupts, at the contacts 1048, the previously traced holding circuit for energizing the winding of the control relay R970, thereby to cause the latter relay to restore. Upon restoring, the control relay R970 interrupts, at the contacts 975, the previously traced circuit for energizing the winding of the delay send relay R1030, thereby to cause the latter relay to restore. Further, the control relay R970 interrupts, at the contacts 974, the previously traced circuit for energizing the magnet BM813 of the second code switch B810, thereby to cause the latter magnet to restore and drive the wipers noted an additional step in the clockwise direction.

When the above-traced circuit for energizing the lower winding of the release hold relay R960 in series with the magnet SM834 of the sequence switch S830 is completed, the magnet SM834 operates intermittently, thereby to drive the wipers noted of the sequence switch S830 step by step in the counterclockwise direction back into their home positions. When the sequence switch S830 is thus released the set of switch springs SS836 is actuated, whereupon a circuit substantially identical to that previously traced is completed for energizing the lower winding of the release hold relay R960 in series with the magnet AM803 of the first code switch A800. The last-mentioned circuit extends from ground by way of the previously traced path, the contacts 838 of the set of switch springs SS836, the contacts 806 of the set of switch springs AS805, the contacts 804 and the magnet AM803 to battery. When the magnet AM803 is thus energized it operates intermittently, thereby to drive the wipers noted of the first code switch A800 step by step in the counterclockwise direction back into their home positions.

When the first code switch A800 is thus released the set of switch springs AS805 is actuated, whereupon a circuit substantially identical to that previously traced is completed for energizing the lower winding of the release hold relay R960 in series with the magnet CM822 of the third code switch C820. The last-mentioned circuit extends from ground by way of the previously traced path, the contacts 807 of the set of switch springs AS805, the contacts 824 of the set of switch springs CS823, the contacts 823 and the magnet CM822 to battery.

When the magnet CM822 is thus energized it operates intermittently, thereby to drive the single wiper of the third code switch C820 step by step in the counterclockwise direction back into its home position. When the third code switch C820 is thus released the set of switch springs CS823 is actuated, whereby a circuit substantially identical to that previously traced is completed for energizing the lower winding of the release hold relay R960 in series with the magnet BM813 of the second code switch B810. The last-mentioned circuit extends from ground by way of the previously traced path, the contacts 825 of the set of switch springs CS823, the contacts 816 of the set of switch springs BS815, the contacts 814 and the magnet BM813 to battery. When thus energized the magnet BM813 operates intermittently, thereby to drive the wipers noted of the second code switch B810 step by step in the counterclockwise direction back into their home positions. When the second code switch B810 is thus released the set of switch springs BS815 is actuated, thereby to interrupt, at the contacts 816, the previously traced circuit for energizing the lower winding of the release hold relay R960, whereupon the latter relay restores shortly thereafter. It is noted that, while the release hold relay R960 occupies its operated position, it completes, at the contacts 962, a path, including the contacts 1073 and 1044, for applying ground potential to the test conductor C516, thereby to mark the primary register 50 as busy to the finder switches F500, etc., having access thereto.

Upon restoring, the cutoff relay R950 completes, at the contacts 952 and 956, a circuit for energizing the magnet UM843 of the send switch U840. The last-mentioned circuit extends from the grounded multiple in the contact bank associated with the wiper 842 by way of the contacts 956, the wiper 842 and the engaged twenty-fourth contact in the associated contact bank, the contacts 952 and 844 and the magnet UM843 to battery. When thus energized the magnet UM843 operates and restores, thereby to drive the wipers noted of the send switch U840 an additional step in the clockwise direction back into their home positions. When the send switch U840 is thus released the wiper 842 thereof disengages the twenty-fourth contact in the associated contact bank, thereby to interrupt the above-traced circuit for energizing the magnet UM843.

When the third code switch C820 is thus released the previously traced operating circuit for energizing the winding of the translate relay R1050 is interrupted, the previously traced holding circuit for energizing the winding of the translate relay R1050 being previously interrupted. Accordingly, the translate relay R1050 restores at this time. At this point, it is noted that, until the mechanical impulse repeater 1170 completely repeates the seventh digit 4 to the register translator 70, the set of switch springs S1177 occupies its actuated position, thereby to prepare an obvious holding circuit, including the contacts 1042, for energizing the upper winding of the release hold relay R960. However, at this time, the mechanical impulse repeater 1170 is completely released and the set of switch springs S1177 is actuated into disengagement. Accordingly, the release hold relay R960 restores shortly after the previously traced circuit for energizing the lower winding thereof is interrupted, as previously explained. Upon restoring, the release hold relay R960 interrupts, at the contacts 961, the previously traced alternative circuit for energizing the winding of the send relay R1010, thereby to cause the latter relay to restore. Further, the release hold relay R960 interrupts, at the contacts 962, the previously traced path for applying ground potential to the test conductor C516, thereby to mark the primary register 50 as idle to the finder switches F500, etc., having access thereto. At this time, the primary register 50 is completely released and available for further use.

At this point, it is noted that, in the event one of the party relays R1120, R1130 or R1140 in the primary register 50 has previously occupied its operated position, the operated party relay would be restored incident to the restoration of the hold relay R1040. Similarly, in the event the extended service relay R940 in the primary register 50 had been operated, the latter relay would have been released incident to the restoration of the send relay R640 in the primary selector 40, in the manner previously explained.

When the primary register 50 is released, as explained above, ground potential is removed from the test conductor C1194 incident to the operation of the release relay R1060 in the primary register 50. When ground potential is removed from the test conductor C1194 the previously traced holding circuit for energizing the winding of the cut-in relay R1360 in the register translator 70 and the magnet FM1188 of the finder switch F1180 is interrupted, thereby to cause the cut-in relay R1360 to restore. Upon restoring, the cut-in relay R1360 completes, at the contacts 1362, the previously mentioned alternative path, including the contacts 1452, for applying ground potential to the start conductor C1152, thereby to mark the register translator 70 as busy to the register translator allotter 60. Also, the cut-in relay R1360 interrupts, at the contacts 1367, the previously traced holding circuit for energizing the lower winding of the hold relay R1260, thereby to cause the latter relay to restore. Upon restoring, the hold relay R1260 interrupts, at the contacts 1264, the previously mentioned path for applying ground potential to the hold conductor C1353. When ground potential is removed from the hold conductor C1353 the previously traced holding circuit for energizing the winding of the control relay R1210, for energizing the upper winding of the stop relay R1220, for energizing the lower winding of the transfer relay R1230, for energizing the winding of the cutoff relay R1320, for energizing the upper and lower windings of the wiper switch relay R1430, and for energizing the winding of the first digit relay R1510, are interrupted, thereby to cause the relays mentioned to restore. Also, when ground potential is removed from the hold conductor C1353 the previously traced holding circuit for energizing the master magnet SUM1935 of the mechanical storage unit SU1930 is interrupted, thereby to cause the latter magnet to restore in order to release each of the storage devices S1931, S1932, S1933 and S1934. Further, when ground potential is removed from the hold conductor C1353, the slip relay R1240, the extended service relay R1520 and the various party relays R1530, R1540 and R1550 restore, in the event any one of the relays mentioned occupies its operated position at this time.

Also, upon restoring, the hold relay R1260 completes, at the contacts 1261, a holding circuit for energizing the lower winding of the release magnet R1450 in series with the winding of the release slave relay R1250 and the magnet of one of the various switches. At this time, a circuit is completed for energizing in series the lower winding of the release relay R1450, the winding of the release slave relay R1250 and the magnet NM1614 of the digit sequence switch N1610, this circuit extending from the grounded wiper 1921 of the sender switch K1920 and the engaged home contact in the associated contact bank, the lower winding of R1450, the contacts 1261, the winding of R1250, the contacts 1618 of the set of switch springs NS1616, the contacts 1615 and the magnet NM1614 to battery. When this series circuit is completed the release relay R1450 is retained in its operated position; the release slave relay R1250 operates and the magnet NM1614 operates and restores, thereby to drive the wipers noted of the digit sequence switch N1610 an additional step in the counterclockwise direction back into their home positions. When the digit sequence switch N1610 is thus released the set of switch springs NS1616 is actuated, thereby to complete a circuit substantially identical to that previously traced for energizing in series the lower winding of the release relay R1450, the winding of the slave relay R1250 and the rotary magnet RM1631 of the rate and route switch R1620. The last-mentioned circuit extends from ground by way of the previously traced path, the contacts 1617 of the set of switch springs NS1616, the contacts 1633 of the set of switch springs RS1632, the contacts 1631' and the rotary magnet RM1631 to battery. When this series circuit is completed the rotary magnet RM1631 operates intermittently, thereby to drive the wiper set of the rate and route switch R1620 step by step in the rotary direction until it is driven eleven steps in the rotary direction away from its normal rotary position; whereupon the wiper set is returned to its normal vertical and rotary positions, in a well-known manner. When the rate and route switch R1620 is thus released the set of switch springs RS1632 is actuated, thereby to complete a circuit substantially identical to that previously traced for energizing in series the lower winding of the release relay R1450, the winding of the release slave relay R1250 and the rotary magnet PM1651 of the composite code switch P1640. This series circuit extends from ground by way of the previously traced path, the contacts 1634 of the set of switch springs RS1632, the contacts 1654 of the set of switch springs PS1652, the contacts 1652 and the magnet PM1651 to battery. When this series circuit is completed the rotary magnet PM1651 operates intermittently, thereby to drive the wiper set of the composite code switch P1640 step by step in the rotary direction eleven steps away from its normal rotary position, whereupon the wiper set of the composite code switch P1640 is returned to its normal vertical and rotary positions.

When the composite code switch P1640 is thus released the set of switch springs PS1652 is actuated, thereby to complete a circuit substantially identical to that previously traced for energizing in series the lower winding of the release relay R1450, the winding of the release slave relay R1250 and the magnet GM1824 of the fourth numerical switch G1820. This series circuit extends from ground by way of the previously traced path, the contacts 1653 of the set of switch springs PS1652, C121, the contacts 1828 of the set of switch springs GS1825, the contacts 1826 and the magnet GM1824 to battery. When thus energized the magnet GM1824 operates intermittently, thereby to drive the wipers noted of the fourth numerical switch G1820 step by step in the counterclockwise direction back into their home positions. When the fourth numerical switch G1820 is thus released the set of switch springs GS1825 is actuated, thereby to complete a circuit substantially identical to that previously traced for energizing in series the lower winding of the release relay R1450, the winding of the slave relay R1250 and the magnet FM1814 of the third numerical switch F1810. This series circuit extends from ground by way of the previously traced path, the contacts 1827 of the set of switch springs GS1825, the contacts 1819 of the set of switch springs FS1816, the contacts 1815 and the magnet FM1814. When thus energized the magnet FM1814 operates intermittently, thereby to drive the wipers noted of the third numerical switch F1810 step by step in the counterclockwise direction back into their home positions.

When the third numerical switch F1810 is thus released the set of switch springs FS1816 is actuated, thereby to complete a circuit substantially identical to that previously traced for energizing in series the lower winding of the release relay R1450, the winding of the release slave relay R1250 and the magnet EM1754 of the second numerical switch E1750. This series circuit extends from ground by way of the previously traced path, the contacts 1818 of the set of switch springs FS1816, the contacts 1758 of the set of switch springs ES1756, the contacts 1755 and the magnet EM1754 to battery. When thus energized the magnet EM1754 operates intermittently, thereby to drive the wipers noted of the second numerical switch E1750 step by step in the counterclockwise direction back into their home positions. When the second numerical switch E1750 is thus released the set of switch springs ES1756 is actuated, thereby to complete a circuit substantially identical to that previously traced for energizing in series the lower winding of the release relay R1450, the winding of the release slave relay R1250 and the magnet DM1745 of the first numerical switch D1740. This series circuit extends from ground by way of the previously traced path, the contacts 1757 of the set of switch springs ES1756, the contacts 1749 of the set of switch springs DS1747, the contacts 1746 and the magnet DM1745 to battery. When the magnet DM1745 is thus energized it operates intermittently, thereby to drive the wipers noted of the first numerical switch D1740 step by step in the counterclockwise direction back into their home positions.

When the first numerical switch D1740 is thus released the set of switch springs DS1747 is actuated, thereby to complete a circuit substantially identical to that previously traced for energizing in series the lower winding of the release relay R1450, the winding of the release slave relay R1250 and the magnet CM1734 of the third code switch C1730. This series circuit extends from ground by way of the previously traced path, the contacts 1748 of the set of switch springs DS1747, the contacts 1739 of the set of switch springs CS1737, the contacts 1736 and the magnet CM1734 to battery. When thus energized the magnet CM1734 operates intermittently, thereby to drive the wipers noted of the third code switch C1730 step by step in the counterclockwise direction back into their home positions. When the third code switch C1730 is thus released the set of switch springs CS1737 is actuated, thereby to complete a circuit substantially identical to that previously traced for energizing in series the lower winding of the release relay R1450, the winding of the release slave relay R1250 and the magnet BM1723 of the second code switch B1720. This series circuit extends from ground by way of the previously traced path, the contacts 1738 of the set of switch springs CS1737, the contacts 1728 of the set of switch springs BS1726, the contacts 1724 and the magnet BM1723 to battery. When thus energized the magnet BM1723 operates intermittently, thereby to drive the wipers noted of the second code switch B1720 step by step in the counterclockwise direction back into their home positions. When the second code switch B1720 is thus released the set of switch springs BS1726 is actuated, thereby to complete a circuit substantially identical to that previously traced for energizing in series the lower winding of the release relay R1450, the winding of the release slave relay R1250 and the magnet AM1714 of the first code switch A1710. This series circuit extends from ground by way of the previously traced path, the contacts 1727 of the set of switch springs BS1726, the contacts 1717 of the set of switch springs AS1716, the contacts 1715 and the magnet AM1714 to battery. When thus energized the magnet AM1714 operates intermittently, thereby to drive the wipers noted of the first code switch A1710 step by step in the counterclockwise direction back into their home positions.

When the first code switch A1710 is thus released the set of switch springs AS1716 is actuated, thereby to complete a circuit substantially identical to that previously traced for energizing in series the lower winding of the release relay R1450, the winding of the release slave relay R1250, and the magnet UM1915 of the storage transfer switch U1910. This series circuit extends from ground by way of the previously traced path, the contacts 1718 of the set of switch springs AS1716, C129, the contacts 1918 of the set of switch springs US1917, the contacts 1916, and the magnet UM1915 to battery. When thus energized the magnet UM1915 operates intermittently, thereby to drive the wipers noted of the storage transfer switch U1910 step by step in the clockwise direction back into their home positions. When the storage transfer switch U1910 is thus released the set of switch springs US1917 is actuated, thereby to complete a circuit substantially identical to that previously traced for energizing in series the lower winding of the release relay R1450, the winding of the release slave relay R1250, and the magnet UMB1832 of the station switch UB1830. This circuit extends from ground by way of the previously traced path, the contacts 1919 of the set of switch springs US1917, C136, the contacts 1836 of the set of switch springs UBS1834, the contacts 1833 and the magnet UBM1832 to battery. When thus energized the magnet UBM1832 operates intermittently, thereby to drive the single wiper of the station switch UB1830 step by step in the counterclockwise direction back into its home position. When the station switch UB1830 is thus released the set of switch springs UBS1834 is actuated, thereby to complete a circuit substantially identical to that previously traced for energizing in series the lower winding of the release relay R1450, the winding of the release slave relay R1250, and the magnet SM1843 of the register sequence switch S1840. This series circuit extends from ground by way of the previously traced path, the contacts 1835 of the set of switch springs UBS1834, the contacts of the set of switch springs SS1845, the contacts 1844, and the magnet SM1843 to battery. When thus energized the magnet SM1843 operates intermittently, thereby to drive the wipers noted of the register sequence switch S1840 step by step in the counterclockwise direction back into their home positions. When the register sequence switch S1840 is thus released the set of switch springs SS1845 is actuated, thereby to interrupt the previously traced holding circuit for energizing in series the lower winding of the release relay R1450 and the winding of the release slave relay R1250; whereupon the latter relays restore shortly thereafter, the release relay R1450 and the release slave relay R1250 being of the slow-to-release type.

Upon restoring, the release relay R1450 recompletes, at the contacts 1451, the previously traced path for applying ground potential by way of the winding of the start relay R1410 to the start conductor C1152, thereby to mark the register translator 70 as idle to the register translator allotter 60. At this time, the register translator 70 is completely released and available for further use.

*Additional operation of the toll ticket repeater*

Again considering the operation of the toll ticket repeater 90, a connection has been established between the calling private subscriber substation TP and the subscriber line extending to the called subscriber substation. In the event the called subscriber substation is busy at this time, busy tone current is returned from the automatic switching apparatus in exchange 4 zone 62 over the previously traced connection to the toll line 712; and therefrom by way of the toll ticket repeater 90, the primary selector 40, the line switch 30 and the private subscriber line 401 to the calling private subscriber substation TP, thereby to indicate that the called subscriber substation is busy in accordance with conventional practice. On the other hand, in the event the called subscriber substation is idle at this time, ringing current is projected over the subscriber line extending thereto and ring-back tone current is returned over the previously traced connection to the calling private subscriber substation TP, thereby to operate the ringer thereat in order to give the subscriber at the calling private subscriber substation TP supervision.

When the subscriber at the called subscriber substation in exchange 4 zone 62 answers the call extending thereto an operative communication connection is completed between the calling private subscriber substation TP in exchange 1 zone 38 and the called subscriber substation in exchange 4 zone 62; and an answer relay in the toll ticket repeater 90 operates, thereby to initiate a timing operation in the toll ticket repeater 90, whereby the duration of the call is registered in the toll ticket repeater 90. More particularly, the timing apparatus in the toll ticket repeater 90 operates progressively to register both the ten minute and the unit minute time intervals of the established connection, a minimum time interval of three minutes being automatically established shortly following the completion of the established connection. Also, it is noted that the toll ticket repeater 90 comprises an alarm apparatus which is operative in the event the established connection is maintained a time interval of 99 minutes.

It is pointed out that the charge for a toll call is normally assessed against the calling subscriber substation; however, facility is provided in the toll ticket repeater 90 for assessing the charge for the toll call against the called subscriber substation, thereby effecting a reversal of charges for the toll connection. In the present example, in the event the charge for the toll call extending between the calling private subscriber substation TP in exchange 1 zone 38 and the called subscriber substation in exchange 4 zone 62 is to be reversed and assessed against the called subscriber substation in exchange 4 zone 62, the subscriber at the called subscriber substation in exchange 4 zone 62 dials the single digit 0 over the established connection without either the subscriber at the calling private subscriber substation TP in exchange 1 zone 38 or the subscriber at the called subscriber substation in exchange 4 zone 62 replacing the receiver of the telephone instrument thereat upon its associated switchhook.

*Operation of the toll ticketing apparatus*

In the present example, assuming that the established connection between the calling private subscriber substation TP in exchange 1 zone 38 and the called subscriber substation in exchange 4 zone 62 is maintained for thirty-two minutes and that, after the elapse of the time interval mentioned, the subscriber at the calling private subscriber substation TP in exchange 1 zone 38 replaces the receiver of the telephone instrument thereat upon its associated switchhook, when this is done the previously traced connection between the calling private subscriber substation TP in exchange 1 zone 38 and the toll ticket repeater 90 is interrupted; whereupon the toll ticket repeater 90 operates in order to effect the release of the automatic switching apparatus in exchange 1 zone 73, the exchange in zone 46, exchange 1 zone 62 and exchange 4 zone 62, and the subscriber line extending to the called subscriber substation in exchange 4 zone 62 is marked as idle to the connectors having access thereto assuming that the subscriber thereat has replaced the receiver of the telephone instrument upon its associated switchhook at this time.

Further, the toll ticket repeater 90 operates to interrupt the application of ground potential to the control conductor of the trunk extending thereto and, consequently, to the test wiper 603 of the wiper set in the switch mechanism 600, thereby to effect the release of the primary selector 40 and the line switch 30. When the line switch 30 is thus released the private subscriber line 401 extending to the calling private subscriber substation TP is marked as idle to the individual connectors having access thereto.

Also, the toll ticket repeater 90 effects operation of the printer controller allotter 91; whereupon the finder switch F701 seizes an idle printer controller, such, for example, as the printer controller 92. When the printer controller 92 is thus seized the finder switch F703 operates in order to seize the calling toll ticket repeater 90. The printer controller 92 initiates operation of the date and time unit 94, whereby the date and time unit 94 transmits to the printer controller 92 the month, day, hour and minute of the seizure thereof, both in ten and unit digits. Also, the toll ticket repeater 90 transmits to the printer controller 92 the information stored therein, this information comprising not only that previously explained, which was transferred thereto from the register translator 70, but also the digit 0 indicating the special service pertaining to the reversal of charge for the established connection and the ten and unit digits of the time duration of the established connection. When the rate factor applicable to the established connection, together with the ten and unit digits of the time duration of the established connection, is transferred to the printer controller 92 the printer controller 92 operates to calculate the charge for the established connection in monetary values, specifically in dollars and cents.

When all of the items of record information in the toll ticket repeater 90 have been transferred to the printer controller 92 the toll ticket repeater 90 is automatically released, thereby to mark the trunk incoming thereto and accessible to the primary selectors 40, etc., as idle.

Also, when all of the items of record information stored in the toll ticket repeater 90 have been transferred to the printer controller 92 the printer controller 92 operates in order to initiate operation of the printer allotter 93, whereupon the finder switch F704 seizes the calling printer controller 92. When the finder switch F704 seizes the calling printer controller 92 operation of the finder switch F705 is initiated to seize an idle one of the toll ticket printers in the associated group, such, for example, as the toll ticket printer 95. When the toll ticket printer 95 is thus seized the printer controller 92 operates to transfer the items of record information stored therein to the toll ticket printer 95; whereupon the latter toll ticket printer operates to print the items of record information upon a toll ticket, thereby producing a toll ticket identical to that shown in Fig. 29 in the present example. After the toll ticket has been printed by the toll ticket printer 95 the printer controller 92 and the toll ticket printer 95 are released and rendered available for further use.

In view of the foregoing explanation of the mode of operation of the primary selector 40, the primary register 50 and the register translator 70 to extend a call from the calling private subscriber substation TP in exchange 1 zone 38 to a called subscriber substation in exchange 4 zone 62, it will be understood that this apparatus is operative, in a substantially identical manner, to extend calls to called subscriber substations in other exchanges in other of the zones in the area served by the telephone system.

*Toll calls from exchange 1 zone 38 to the exchange in zone 46*

Assuming that the call extending from the calling private subscriber substation TP to the primary selector 40 and the primary register 50 is to be extended to a called subscriber substation in the exchange in zone 46, the subscriber at the calling private subscriber substation TP proceeds to dial the directory number of the called subscriber substation. The directory number of the called subscriber substation comprises a code portion, including the digits 46, identifying the called zone and exchange and a numerical portion, including four digits, such, for example, as the digits 1234, identifying the line terminal of the subscriber line extending to the called subscriber substation.

Accordingly, the subscriber at the calling private subscriber substation TP proceeds to dial the first digit 4, thereby to cause the last-mentioned digit to be registered in the first code switch A800, in the manner previously explained. The wiper set of the switch mechanism 600 in the primary selector 40 is operated to its fourth vertical position in accordance with the first digit 4 and is then released at the conclusion of the last-mentioned digit, in the manner previously explained. Also, when the wiper 801 of the first code switch A800 engages the fourth contact in the associated contact bank the previously traced circuit for energizing the winding of the translate relay R1050 is completed, thereby to cause the latter relay to operate; whereupon operation of the register translator allotter 60 is initiated, in the manner previously explained. Again assuming that the register translator allotter 60 assigns the register translator 70 to the use of the calling primary register 50, the finder switch F1180 operates to seize the calling primary register 50, in the manner previously explained. When the register translator 70 is thus connected to the primary register 50 the send switch U840 in the primary register 50 operates to transmit the first digit 4 to the register translator 70; whereupon the last-mentioned digit is registered in the first code switch A1710 in the register translator 70, in the manner previously explained.

The subscriber at the calling private subscriber substation TP then proceeds to dial the second digit 6, thereby to cause the mechanical impulse repeater 1170 to operate and repeat the last-mentioned digit to the register translator 70; whereupon the second digit 6 is registered in the second code switch B1720 in the register translator 70. The wiper set of the switch mechanism 600 in the primary selector 40 is not operated in accordance with the second digit 6, as previously explained.

The subscriber at the calling private subscriber substation TP then proceeds to dial the third digit 1, thereby to cause the mechanical impulse repeater 1170 in the primary register 50 to repeat the last-mentioned digit to the register translator 70; whereupon the third digit 1 is registered in the third code switch C1730 in the register translator 70. The wiper set of the switch mechanism 600 in the primary selector 40 is not operated in accordance with the third digit 1, as previously explained.

Accordingly, at this time, the first digit 4 is registered in the first code switch A1710; the second digit 6 is registered in the second code switch B1720; and the third digit 1 is registered in the third code switch C1730; the wiper 1713 of the first code switch A1710 engages the second contact in the associated contact bank, thereby to select the third wiper 1643 of the wiper set in the composite code switch P1640; and the wiper set in the composite code switch P1640 occupies its sixth vertical level and its first rotary position. Also, at the conclusion of the third digit 1, the wipers noted of the register sequence switch S1840 engage the third contacts in the associated contact banks, thereby to initiate intermittent operation of the pulse relay R1310, in the manner previously explained.

At this point, it is noted that the first digit 4 and the second digit 6 respectively registered in the first code switch A1710 and the second code switch B1720 comprise the code portion of the directory number of the called subscriber substation in the exchange in zone 46; while the third digit 1 registered in the third code register C1730 comprises the first digit of the numerical portion of the directory number of the called subscriber substation in the exchange in zone 46, rather than the third digit of the code portion of the directory number of the called subscriber substation in the exchange in zone 46. This situation is presented due to the fact that the code portion of the directory number of the called subscriber substation in the exchange in zone 46 comprises two digits instead of three digits. Thus, it will be understood that the routing of the call by the composite code switch P1640 from exchange 1 zone 38 to the exchange in zone 46 must in fact be determined by the first digit 4 and the second digit 6 irrespective of the actual value of the third digit 1. In order to accomplish this end, a special multiple is provided in the contact bank associated with the third wiper 1643 of the wiper set in the composite code switch P1640. More particularly, the contacts in the sixth vertical level of contacts in the contact bank associated with the third wiper 1643 of the wiper set in the composite code switch P1640 are connected together; and are connected by way of the jumper 1672 to the corresponding 4 up 6 in contact in the contact bank associated with the control wiper 1628 of the wiper set in the rate and route switch R1620. Thus, it will be understood that the operation of the pulse relay R1310 is effective to cause the wiper set in the rate and route switch R1620 to be operated to its 4 up 6 in position when the wiper set in the composite code switch P1640 occupies its 6 up 1 in, 6 up 2 in, 6 up 3 in, etc., positions; and the third wiper 1643 of the wiper set in the composite code switch P1640 is selected due to the registration of the first digit 4 in the first code switch A1710.

Accordingly, at this time, the operating pulse relay R1310 causes the wiper set in the rate and route switch R1620 to be operated to its 4 up 6 in position, thereby to select the routing for the present call from exchange 1 zone 38 to the exchange in zone 46 via exchange 1 zone 73, which routing requires two routing digits.

Considering now the jumper arrangement among the contacts in the contact banks in the rate and route switch R1620, it is noted that the 4 up 6 in contacts in the contact banks respectively associated with the wipers 1625 and 1624 of the wiper set in the rate and route switch R1620 are respectively connected by the jumper 1675 to two of the marking conductors in the marking cable 1881 corresponding to the two routing digits required; the 4 up 6 in contact in the contact bank associated with the wiper 1623 of the wiper set in the rate and route switch R1620 is connected by way of the jumper 1673 to the slip conductor C119; while the 4 up 6 in contacts in the contact banks respectively associated with the wipers 1622 and 1621 of the wiper set in the rate and route switch R1620 are connected by way of the jumper 1674 to the control conductor C113.

The operation of the rate and route switch R1620, described above, in response to the operation of the composite code switch P1640, takes place in an extremely short interval of time at the conclusion of the third digit 1, whereupon the stop relay R1220 is operated. Upon operating, the stop relay R1220 initiates intermittent operation of the pulse relay R1420, in the manner previously explained, thereby to cause the digit sequence switch N1610 and the sender switch K1920 to operate, in the manner previously explained, in order to transmit the digits registered in the register translator 70 to the primary selector 40. More particularly, the wipers noted of the digit sequence switch N1610 engage the home contacts and then the first contacts in the associated contact banks, thereby to cause the sender switch K1920 to transmit the first routing digit and then the second routing digit to the primary selector 40 in order to cause operation of the primary selector 40 and the automatic switching apparatus in exchange 1 zone 73, in the manner previously explained.

At the conclusion of the second routing digit transmitted from the register translator 70 to the primary selector 40, the wipers noted of the digit sequence switch N1610 are moved into engagement with the second contacts in the associated contact banks, thereby to complete a path for applying ground potential to the slip conductor C119; this path extending from ground by way of the contacts 1262, the wiper 1613 of the digit sequence switch N1610 and the engaged second contact in the associated contact bank, the wiper 1623 of the wiper set in the rate and route switch R1620 and the engaged 4 up 6 in contact in the associated contact bank and the jumper 1673 to the slip conductor C119. This application of ground potential to the slip conductor C119 completes an obvious circuit, including the contacts 1242', for energizing the winding of the slip relay R1240, thereby to cause the latter relay to operate. Upon operating, the slip relay R1240 completes, at the contacts 1241, an obvious holding circuit, including the grounded hold conductor C1353, for energizing the winding thereof; and completes, at the contacts 1241', a circuit for energizing the magnet NM1614 of the digit sequence switch N1610. The last-mentioned circuit extends from the grounded slip conductor C119 by way of the contacts 1241', C113, the contacts 1615, and the magnet NM1614 to battery. When thus energized the magnet NM1614 operates and restores, thereby to drive the wipers noted of the digit sequence switch N1610 one step in the counterclockwise direction into engagement with the third contacts in the associated contact banks. When the wiper 1613 of the digit sequence switch N1610 engages the third contact in the associated contact bank the previously traced circuit for energizing the magnet NM1614 by way of the control conductor C113 is completed, thereby to cause the magnet NM1614 to operate and restore in order to drive the wipers noted of the digit sequence switch into engagement with the fourth contacts in the associated contact banks. When the wiper 1613 of the digit sequence switch N1610 engages the fourth contact in the associated contact bank the previously traced circuit for energizing the magnet NM1614 by way of the control conductor C113 is again completed, thereby to cause the magnet NM1614 to operate and restore in order to drive the wipers noted of the digit sequence which N1610 into engagement with the fifth contacts in the associated contact banks, the conductor C105 being terminated by the fifth contact in the contact bank associated with the wiper 1613 of the digit sequence switch N1610.

The operated slip relay R1240 completes, at the contacts 1242, 1244, 1246 and 1248, obvious connections between the conductors C105, C104, C103 and C102, respectively, and the conductors C111, C110, C109 and C108, respectively extending to the third code switch C1730, to the first numerical switch D1740, to the second numerical switch E1750 and to the third numerical switch F1810. At this time, the third digit 1, the fourth digit 2, the fifth digit 3 and the sixth digit 4 are respectively registered in the third code switch C1730, the first numerical switch D1740, the second numerical switch E1750 and the third numerical switch F1810; no digit being registered in the fourth numerical switch G1820.

Accordingly, the digit sequence switch N1610 then successively engages the fifth, sixth, seventh and eighth contacts in the associated contact bank, thereby to cause the third digit 1 registered in the third code switch C1730, the fourth digit 2 registered in the first numerical switch D1740, the fifth digit 3 registered in the second numerical switch E1750 and the sixth digit 4 registered in the third numerical switch F1810 to be transmitted successively to the primary selector 40, thereby to cause the automatic switching apparatus in the exchange in zone 46 to seize the line terminal of the subscriber line extending to the called subscriber substation therein, in the manner previously explained.

Subsequently, the wiper 1613 of the digit sequence switch N1610 engages the ninth contact in the associated contact bank, thereby to complete the previously traced alternative circuit for energizing the magnet NM1614. When thus energized the magnet NM1614 operates and restores, thereby to drive the wipers noted of the digit sequence switch N1610 an additional step in the counterclockwise direction. At this time, the register translator 70 and the primary register 50 are released, in the manner previously explained, thereby to cause the primary selector 40 to operate and complete an established connection between the calling private subscriber substation TP in exchange 1 zone 38 and the called subscriber substation in the exchange in zone 46. The operation of the toll ticketing apparatus, in order to cause a toll ticket individual to the toll call between the calling private subscriber substation TP in exchange 1 zone 38 and the called subscriber substation in the exchange in zone 46, and the subsequent release of the apparatus involved in the established connection are the same as those previously explained.

In view of the foregoing explanation of the mode of operation of the primary selector 40, the primary register 50 and the register translator 70 to extend the call from the calling private subscriber substation TP in exchange 1 zone 38 to the called subscriber substation in the exchange in zone 46, it will be understood that this apparatus is operative, in a substantially identical manner, to extend calls from other calling subscriber substations in exchange 1 zone 38 to a called subscriber substation in the exchange in zone 46.

*Toll calls from a private subscriber substation rendered extended service*

The extension of a toll call from a private subscriber substation rendered extended service, such, for example, as the private subscriber substation TX, is initiated at the calling private subscriber substation TX and extended therefrom under the control of the calling device thereat, in the manner previously explained; however, the apparatus in the primary register and in the register translator and in the toll ticketing apparatus operate in a slightly different manner, as explained more fully below.

Assume that a call has been initiated at the calling private subscriber substation TX, that the associated line switch 31 has seized the trunk 420 extending to the primary selector 40, and that the finder switch F500 has seized the primary register 50, in the manner previously explained. In this case, a circuit is completed for energizing the winding of the extended service relay R940 in the primary register 50 which is effective to cause the latter relay to operate. The last-mentioned circuit extends from ground by way of the winding of R940, C515, the wiper 505 of the finder switch F500, the contacts 647, the control conductor C423 of the trunk 420, the control wiper of the switching mechanism in the line switch 31 and the magnet M412 and the resistor 413 in multiple to battery. This series circuit is of considerably lower resistance than that previously traced due to the shunting action of the resistor 413 upon the magnet M412; accordingly, in this case, the winding of the extended service relay R940 in the primary register 50 is adequately energized in order to cause the latter relay to operate, the extended service relay R940 being of the marginal type, as previously noted.

The subscriber at the calling private subscriber substation TX then proceeds to dial the directory number of the called subscriber substation, thereby to cause the first code digit to be registered in the first code switch A800 in the primary register 50, the second code digit to be registered in the second code switch B810 in the primary register 50 in the event this is necessary, in the manner previously explained. When the first code digit is registered in the first code switch A800, the second code digit is registered in the second code switch B810, or the third code digit is registered in the third code switch C820, as the case may be, the previously traced circuit for energizing the winding of the translate relay R1050 is completed, in the manner previously explained; whereby operation of the register translator allotter 60 is initiated. Again assuming that the register translator allotter 60 assigns the register translator 70 to the use of the calling primary register 50, the finder switch F1180 operates to seize the primary register 50, in the manner previously explained.

When the register translator 70 is thus connected to the primary register 50, operation of the send switch U840 is initiated, in the manner previously explained. In the primary register 50, the wiper 802 of the first code switch A800 engages one of the contacts in the associated contact bank, thereby to mark the first code digit to the contact bank associated with the wiper 841 of the send switch U840, in the manner previously explained. Also, the operated extended service relay R940 completes, at the contacts 941, an obvious path for applying ground potential to the extended service conductor C866 terminated by the eighth contact in the contact bank associated with the wiper 841 of the send switch U840. Hence, during the operation of the send switch U840, the first code digit registered in the first code switch A800 is transmitted to the first code switch A1710 in the register translator 70, in the manner previously explained. Also, when the wiper 841 of the send switch U840 engages the eighth contact in the associated contact bank terminating the grounded extended service conductor C866, direct ground potential is applied to the send conductor C865, thereby to complete a direct ground circuit for energizing in series the winding of the step relay R1350 and the winding of the mark relay R1340 in the register translator 70, thereby to cause both of the last-mentioned relays to operate. More particularly, the mark relay R1340 in the register translator 70 operates at a time when the wiper 1831 of the station switch UB1830 engages the eighth contact in the associated contact bank terminating the conductor C134 extending to the winding of the extended service relay R1520; whereby an obvious circuit, including the contacts 1341, the wiper 1831 of the station switch UB1830 and the engaged eighth contact in the associated contact bank and the conductor C134, is completed for energizing the winding of the extended service relay R1520. When thus energized the extended service relay R1520 operates to complete, at the contacts 1521, an obvious holding circuit, including the grounded hold conductor C1353, for energizing the winding thereof. Also, the extended service relay R1520 completes, at the contacts 1522, an obvious path for applying ground potential to the Y conductor in the group of WXYZ marking conductors 1959.

Subsequently, the storage transfer switch U1910 in the register translator 70 operates to transfer the items of record information stored in the register translator 70 to the code storage devices in the associated one of the toll ticket repeaters, such, for example, as the toll ticket repeater 90, in the manner previously explained. During this operation of the storage transfer switch U1910 the wiper 1913 thereof is effective to transfer the marking of the Y conductor in the group of WXYZ marking conductors 1959 to the tenth code storage device in the mechanical storage unit in the toll ticket repeater 90, the marking in the group of WXYZ marking conductors 1959 corresponding to the digit 9, as previously explained.

Subsequently, during the operation of the toll ticketing apparatus to produce a toll ticket for the present toll call at the termination of the established connection, the digit 9 stored in the tenth code storage device in the toll ticket repeater 90 is transferred to an appropriate one of the code storage devices in the associated printer controller, such, for example, as the printer controller 92. The printer controller 92 then governs the associated toll ticket printer, such, for example, as the toll ticket printer 95, to cause the toll ticket printer 95 to print the digit 9 stored in the code storage device mentioned upon the toll ticket being produced at a position thereon following the fourth digit of the numerical portion of the directory number of the calling private subscriber substation rendered extended service. Accordingly, in the present example, the toll ticket produced will bear the following indicia under the heading:

Calling
Zone Ex. No.:
381–09019.

This indicia on the toll ticket indicates not only the zone and exchange (381) and the line terminal (0901) of the directory number of the calling private subscriber substation TX, but also the fact that the calling private subscriber substation TX is rendered extended service due to the presence of the digit 9 following the numerical portion of the directory number thereof.

At this point, it is again noted that private subscriber substations which are rendered extended service pay a higher flat rate service charge than ordinary private subscriber substations, which entitles them to certain preferences pertaining to billing for services. More particularly, a private subscriber substation which is rendered extended service may call remote exchanges in the zone thereof without charge, and is entitled to a predetermined rebate in connection with toll calls. Preferably, the toll tickets produced for a private subscriber substation rendered extended service are recalculated manually upon a bulk unit basis and billed accordingly.

*Toll calls from party subscriber substations*

The extension of a toll call from a party subscriber substation, such, for example, as one of the party subscriber substations TS1, TS2, TS3 or TS4 connected to the party subscriber line 407, is initiated at the calling party subscriber substation and extended therefrom under the control of the calling device thereat, in the manner previously explained; however, the apparatus in the primary register and in the register translator operate in a slightly different manner, as explained more fully below.

Assume that a call has been initiated at one of the party subscriber substations TS1, TS2, TS3 or TS4, that the associated line switch 32 has seized the trunk 420 extending to the primary selector 40, and that the finder switch F500 has seized the primary register 50, in the manner previously explained. In the present example, in the event the call is initiated at the first party subscriber substation TS1, no ground impulses are transmitted from the calling device thereat over the positive line conductor C409 of the party subscriber line 407 incident to the dialing of the first code digit; in the event the call is initiated at the second party subscriber substation TS2, one ground impulse is transmitted from the cam springs 445 in the calling device thereat over the positive line conductor C409 of the party subscriber line 407 incident to the dialing of the first code digit; in the event the call is initiated at the third party subscriber substation TS3, two ground impulses are transmitted from the cam springs 447 in the calling device thereat over the positive line conductor C409 of the party subscriber line 407 incident to the dialing of the first code digit; finally, in the event the call is initiated at the fourth party subscriber substation TS4, three ground impulses are transmitted from the cam springs 449 in the calling device thereat over the positive line conductor 409 of the party subscriber line 407 incident to the dialing of the first code digit.

By way of example, it is pointed out that the calling device at the fourth party subscriber substation TS4 is operative to transmit, by way of the set of cam springs 449, the first ground impulse over the positive line conductor C409 of the party subscriber line 407, while the set of impulse springs 448 is closed; then to transmit, by way of the impulse springs 448, the first impulse of the first code digit over the line conductors C408 and C409 of the party subscriber line 407, while the set of cam springs 449 is open; then to transmit, by way of the set of cam springs 449, the second ground impulse over the positive line conductor C409 of the party subscriber line 407, while the set of impulse springs 448 is closed, etc. The calling devices at the second party subscriber substation TS2 and at the third party subscriber substation TS3 are operative in a similar manner.

Each time a ground impulse is transmitted over the positive line conductor C409 of the party subscriber line 407 a path is completed for short-circuiting the lower winding of the party line relay R910 in the primary register 50; this path extending from ground by way of the lower winding of R910, C511, the wiper 501 of the finder switch F500, the contacts 631, the line conductor C421 of the trunk 420 and the line switch 32 to the grounded positive line conductor C409 of the party subscriber line 407. When the lower winding of the party line relay R910 is thus short-circuited the latter relay operates as the upper winding thereof is energized in series with the upper winding of the line relay R920, the party line relay R910 being of the differential type. Each time ground potential is removed from the line conductor C409 of the party subscriber line 407 the above-traced path for short-circuiting the lower winding of the party line relay R910 is interrupted; whereby the upper and lower windings thereof are energized in series circuit relation with the upper winding of the line relay R920 in order to cause the party line relay R910 to restore, the latter relay being of the differential type, as noted above. The application of ground potential to the positive line conductor C409 of the party subscriber line 407 has no effect upon the energization of the upper winding of the line relay R920. Each time the loop circuit, including the party subscriber line 407, is interrupted the line relay R920 restores and the party line relay R910 remains restored as both the upper and lower windings thereof are deenergized. Accordingly, the line relay R920 follows the loop impulses transmitted by the set of impulse springs in the calling device at the calling party subscriber substation on the party subscriber line 407; and the party line relay R910 follows the ground impulses transmitted by the set of cam springs in the calling device at the calling party subscriber substation on the party subscriber line 407.

The first time the party line relay R910 operates it completes, at the contacts 911, an obvious circuit, including the contacts 1117 and 1123, for energizing the lower winding of the party relay R1120. When thus energized the party relay R1120 operates partially, thereby to complete, at the contacts 1121, an obvious path, including the contacts 1047, for short-circuiting the upper winding thereof. The first time the party line relay R910 restores it interrupts, at the contacts 911, the previously mentioned path for short-circuiting the upper winding of the party relay R1120; whereupon an obvious series circuit, including the contacts 1047 and 1121, is completed for energizing the upper and lower windings of the party relay R1120. When thus energized the party relay R1120 operates fully, thereby to interrupt, at the contacts 1123, a further point in the previously mentioned path for short-circuiting the upper winding thereof, and to prepare, at the contacts 1122, a circuit traced hereinafter for energizing the lower winding of the party relay R1130. The second time the party line relay R910 operates and restores an obvious circuit substantially identical to that previously traced is completed and then interrupted for energizing the lower winding of the party relay R1130, whereby the latter relay operates first partially and then fully in the manner explained above. Finally, in the event the party line relay R910 is operated and restored a third time, a circuit substantially identical to that previously traced is completed and then interrupted for energizing the winding of the party relay R1140; thereby to cause the latter relay to operate and complete, at the contacts 1141, an obvious holding circuit for energizing the winding thereof.

In view of the foregoing explanation of the mode of operation of the party relays R1120, R1130 and R1140, in conjunction with the calling devices at the various party subscriber substations TS1, TS2, TS3 and TS4 connected to the party subscriber line 407, it will be understood that, in the event the call is initiated at the first party subscriber substation TS1, none of the party relays R1120, R1130 and R1140 will be operated incident to the dialing of the first code digit; in the event the call is initiated at the second party subscriber substation TS2, the first party relay R1120 will be operated incident to the dialing of the first code digit; in the event the call is initiated at the third party subscriber substation TS3, the first party relay R1120 and the second party relay R1130 will be operated incident to the dialing of the first code digit; finally, in the event the call is initiated at the fourth party subscriber substation TS4, the first party relay R1120, the second party relay R1130 and the third party relay R1140 will be operated incident to the dialing of the first code digit.

At the conclusion of the first code digit registered in the first code switch A800 in the primary register 50, the digit cutoff relay R1110 operates, as previously explained, whereby a common point in the operating circuits for energizing the lower windings of the party relays R1120 and R1130 and the winding of the party relay R1140 is interrupted. This arrangement positively prevents the operation of the party line relay R910 incident to the dialing of the second code digit, the third code digit, etc., from causing further operation of the party relays R1120, R1130 and R1140. It will be understood that the party line relay R910 is operated, in the manner explained above, as each successive code digit and each successive numerical digit is dialed at the calling party subscriber substation connected to the party subscriber line 407; however, the operation of the party line relay R910, subsequent to the dialing of the first code digit, is without effect due to the operated position of the digit cutoff relay R1110, as explained above. Upon operating, the party relays R1120, R1130 and R1140 respectively complete, at the contacts 1124, 1134 and 1142, obvious paths for respectively applying ground potential to the three party conductors C867, C868 and C869, respectively terminated by the ninth, tenth and eleventh contacts in the contact bank associated with the wiper 841 of the send switch U840, for a purpose more fully explained hereinafter.

As noted above, the subscriber at the calling party subscriber substation TS1, TS2, TS3 or TS4 proceeds to dial the directory number of the called subscriber substation, thereby to cause the first code digit to be registered in the first code switch A800 in the primary register 50, the second code digit to be registered in the second code switch B810 in the primary register 50, in the event this is necessary, in the manner previously explained. When the first code digit is registered in the first code switch A800, the second code digit is registered in the second code switch B810, or the third code digit is registered in the third code switch C820, as the case may be, the previously traced circuit for energizing the winding of the translate relay R1050 is completed, in the manner previously explained; whereby operation of the register translator allotter 60 is initiated. Again assuming that the register translator allotter 60 assigns the register translator 70 to the use of the calling primary register 50, the finder switch F1180 operates to seize the primary register 50, in the manner previously explained.

When the register translator 70 is thus connected to the primary register 50, operation of the send switch U840 is initiated, in the manner previously explained. In the primary register 50, the wiper 802 of the first code switch A800 engages one of the contacts in the associated contact bank, thereby to mark the first code digit to the contact bank associated with the wiper 841 of the send switch U840, in the manner previously explained. Also, in the event one or more of the party relays R1120, R1130 and R1140 are operated, one or more of the paths for applying ground potential respectively to the party marking conductors C867, C868 and C869 are completed, the last-mentioned marking conductors being respectively terminated by the ninth, tenth and eleventh contacts in the contact bank associated with the wiper 841 of the send switch U840. Hence, during the operation of the send switch U840, the first code digit registered in the first code switch A800 is transmitted to the first code switch A1710 in the register translator 70, in the manner previously explained. Also, when the wiper 841 of the send switch U840 successively engages the ninth, tenth and eleventh contacts in the associated contact bank respectively terminating the party marking conductors C867, C868 and C869, direct ground potential is applied to the send conductor C865 in the event the respective party relays R1120, R1130 and R1140 occupy their operated positions; thereby to complete direct ground circuits for energizing in series the winding of the step relay R1350 and the winding of the mark relay R1340 in the register translator 70, thereby to cause both of the last-mentioned relays to operate. More particularly, the mark relay R1340 in the register translator 70 operates at a time when the wiper 1831 of the station switch UB1830 engages the ninth contact in the associated contact bank terminating the conductor C133, in the event the party relay R1120 in the primary register 50 occupies its operated position; the mark relay R1340 reoperates at a time when the wiper 1831 of the station switch UB1830 engages the tenth contact in the associated contact bank terminating the conductor C132, in the event the party relay R1130 in the primary register 50 occupies its operated position; and the mark relay R1340 reoperates at a time when the wiper 1831 of the station switch UB1830 engages the eleventh contact in the associated contact bank terminating the conductor C131, in the event the party relay R1140 in the primary register 50 occupies its operated position. The successive application of ground potential to the conductors C133, C132 and C131 respectively completes obvious circuits for energizing the windings of the party relays R1530, R1540 and R1550, whereby each of the relays mentioned operates. Upon operating, the party relays R1530, R1540 and R1550 respectively complete, at the contacts 1533, 1543, and 1553, obvious holding circuits, including the grounded hold conductor C1553, for respectively energizing the windings thereof.

In view of the foregoing explanation of the mode of operation of the party relays R1120, R1130 and R1140 in the primary register 50 and the party relays R1530, R1540 and R1550 in the register translator 70, it will be understood that, when a call is initiated at the first party subscriber substation TS1, none of the party relays R1530, R1540 and R1550 is operated; when a call is initiated at the second party subscriber substation TS2 the first party relay R1530 is operated; when a call is initiated at the third party subscriber substation TS3 the first party relay R1530 and the second party relay R1540 are operated; and when a call is initiated at the fourth party subscriber substation TS4 the first party relay R1530, the second party relay R1540 and the third party relay R1550 are operated. When none of the party relays R1530, R1540 and R1550 occupies its operated position an obvious path, including the contacts 1532, 1542 and 1552, is completed for applying ground potential to the first hold conductor C1; when the first party relay R1530 occupies its operated position an obvious path, including the contacts 1531, 1544 and 1555, is completed for applying ground potential to the second hold conductor C2; when the first and second party relays R1530 and R1540 occupy their operated positions an obvious path, including the contacts 1541 and 1556, is completed for applying ground potential to the third hold conductor C3; and when the first, second and third party relays R1530, R1540 and R1550 occupy their operated positions an obvious path, including the contacts 1551, is completed for applying ground potential to the fourth hold conductor C4. Also, the three party relays R1530, R1540 and R1550 control the paths for applying ground potential to the four hold conductors C1, C2, C3 and C4 so that ground potential is only applied to one of the hold conductors mentioned at any time.

Subsequently, when the detector 80 is connected to the register translator 70 the storage slave relay R1940 in the register translator 70 operates in order to connect the hold conductors C1, C2, C3 and C4, respectively, to the hold conductors C1973, C1974, C1975 and C1976 extending to the detector 80; whereby ground potential is applied to one of the last-mentioned hold conductors, depending upon the various positions of the party relays R1530, R1540 and R1550 in the register translator 70, as explained above.

In view of the foregoing explanation of the mode of operation of the party relays R1530, R1540 and R1550 in the register translator 70, it will be understood that, when the detector 80 is connected to the register translator 70, ground potential will be applied to the hold conductor C1973 in the event the call was initiated at the first party subscriber substation TS1, whereupon the detector 80 will operate in order to detect the directory number of the connector terminal having access to the first party subscriber substation TS1, the directory number of the terminal mentioned being 0100; when the detector 80 is connected to the register translator 70, ground potential will be applied to the hold conductor C1974 in the event the call was initiated at the second party subscriber substation TS2, whereupon the detector 80 will operate in order to detect the directory number of the connector terminal having access to the second party subscriber substation TS2, the directory number of the terminal mentioned being 0200; when the detector 80 is connected to the register translator 70, ground potential will be applied to the hold conductor C1975 in the event the call was initiated at the third party subscriber substation TS3, whereupon the detector 80 will operate in order to detect the directory number of the connector terminal having access to the third party subscriber substation TS3, the directory number of the terminal mentioned being 0300; and, finally, when the detector 80 is connected to the register translator 70, ground potential will be applied to the hold conductor C1976 in the event the call was initiated at the fourth party subscriber substation TS4, whereupon the detector 80 will operate in order to detect the directory number of the connector terminal having access to the fourth party subscriber substation TS4, the directory number of the terminal mentioned being 0400.

The subsequent operation of the toll ticketing apparatus, to produce a toll ticket individual to the call, and the subsequent release of the established connection are the same as those previously described.

*Conclusions*

From the foregoing it is apparent that an automatic telephone system is provided, which comprises automatic recording apparatus operative to record, without the aid of an operator, given particulars of certain calls in the system for which special charges are made, regardless of whether the calls are originated at private or party subscriber substations, and improved switching apparatus for setting up the calls and for collecting the items of record information to be recorded. The arrangement for registering and routing telephone connections is claimed in the parent application Serial No. 411,350, filed September 18, 1941, now Patent No. 2,409,063, granted October 8, 1946; and the arrangement for assessing a charge for a call in accordance with the class of service rendered the subscribers involved in a connection is claimed in the copending divisional application Serial No. 457,926, filed September 11, 1942, now Patent No. 2,535,510, granted December 26, 1950.

While one embodiment of the invention has been disclosed, it will be understood that various modifications may be made therein which are within the true spirit and scope of the invention.

What is claimed is:

1. In a telephone system, a plurality of lines including a party line, a plurality of stations on said party line, a calling device at each of said stations, the calling device at any calling one of said stations being selectively operable to transmit over said party line a variable digit, switching apparatus, means responsive to the transmission over said party line of a plurality of digits for operating said switching apparatus to extend a call from said party line, and means controlled jointly by the extension of a call from said party line and the operation of the particular calling device at said one station to transmit one of said digits over said party line for identifying said party line as the calling line and for identifying said one station as the calling station, the control of said last-mentioned means being independent of the value of said one digit transmitted over said party line.

2. In a telephone system, a plurality of lines including a party line, a plurality of stations on said party line, a calling device at each of said stations, the calling device at any calling one of said stations being selectively operable to transmit over said party line during a single operation thereof both a variable switch control signal and an individual station signal, whereby the calling devices at said stations transmit over said party line different station signals incident to operation thereof, switching apparatus, means responsive to the switch control signals transmitted over said party line for operating said switching apparatus, thereby to extend the call from said party line, and means governed jointly by the extension of the call from said party line and the station signal transmitted thereover for identifying said party line as the calling line and for identifying the corresponding one of said stations as the calling station.

3. In a telephone system, a plurality of lines including a party line, a plurality of stations on said party line, a calling device at each of said stations, the calling device at any calling one of said stations being selectively operable to transmit over said party line during a single operation thereof both a variable switch control signal and an individual station signal, whereby the calling devices at said stations transmit over said party line different station signals incident to operation thereof, switching apparatus, means responsive to the switch control signals transmitted over said party line for operating said switching apparatus, thereby to extend the call from said party line, a detector common to said lines, and means governed jointly by the extension of the call from said party line and the station signal transmitted thereover for operating said detector to detect said party line as the calling line and to detect the corresponding one of said stations as the calling station.

4. In a telephone system, a plurality of lines including a party line, a plurality of stations on said party line, a calling device at each of said stations, the calling device at any calling one of said stations being selectively operable to transmit over said party line during a single operation thereof both a variable switch control signal and an individual station signal, whereby the calling devices at said stations transmit over said party line different station signals incident to operation thereof, switching apparatus, means responsive to the transmission over said party line of a plurality of switch control signals for operating said switching apparatus, thereby to extend the call from said party line, and means governed jointly by the extension of the call from said party line and the first transmission thereover of a station signal for identifying said party line as the calling line and for identifying the corresponding one of said stations as the calling station.

5. In a telephone system, a plurality of lines including a party line, a plurality of stations on said party line, a calling device at each of said stations, the calling device at any calling one of said stations being selectively operable to transmit over said party line during a single operation thereof both a variable number of switch control impulses and an individual fixed number of station impulses, whereby the calling devices at said stations transmit over said party line different numbers of station impulses incident to operation thereof, switching apparatus, means responsive to the switch control impulses transmitted over said party line for operating said switching apparatus, thereby to extend the call from said party line, and means governed jointly by the extension of the call from said party line and the fixed number of station impulses transmitted over said party line and individual to the calling device at a given one of said stations for identifying said party line as the calling line and for identifying said given station as the calling station.

6. In a telephone system, a plurality of lines including a party line, a plurality of stations on said party line, a calling device at each of said stations, the calling device at any calling one of said stations being selectively operable to transmit over said party line during a single operation thereof both a variable switch control signal and an individual station signal, whereby the calling devices at said stations transmit over said party line different station signals incident to operation thereof, register mechanism, means responsive to the initiation of a call on said party line for associating said party line with said register mechanism, said register mechanism being adapted to register both the switch control signal and the station signal transmitted over said party line, switching apparatus, means governed by said register mechanism in accordance with the various switch control signals registered therein for selectively operating said switching apparatus, thereby to extend the call from said party line, and means governed jointly by the extension of the call from said party line and by said register mechanism in accordance with the station signal registered therein for identifying said party line as the calling line and for identifying the corresponding one of said stations as the calling station.

7. In a telephone system, a party line, a plurality of stations on said party line, a calling device at each of said stations, said party line being provided with a plurality of terminals individual to the various stations thereon having corresponding individual designations, the calling device at any calling one of said stations being selectively operable to transmit over said party line a variable switch control signal, switching apparatus, means responsive to the switch control signals transmitted over said party line for operating said switching apparatus, thereby to extend the call from said party line, a detector operative to detect the particular terminal designation of said party line corresponding to the calling one of said stations thereon, and means governed by the operation of the particular calling device at said one station to transmit a given switch control signal over said party line for controlling the operation of said detector.

8. In a telephone system, a party line, a plurality of stations on said party line, a calling device at each of said stations, said party line being provided with a plurality of terminals individual to the various stations thereon having corresponding individual designations, switching apparatus, means responsive to repeated operation of the calling device at any calling one of said stations for operating said switching apparatus to extend a call from said party line, and means controlled jointly by the extension of a call from said party line and the first operation of the particular calling device at said one station for detecting the particular terminal designation of said party line corresponding to said one station.

9. In a telephone system, a party line, a plurality of stations on said party line, a calling device at each of said stations, said party line being provided with a plurality of terminals individual to the various stations thereon having corresponding individual designations, the calling device at any calling one of said stations being selectively operable to transmit over said party line a variable digit, switching apparatus, means responsive to the transmission over said party line of a plurality of digits for operating said switching apparatus to extend a call from said party line, and means controlled jointly by the extension of a call from said party line and the operation of the particular calling device at said one station to transmit one of said digits over said party line for detecting the particular terminal designation of said party line corresponding to said one station, the control of said last-mentioned means being independent of the value of said one digit transmitted over said party line.

10. In a telephone system, a plurality of private lines, each of said private lines being provided with a single terminal individual thereto having a corresponding individual designation, a plurality of party lines, each of said party lines being provided with several terminals individual to the several stations thereon having corresponding individual designations, apparatus for setting up connections between said lines, and automatic means for registering in conjunction with each connection the particular terminal designation of the calling private line or the particular terminal designation of the calling party line corresponding to the calling station thereon and the particular terminal designation of the called private line or the particular terminal designation of the called party line corresponding to the called station thereon.

11. In a telephone system, a plurality of private lines, each of said private lines being provided with a single terminal individual thereto having a corresponding individual designation, a plurality of party lines, each of said party lines being provided with several terminals individual to the several stations thereon having corresponding individual designations, apparatus for setting up connections between said lines, automatic means governed incident to the setting up of a connection for registering the particular terminal designation of the calling private line or the particular terminal designation of the calling party line corresponding to the calling station thereon, and means governed over the calling line for registering the particular terminal designation of the called private line or the particular terminal designation of the called party line corresponding to the called station thereon.

12. In a telephone system, a plurality of lines, each of said lines being provided with a number of terminals, corresponding ones of the terminals of said lines being arranged in corresponding ones of a number of groups, a detector having access to said terminals, means responsive to the extension of a call from a given line for initiating operation of said detector and for selectively limiting the searching operation of said detector in a predetermined one of said groups of terminals, means for causing said detector to search in said predetermined group of terminals for a terminal of said given line, and means controlled when said detector finds a terminal of said given line in said predetermined group for arresting operation thereof, thereby to identify said given line in said predetermined group as the calling line.

13. In a telephone system, a plurality of lines, each of said lines being provided with a fixed number of terminals, corresponding ones of the terminals of said lines being arranged in corresponding ones of a fixed number of groups, a detector having access to said terminals and comprising a master relay, a fixed number of group relays, a fixed number of conductors, means responsive to the extension of a call from a given line for selectively applying a given potential to a predetermined one of said conductors and for operating said master relay, means controlled by the operation of said master relay for preparing each of said group relays, whereby a predetermined one of said group relays corresponding to said predetermined conductor is operated, and means for selecting the terminal of said line in the one of said groups corresponding to the operated one of said group relays, thereby to identify said given line in said last-mentioned group as the calling line.

14. In a telephone system, a plurality of party lines, a number of stations on each of said party lines, each of said party lines being provided with a number of terminals individually corresponding to the stations thereon, corresponding ones of the terminals of said party lines being arranged in a number of groups, whereby the various terminals in a given group correspond to similarly positioned stations on said party lines, a detector having access to said terminals, means responsive to the extension of a call from a given station on a given party line for initiating operation of said detector and for limiting the searching operation of said detector in the corresponding given group of terminals, means for causing said detector to search in said given group of terminals for a terminal of said given party line, and means controlled when said detector finds a terminal of said given party line in said given group for arresting operation thereof, thereby to identify both said given party lines as the calling line and said given station as the calling station thereon.

15. In a telephone system including a large group of lines, a detector having access to said group of lines and comprising cycle apparatus operative progressively through X steps, Y test units, switching apparatus for subdividing said group of lines, means for initiating operation of said cycle apparatus, means including said cycle apparatus for operating said switching apparatus progressively to subdivide said group of lines into X subgroups upon the corresponding X steps of said cycle apparatus and to subdivide each of the subgroups into Y divisions and to connect the Y divisions to corresponding ones of said Y test units, means governed when the division including the sought line is connected to one of said test units for operating said one test unit and for arresting the progressive stepping operation of said cycle apparatus, a register, means including said register controlled in accordance with the arrested step of said cycle apparatus and the particular operated one of said test units for respectively identifying the subgroup and the included division including said sought line, means for releasing said cycle apparatus and said one operated test unit and for initiating reoperation of said cycle apparatus, means including said cycle apparatus for reoperating said switching apparatus progressively to subdivide the identified division into X subdivisions upon the corresponding X steps of said cycle apparatus and to subdivide each of the subdivisions into Y individual lines and to connect the Y individual lines to corresponding ones of said Y test units, means governed when the sought line is connected to one of said test units for operating said one test unit and for arresting the progressive stepping operation of said cycle apparatus, and means including said register controlled in accordance with the arrested step of said cycle apparatus and the particular operated one of said test units for respectively identifying the subdivision including said sought line and the particular position of said sought line therein.

16. In a telephone system including a large group of lines, a detector having access to said group of lines and comprising cycle apparatus operative progressively through X steps, Y test units, switching apparatus for subdividing said group of lines, means for initiating operation of said cycle apparatus, means including said cycle apparatus for operating said switching apparatus progressively to subdivide said group of lines into X subgroups upon the corresponding X steps of said cycle apparatus and to subdivide each of the subgroups into Y divisions and to connect the Y divisions to corresponding ones of said Y test units, means governed when the division including the sought line is connected to one of said test units for operating said one test unit and for arresting the progressive stepping operation of said cycle apparatus, a register, and means including said register controlled in accordance with the arrested step of said cycle apparatus and the particular operated one of said test units for respectively identifying the subgroup and the included division including said sought line.

17. In a telephone system including a large group of lines, a detector having access to said group of lines and comprising cycle apparatus operative progressively through X steps, Y test units, switching apparatus for subdividing said group of lines, means for initiating operation of said cycle apparatus, means including said cycle apparatus for operating said switching apparatus progressively to subdivide said group of lines into X subgroups upon the corresponding X steps of said cycle apparatus and to subdivide each of the subgroups into Y individual lines and to connect the Y individual lines to corresponding ones of said Y test units, means governed when the sought line is connected to one of said test units for operating said one test unit and for arresting the progressive stepping operation of said cycle apparatus, a register, and means including said register controlled in accordance with the arrested step of said cycle apparatus and the particular operated one of said test units for respectively identifying the subgroup including said sought line and the particular position of said sought line therein.

18. In a telephone system including a large number of lines, a detector having access to 10,000 of said lines and comprising cycle apparatus operative progressively through 10 steps, 10 test units, switching apparatus for subdividing said 10,000 lines, means for initiating operation of said cycle apparatus, means including said cycle apparatus for operating said switching apparatus progressively to subdivide said 10,000 lines into 10 groups of 1,000 lines each upon the corresponding 10 steps of said cycle apparatus and to subdivide each of the 1,000 line groups into 10 subgroups of 100 lines each and to connect the 10 subgroups of 100 lines each to corresponding ones of said 10 test units, means governed when the 100 line subgroup including the sought line is connected to one of said test units for operating said one test unit and for arresting the progressive stepping operation of said cycle apparatus, a register, and means including said register controlled in accordance with the arrested step of said cycle apparatus and the particular operated one of said test units for respectively identifying the 1000 line group and the included 100 line subgroup including said sought line.

19. In a telephone system including a large number of lines, a detector having access to 100 of said lines and comprising cycle apparatus operative progressively through 10 steps, 10 test units, switching apparatus for subdividing said 100 lines, means for initiating operation of said cycle apparatus, means including said cycle apparatus for operating said switching apparatus progressively to subdivide said 100 lines into 10 groups of 10 lines each upon the corresponding 10 steps of said cycle apparatus and to subdivide each of the 10 line groups into 10 individual lines and to connect the 10 individual lines to corresponding ones of said 10 test units, means governed when the sought line is connected to one of said test units for operating said one test unit and for arresting the progressive stepping operation of said cycle apparatus, a register, and means including said register controlled in accordance with the arrested step of said cycle apparatus and the particular operated one of said test units for respectively identifying the 10 line group including said sought line and the particular unit position of said sought line.

20. In a telephone system, a large group of lines arranged in subgroups each including divisions, each division of said lines being arranged in subdivisions each including individual lines, a detector having access to said lines and comprising a set of cycle relays, a set of testers, means for initiating a first cycle of operation of said cycle relays, means controlled by the first cycle of operation of said cycle relays for progressively connecting the different subgroups of said group to said set of testers, whereby the different divisions included in a connected subgroup are simultaneously connected to the respective testers in said set, means controlled when a division including a sought line is connected to one of the testers in said set for arresting the first cycle of operation of said cycle relays and for operating said one tester, thereby to identify the subgroup and the included division including said sought line, means for releasing said cycle relays and said one tester and for initiating a second cycle of operation of said cycle relays, means controlled by the second cycle of operation of said cycle relays for progressively connecting the different subdivisions of said identified division to said set of testers, whereby the different individual lines in a connected subdivision are simultaneously connected to the respective testers in said set, and means controlled when said sought line is connected to one of the testers in said set for arresting the second cycle of operations of said cycle relays and for operating said one tester, thereby to identify the subdivision including said sought line and the particular position of said sought line therein.

21. In a telephone system, a large group of lines arranged in subgroups each including divisions, each division of said lines being arranged in subdivisions each including individual lines, a detector having access to said lines and comprising a set of cycle relays, a set of testers, means for initiating a first cycle of operation of said cycle relays, means controlled by the first cycle of operation of said cycle relays for progressively connecting the different subgroups of said group to said set of testers, whereby the different divisions included in a connected subgroup are simultaneously connected to the respective testers in said set, means controlled when a division including a sought line is connected to one of the testers in said set for arresting the first cycle of operation of said cycle relays and for operating said one tester, first and second registers, means controlled by the arrested position of said cycle relays for operating said first register to identify the subgroup including said sought line, means controlled by the operation of said one tester for operating said second register to identify the division including said sought line, means for releasing said cycle relays and said one tester and for initiating a second cycle of operation of said cycle relays, means controlled by the second cycle of operation of said cycle relays for progressively connecting the different subdivisions of said identified division to said set of testers, whereby the different individual lines in a connected subdivision are simultaneously connected to the respective testers in said set, means controlled when said sought line is connected to one of the testers in said set for arresting the second cycle of operation of said cycle relays and for operating said one tester, third and fourth registers, means controlled by the arrested position of said cycle relays for operating said third register to identify the subdivision including said sought line, and means controlled by the operation of said one tester for operating said fourth register to identify the particular position of said sought line in said identified subdivision.

JOHN E. OSTLINE.

REFERENCES CITED

The following references are of record in the file of this patent:

UNITED STATES PATENTS

| Number | Name | Date |
|---|---|---|
| 1,309,248 | Goodrum | July 8, 1919 |
| 1,846,262 | Kittredge | Feb. 23, 1932 |
| 2,299,513 | Taylor | Oct. 20, 1942 |